(12) United States Patent
Kitazato et al.

(10) Patent No.: US 9,548,826 B2
(45) Date of Patent: Jan. 17, 2017

(54) RECEPTION DEVICE, RECEPTION METHOD, AND PROGRAM

(71) Applicant: SONY CORPORATION, Tokyo (JP)

(72) Inventors: Naohisa Kitazato, Tokyo (JP); Izumi Hatakeyama, Tokyo (JP); Masayuki Obayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/419,333

(22) PCT Filed: Sep. 2, 2013

(86) PCT No.: PCT/JP2013/073512
§ 371 (c)(1),
(2) Date: Feb. 3, 2015

(87) PCT Pub. No.: WO2014/042029
PCT Pub. Date: Mar. 20, 2014

(65) Prior Publication Data
US 2015/0222374 A1    Aug. 6, 2015

(30) Foreign Application Priority Data

Sep. 13, 2012  (JP) ................................ 2012-201130

(51) Int. Cl.
*H04L 1/00*    (2006.01)
*H04H 20/42*    (2008.01)
(Continued)

(52) U.S. Cl.
CPC ........... *H04H 20/426* (2013.01); *H04H 60/43* (2013.01); *H04N 21/41407* (2013.01);
(Continued)

(58) Field of Classification Search
CPC ........ H04W 4/06; H04W 84/18; H04W 84/19; H04B 7/2606; H04B 7/2607; H04B 7/2608; H04B 7/2609; H04B 7/261; H04B 7/18582; H04B 7/18583; H04B 7/18584; H04B 7/18585; H04B 7/18586
(Continued)

(56) References Cited

U.S. PATENT DOCUMENTS

2009/0239464 A1* 9/2009 Ishida .................... H04H 40/18
455/3.06
2009/0262253 A1* 10/2009 Ieda ....................... H04H 60/43
348/732

FOREIGN PATENT DOCUMENTS

JP      2006325032 A    11/2006
JP      2007329847 A    12/2007
(Continued)

OTHER PUBLICATIONS

European Extended Search Report Received for European Patent Application No. 13837724.7, Mailed on Feb. 9, 2016, p. 10.
(Continued)

*Primary Examiner* — Dady Chery
(74) *Attorney, Agent, or Firm* — Oblon, McClelland, Maier & Neustadt, L.L.P.

(57) ABSTRACT

Provided is a reception device including a first acquisition unit configured to acquire station information regarding a station transmitting a broadcasting wave of broadcasting on an arbitrary segment, a storage unit configured to store the station information, a selection unit configured to select a station transmitting a broadcasting wave that is receivable at a predetermined position as a tunable station to be tuned to using the station information, a specifying unit configured to specify a transmission frequency used at a transmission point of a broadcasting wave of the broadcasting performed by the tunable station using the station information, and a tuning control unit configured to perform tuning control
(Continued)

such that a service of the broadcasting performed by the tunable station is tuned to according to the transmission frequency.

10 Claims, 48 Drawing Sheets

(51) Int. Cl.

| | | |
|---|---|---|
| *H04H 60/43* | (2008.01) | |
| *H04N 21/438* | (2011.01) | |
| *H04W 48/16* | (2009.01) | |
| *H04N 21/414* | (2011.01) | |
| *H04N 21/434* | (2011.01) | |
| *H04N 21/61* | (2011.01) | |
| *H04W 72/00* | (2009.01) | |
| *H04W 72/02* | (2009.01) | |
| *H04W 72/04* | (2009.01) | |

(52) U.S. Cl.
CPC ..... *H04N 21/4345* (2013.01); *H04N 21/4384* (2013.01); *H04N 21/6112* (2013.01); *H04W 48/16* (2013.01); *H04W 72/005* (2013.01); *H04W 72/02* (2013.01); *H04W 72/0453* (2013.01)

(58) Field of Classification Search
USPC ..... 370/310, 312, 513, 316, 329; 455/158.1, 455/158.2, 179.1, 185.1, 186.1, 186.2
See application file for complete search history.

(56) References Cited

FOREIGN PATENT DOCUMENTS

| | | |
|---|---|---|
| JP | 2012147157 A | 8/2012 |
| WO | 2010110296 A1 | 9/2010 |
| WO | 2011122334 A1 | 10/2011 |
| WO | 2011-152245 A | 12/2011 |
| WO | 2011-152246 A | 12/2011 |

OTHER PUBLICATIONS

N J Laflin et al, "Coverage Planning for Digital Terrestrial Television", International Broadcasting Convention, BC 95., International Amsterdam, Sep. 14-18, 1995, pp. 9.

European Standard (Telecommunications Series), "Digital Video Broadcasting (DVB); Specification for Service Information (SL) in DVB Systems", European Telecommunications Standards Institute (ETSI), ETSI EN 300 468 V1.8.1 (Jul. 2008), Jul. 1, 2008, p. 111.

* cited by examiner

FIG.9

| SEGMENT | NIT actual (table_id=0x40) | NIT other (table_id=0x41) | SDT actual (table_id=0x42) | SDT other (table_id=0x46) |
|---|---|---|---|---|
| CENTRAL SEGMENT (s7) | NIT-0 | NIT-1 | SDT for s7 | SDT for s1 TO SDT for s13 (EXCLUDING SDT FOR s7) |
| NON-CENTRAL SEGMENT (s1 TO s6, s8 TO s13) | NIT-1 | NONE | SDT for each | NONE |

| SERVICE NAME | SERVICE ID | FREQUENCY |
|---|---|---|
| ONE-SEG SERVICE 1 | ID1 | F1 |
| COMMUNITY SERVICE 1 | ID2 | F2 |
| COMMUNITY SERVICE 2 | ID3 | F3 |
| COMMUNITY SERVICE 3 | ID4 | F4 |
| COMMUNITY SERVICE 4 | ID5 | F5 |
| COMMUNITY SERVICE 5 | ID6 | F6 |
| ONE-SEG SERVICE 2 | ID7 | F7 |
| ⋮ | ⋮ | ⋮ |

B

| SERVICE NAME | SERVICE ID | FREQUENCY |
|---|---|---|
| ONE-SEG SERVICE 1 | ID1 | F1 |
| COMMUNITY SERVICE 1 | ID2 | F2 |
| ONE-SEG SERVICE 2 | ID7 | F7 |
| ⋮ | ⋮ | ⋮ |

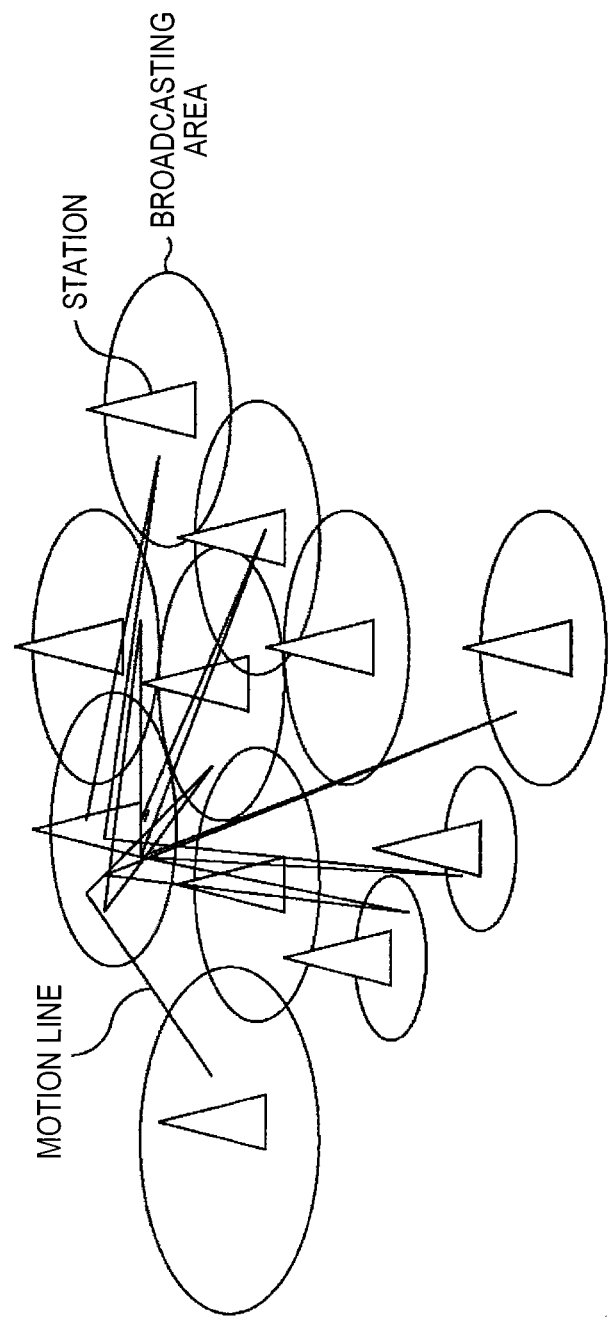

FIG. 14

| NAME OF INFORMATION ITEM | | CONTENT DESCRIPTION |
|---|---|---|
| STATION ID | station_id | ID FOR IDENTIFYING STATION IN UNIT OF TS |
| AREA CODE | area_code | CODE INDICATING AREA OF STATION |
| SIGNAL FORMAT | signal_format | INDICATE FORMAT OF SIGNAL OF BROADCASTING WAVE OF AREA-LIMITED BROADCASTING |
| TRANSMISSION INFORMATION FLAG | emission_info_flag | FLAG INDICATING WHETHER OR NOT THERE IS TRANSMISSION INFORMATION |
| TRANSMISSION-POINT-CORRESPONDING FLAG | emission_point_flag | FLAG INDICATING WHETHER OR NOT TO CORRESPOND TO TRANSMISSION POINT |
| ADDITIONAL INFORMATION FLAG | additional_info_flag | FLAG INDICATING WHETHER OR NOT THERE IS ADDITIONAL INFORMATION |
| TRANSMISSION OUTPUT | emission_power | INDICATES TRANSMISSION OUTPUT OF STATION |
| TRANSMITTING STATION LATITUDE | station_latitude | INDICATES LATITUDE OF STATION LOCATION |
| TRANSMITTING STATION LONGITUDE | station_longitude | INDICATES LONGITUDE OF STATION LOCATION |
| TRANSMITTING STATION ALTITUDE | station_height | INDICATES ALTITUDE OF STATION LOCATION |
| AREA PATTERN BITMAP | area_pattern_bitmap | INDICATES DIRECTIVITY OF RADIO WAVE TRANSMITTED IN EACH DIRECTION |
| RECEIVABLE DISTANCE | max_distance | INDICATES RANGE IN WHICH AREA-LIMITED BROADCASTING IS RECEIVABLE |
| RECEIVABLE DISTANCE UNIT | max_distance_unit | INDICATES UNIT OF RECEIVABLE DISTANCE |
| OPEN AIR FLAG | open_air_flag | FLAG INDICATING WHETHER OR NOT SERVICE TARGET IS OUTDOOR SITE |
| CLOSED SPACE FLAG | closed_space_flag | FLAG INDICATING WHETHER OR NOT SERVICE TARGET IS INDOOR SITE |
| MOBILE STATION FLAG | station_mobility_flag | FLAG INDICATING WHETHER OR NOT AREA-LIMITED BROADCASTING IS BROADCAST FROM FIXED POSITION |
| FREQUENCY TAG | frequency_tag | NUMBER INDICATING TRANSMISSION FREQUENCY AT TRANSMISSION POINT DESCRIBED IN TERRESTRIAL DELIVERY SYSTEM DESCRIPTOR |
| ADDITIONAL INFORMATION | additional_info() | FUTURE EXTENDED INFORMATION |
| ... | ... | ... |

FIG. 15

| SIGNAL FORMAT | | | |
|---|---|---|---|
| SEGMENT CONFIGURATION | | DESCRIPTION | VARIATION OF STREAM SPECIFICATION |
| (1) ONE-SEG TRANSMISSION | | ONLY TRANSMIT ONE SEGMENT AT CENTER | a) BASIC SPECIFICATION: CURRENT RECEPTION TERMINAL<br>b) EXTENDED SPECIFICATION: NON-DL-CORRESPONDING ADVANCED RECEPTION TERMINAL<br>c) ADVANCED SPECIFICATION: DL-CORRESPONDING ADVANCED RECEPTION TERMINAL |
| (2) FULL-SEG TRANSMISSION WITH NULL VALUES | | PERFORM TRANSMISSION WITH 1 SEGMENT+12 SEGMENTS, BUT ONLY WITH NULL TS FOR 12 SEGMENTS | a) BASIC SPECIFICATION: CURRENT RECEPTION TERMINAL<br>b) EXTENDED SPECIFICATION: NON-DL-CORRESPONDING ADVANCED RECEPTION TERMINAL<br>c) ADVANCED SPECIFICATION: DL-CORRESPONDING ADVANCED RECEPTION TERMINAL |
| (3) FULL-SEG TRANSMISSION | | PERFORM TRANSMISSION WITH 1 SEGMENT+12 SEGMENTS. EACH INCLUDES BROADCASTING SIGNAL | ONE SEGMENT<br>a) BASIC SPECIFICATION: CURRENT RECEIVING TERMINAL<br>b) EXTENDED SPECIFICATION: NON-DL-CORRESPONDING ADVANCED RECEPTION TERMINAL<br>c) ADVANCED SPECIFICATION: DL-CORRESPONDING ADVANCED RECEPTION TERMINAL<br>12 SEGMENTS<br>a) BASIC SPECIFICATION: CURRENT RECEPTION TERMINAL<br>b) EXTENDED SPECIFICATION: NON-DL-CORRESPONDING ADVANCED RECEPTION TERMINAL<br>c) ADVANCED SPECIFICATION: DL-CORRESPONDING ADVANCED RECEPTION TERMINAL |
| (4) NON-CENTRAL ONE-SEG TRANSMISSION | | PERFORM TRANSMISSION ONLY WITH 1 SEGMENT, WHICH IS NON-CENTRAL SEGMENT | a) EXTENDED SPECIFICATION: NON-DL-CORRESPONDING ADVANCED RECEPTION TERMINAL<br>b) ADVANCED SPECIFICATION: DL-CORRESPONDING ADVANCED RECEPTION TERMINAL |

FIG. 23

AREA BROADCASTING DESCRIPTOR

| DATA STRUCTURE | bit | Identifier |
|---|---|---|
| area_broadcasting_descriptor () { | | |
|   descriptor_tag | 8 | uimsbf |
|   descriptor_length | 8 | uimsbf |
|   station_id | 24 | uimsbf |
|   area_code | 16 | uimsbf |
|   signal_format | 8 | uimsbf |
|   reserved_future_use | 5 | uimsbf |
|   emission_info_flag | 1 | bslbf |
|   emission_point_flag | 1 | bslbf |
|   additional_info_flag | 1 | bslbf |
|   if( emission_info_flag==1) { | | |
|     no_of_emission_point | 8 | uimsbf |
|     for (i=0; i<no_of_emission_point; i++) { | | |
|       emission_power | 16 | uimsbf |
|       station_latitude | 24 | uimsbf |
|       station_longitude | 24 | uimsbf |
|       station_height | 16 | uimsbf |
|       area_pattern_bitmap | 32 | bslbf |
|       max_distance | 8 | uimsbf |
|       max_distance_unit | 1 | bslbf |
|       open_air_flag | 1 | bslbf |
|       closed_space_flag | 1 | bslbf |
|       station_mobility_flag | 1 | bslbf |
|       frequency_tag | 4 | bslbf |
|     } | | |
|   } | | |
|   if (additional_info_flag==1) { | | |
|     additional_info () | | |
|   } | | |
| } | | |

FIG. 24

TERRESTRIAL DELIVERY SYSTEM DESCRIPTOR

| DATA STRUCTURE | bit | Identifier |
|---|---|---|
| terrestrial_delivery_system_descriptor () { | | |
| descriptor_tag | 8 | uimsbf |
| descriptor_length | 8 | uimsbf |
| area_code | 12 | bslbf |
| guard_interval | 2 | bslbf |
| transmission_mode | 2 | bslbf |
| for (i=0; i<N; i++) { | | |
| frequency | 16 | uimsbf |
| } | | |
| } | | |

RECEPTION DEVICE, RECEPTION METHOD, AND PROGRAM

TECHNICAL FIELD

The present technology relates to a reception device, reception method, and program, and particularly to a reception device, reception method, and program which enable receivable one-segment broadcasting to be presented quickly.

BACKGROUND ART

In terrestrial digital broadcasting, a frequency band of about 6 MHz in an ultra-high frequency (UHF) band (which will also be referred to hereinafter as a physical channel) is divided into 13 segments, and broadcasting toward fixed terminals such as television receiver sets is performed with 12 of these segments. In addition, broadcasting toward mobile terminals, i.e., one-segment broadcasting (which will also be referred to hereinafter as one-seg broadcasting), is performed with the one remaining segment.

Currently, in the one-seg broadcasting performed as broadcasting toward mobile terminals, the same content as broadcasts toward fixed terminals is broadcast, for which the segment at the center of the 13 segments of the physical channel (the 7th segment in ascending order of frequency) is used.

Here, one-seg broadcasting that is currently performed with the segment at the center (which will also be referred to hereinafter as a central segment) is also referred to as normal one-seg broadcasting.

After a transition from analog terrestrial broadcasting to terrestrial digital broadcasting has been completed, the terrestrial digital broadcasting is performed using physical channels that are called channels 13 to 52 channels of the UHF band.

However, in practice, not all of the channels 13 to 52 are used in terrestrial digital broadcasting in respective regions, and thus there is an idle channel that is a physical channel not used in terrestrial digital broadcasting.

Methods for effectively using such an idle channel have been discussed, and as one of them, performing one-seg broadcasting using an arbitrary segment of an idle channel has been discussed.

Here, since each physical channel of terrestrial digital broadcasting has 13 segments, a maximum of 13 broadcasting services can be performed with one physical channel. A plurality of one-seg broadcasting services that are performed using a respective plurality of 13 segments of one physical channel are referred to as a multi-segment broadcasting service.

Note that one-seg broadcasting that is performed using one or more respective arbitrary segments out of 13 segments is also referred to as arbitrary one-seg broadcasting, and arbitrary one-seg broadcasting also includes multi-segment broadcasting.

In a reception terminal of the related art that receives normal one-seg broadcasts (which will also be referred to hereinafter as a normal one-seg terminal), users perform channel scanning to acquire tuning information that is information relating to tuning to a frequency or the like to perform tuning to a normal one-seg broadcast, and thus a table of tuning information (which will also be referred to hereinafter as a tuning table) is created (for example, refer to Patent Literatures 1 and 2).

In channel scanning of a normal one-seg terminal, a channel of the central segment of each physical channel of terrestrial digital broadcasting is selected (tuned), and when a transport stream (TS) can be received with the central segment, a network information table (NIT) which is a table that includes frequency information of each service for being tuned to carriers on which services are transported and information regarding corresponding services, and a service description table (SDT) which is a table that includes meta information of each service (such as a service name) are extracted from the TS, and then a tuning table is created from the NIT and the SDT.

When a reception terminal that receives arbitrary one-seg broadcasts has been realized, it is also necessary to create a tuning table likewise for a normal one-seg terminal.

Arbitrary one-seg broadcasting, however, is performed with an arbitrary segment among 13 segments of a physical channel, and thus it is necessary to perform tuning to all of the 13 segments of each physical channel, rather than simply to the central segment, which takes an enormous amount of time in comparison to channel scanning of a normal one-seg terminal.

For this reason, a proposal for a method for performing channel scanning in arbitrary one-seg broadcasting quickly (in a short period of time) has been demanded.

CITATION LIST

Patent Literature

Patent Literature 1: JP 2006-325032A
Patent Literature 2: JP 2007-329847A

SUMMARY OF INVENTION

Technical Problem

Thus, arbitrary one-seg broadcasting that is performed with an area within a radius of about dozens of meters to several kilometers from (an antenna of) a station, which is a transmission device transmitting broadcast waves of arbitrary one-seg broadcasting, set as a broadcasting area in which (broadcast waves of) arbitrary one-seg broadcasting can be received (which will also be referred to hereinafter as area-limited broadcasting) has been proposed.

Since area-limited broadcasting is included in the category of arbitrary one-seg broadcasting, it is also necessary for reception terminals that receive area-limited broadcasts to create tuning tables as when receiving arbitrary one-seg broadcasts;

however, a broadcasting area is narrow in area-limited broadcasting, and thus a broadcast that has been received until then is no longer received and a new broadcast can be received only when the terminal is moved about dozens of meters to several kilometers. Thus, there are cases in which a tuning table that was created before the movement is no longer useable after the movement.

In other words, when a broadcast to which a user currently intends to perform tuning by operating a so-called channel button is assumed to be a logical channel, there are cases in which a logical channel that is an area-limited broadcast receivable before the movement is presented after the movement based on the tuning table created before the movement in a reception terminal that receives an area-limited broadcast, and then the user is not able to receive the logical channel even when he or she attempts to operate the terminal to perform tuning to the logical channel.

Thus, in order to present a logical channel that can be received after the movement to the user, it is necessary to perform channel scanning again after the movement.

However, it takes time to perform channel scanning each time a movement is made in order to present a receivable logical channel to the user.

The present technology takes the above circumstances into account, and aims to enable receivable one segment broadcasts to be presented quickly.

Solution to Problem

According to an aspect of the present technology, there is provided a reception device or a program for causing a computer to function as a reception device, the reception device including a first acquisition unit configured to acquire station information regarding a station transmitting a broadcasting wave of broadcasting on an arbitrary segment, a storage unit configured to store the station information, a selection unit configured to select a station transmitting a broadcasting wave that is receivable at a predetermined position as a tunable station to be tuned to using the station information, a specifying unit configured to specify a transmission frequency used at a transmission point of a broadcasting wave of the broadcasting performed by the tunable station using the station information, and a tuning control unit configured to perform tuning control such that a service of the broadcasting performed by the tunable station is tuned to according to the transmission frequency.

According to an aspect of the present technology, there is provided a reception method performed by a reception device, the method including the steps of acquiring station information regarding a station transmitting a broadcasting wave of broadcasting on an arbitrary segment, storing the station information, selecting a station transmitting a broadcasting wave that is receivable at a predetermined position as a tunable station to be tuned to using the station information, specifying a transmission frequency used at a transmission point of a broadcasting wave of the broadcasting performed by the tunable station using the station information, and performing tuning control such that a service of the broadcasting performed by the tunable station is tuned to according to the transmission frequency.

According to the aspects described above, station information regarding a station transmitting a broadcasting wave of broadcasting on an arbitrary segment is acquired, the station information is stored, a station transmitting a broadcasting wave that is receivable at a predetermined position as a tunable station to be tuned to is selected using the station information, a transmission frequency used at a transmission point of a broadcasting wave of the broadcasting performed by the tunable station is specified using the station information, and tuning control such that a service of the broadcasting performed by the tunable station is tuned to is performed according to the transmission frequency.

The reception device may be an independent device or an internal block constituting one device.

Further, the program can be provided by transmitting via a transmission medium or by recording on a recording medium.

Advantageous Effects of Invention

According to an aspect of the present technology, it is possible to present receivable one segment broadcasts quickly.

BRIEF DESCRIPTION OF DRAWINGS

FIG. 9 is a diagram showing configurations of NITs and SDTs of the central segment and non-central segments.

FIG. 11 is a diagram illustrating an example of tuning tables.

FIG. 13 is a diagram illustrating broadcasting areas of area-limited broadcasting and motion lines that are trajectories of movements of a user who possesses a reception terminal 33 that can receive area-limited broadcasting.

FIG. 14 is a diagram showing an example of station information.

FIG. 15 is a diagram showing a signal format designation method.

FIG. 23 is a diagram showing an example of syntax of an area broadcasting descriptor.

FIG. 24 is a diagram showing an example of syntax of a terrestrial delivery system descriptor.

DESCRIPTION OF EMBODIMENTS

Hereinafter, embodiments of the present technology will be described with reference to drawings.
[Channel Scanning of a Normal One-Seg Terminal]

First, channel scanning of a normal one-seg terminal that is a reception terminal of the related art that receives normal one-seg broadcasting will be described.

Figure 1:
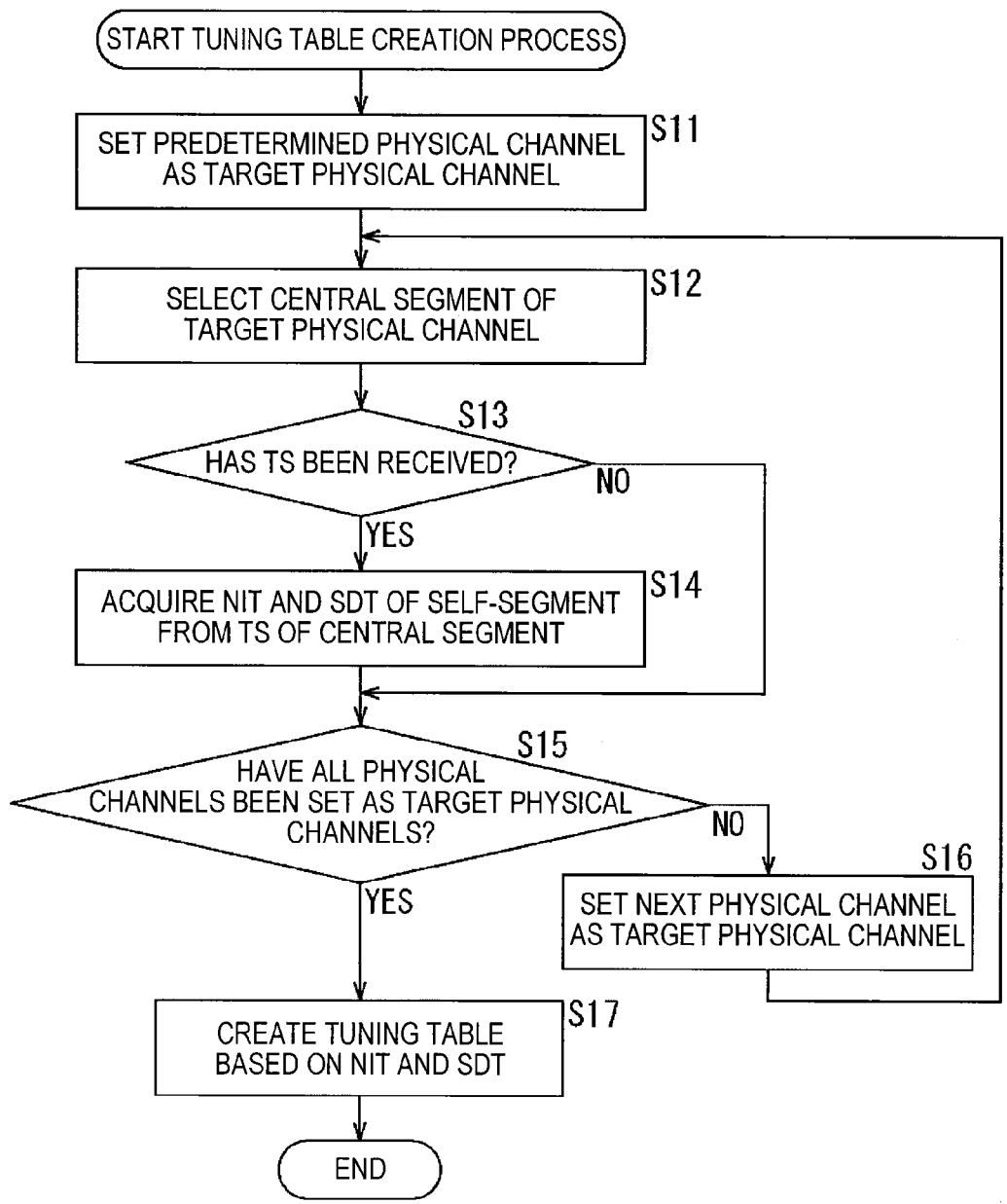
FIG. 1 is a flowchart for describing a tuning table creation process.

FIG. 1 is a flowchart illustrating channel scanning of a normal one-seg terminal.

In Step S11, the normal one-seg terminal selects a physical channel with a lowest frequency, for example, that is one physical channel among physical channels of channels 13 to 52 of the UHF band as a target physical channel to be processed, and then the process proceeds to Step S12.

In Step S12, the normal one-seg terminal performs tuning to the central segment of the target physical channel, and then the process proceeds to Step S13.

In Step S13, the normal one-seg terminal determines whether or not a TS of the central segment of the target physical channel has been received, and when it is determined not to have been received, the process skips Step S14, and proceeds to Step S15.

In addition, when the TS of the central segment of the target physical channel is determined to have been received in Step S13, the process proceeds to Step S14, and the normal one-seg terminal acquires (extracts) a network information table (NIT) of the self-segment (the segment with which the TS has been received) which is described as NIT-actual and a service description table (SDT) of the self-segment which is described as SDT-actual from the TS received with the central segment, and then the process proceeds to Step S15.

In Step S15, the normal one-seg terminal determines whether or not all physical channels of channels 13 to 52 of the UHF band have been set as target physical channels.

When it is determined that there is a physical channel that is not set as a target physical channel in Step S15, the process proceeds to Step S16, and the normal one-seg terminal selects, for example, a physical channel that has the next highest frequency to the current target physical channel as a new target physical channel, and then the process returns to Step S12.

On the other hand, when all physical channels are determined to have been set as target physical channels in Step S15, the process proceeds to Step S17, and the normal one-seg terminal creates a tuning table based on the NIT and the SDT acquired in Step S14, and thereby channel scanning ends.

Figure 2:
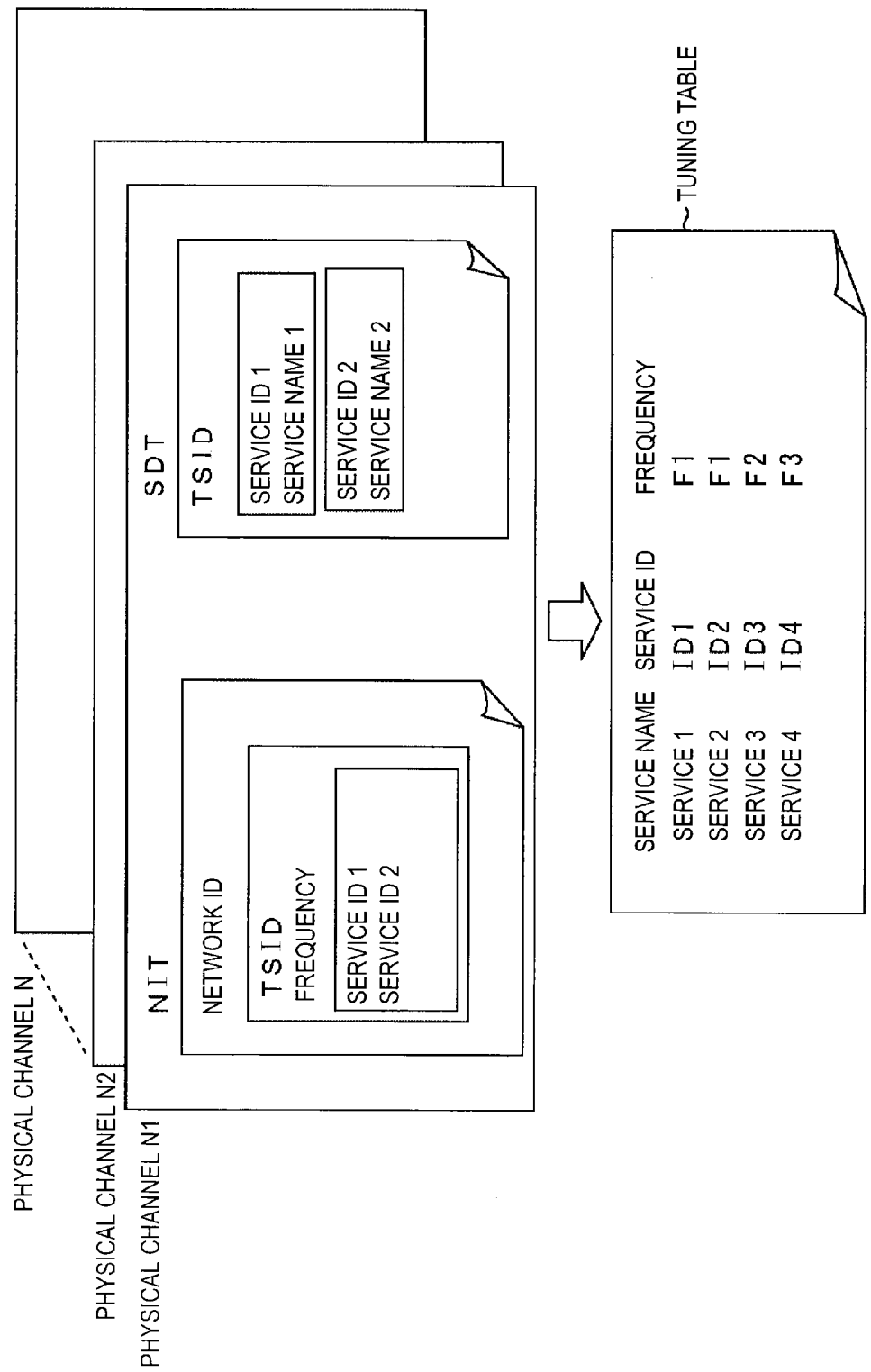
FIG. 2 is a diagram illustrating an example of a tuning table.

FIG. 2 is a diagram illustrating a tuning table created based on NITs and SDTs.

In each NIT, a network ID that is the intrinsic ID to a network, a TSID that is the intrinsic ID to a TS, a frequency, service IDs intrinsic to (broadcasting) services, and the like which correspond to the self-segment are described. In addition, in each SDT, a TSID, service IDs, and service names corresponding to the service IDs, and the like which correspond to the self-segment are described.

The normal one-seg terminal acquires the service IDs and frequencies for tuning from each NIT of the central segments of physical channels, acquires service names from each SDT to associate therewith corresponding to its NIT and then registers the service IDs, service names, and frequencies in the tuning table as tuning information.

Note that, in FIG. 2, since the central segment of a physical channel CH-1 having a frequency set to F1 is used for two services each having service IDs of ID1 and ID2, the ID1 and ID2 of the two services are described in the NIT of the central segment of the physical channel CH-1 having a frequency set to F1.

In the normal one-seg terminal, when, for example, a service name of the tuning table is presented as a name of a logical channel ("OOTV," "XX channel," or the like of a program list) and a user operates the terminal to be tuned to (the logical channel of) the service of the service name, a frequency that is associated with the service name in the tuning table is tuned.

Figure 3:
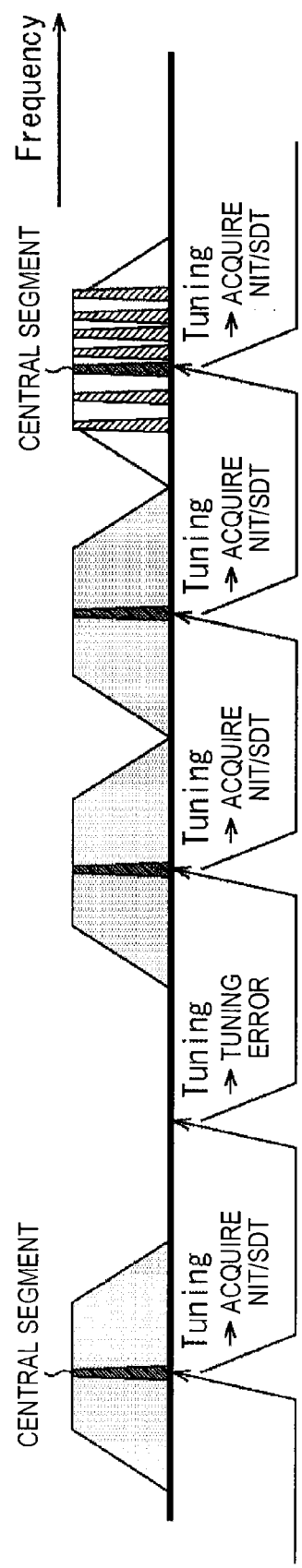
FIG. 3 is a diagram illustrating channel scanning of a normal one-seg terminal.

FIG. 3 is a diagram illustrating channel scanning of a normal one-seg terminal.

As described in FIG. 1, the normal one-seg terminal performs tuning to each of the central segments of the physical channels of terrestrial digital broadcasting in ascending order of frequency, and when it is possible to receive TSs with the central segments, the NITs and the SDTs are acquired from the TSs.

Then, in the manner described above, the normal one-seg terminal creates a tuning table from the NITs and the SDTs acquired from the TSs.

Thus, when arbitrary one-seg broadcasting is performed with the central segments in a normal one-seg terminal, tuning information of the arbitrary one-seg broadcasting can be acquired; however, in arbitrary one-seg broadcasting that is performed with segments other than the central segments (the portions in hatching in FIG. 3), it is not possible to acquire tuning information.

[A Configuration Example of an Embodiment of a Transmission and Reception System to which the Present Technology is Applied]

Figure 4:
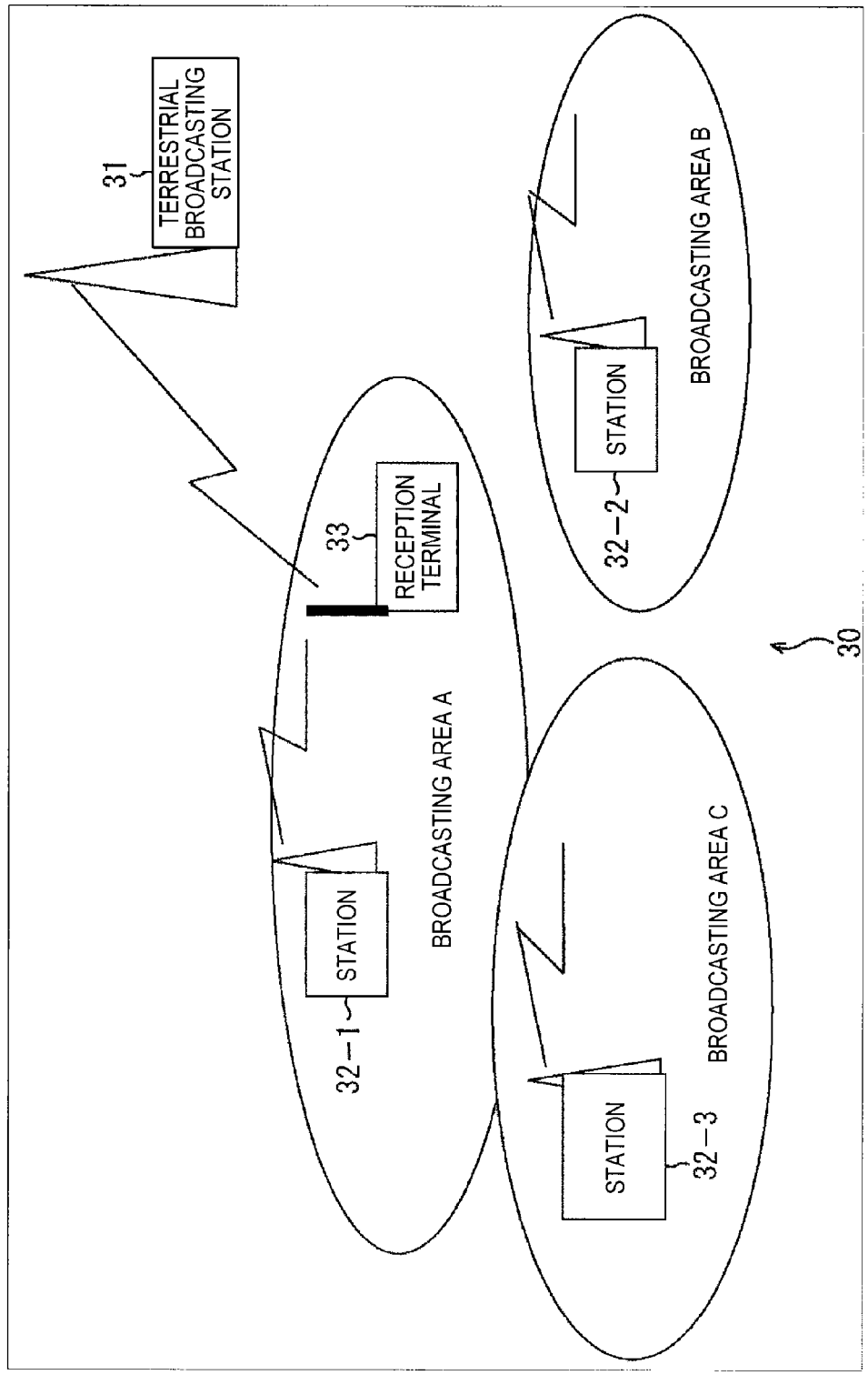
FIG. 4 is a diagram illustrating a configuration example of an embodiment of a transmission and reception system to which the present technology is applied.

FIG. 4 is a diagram illustrating a configuration example of an embodiment of a transmission and reception system to which the present technology is applied.

In FIG. 4, a transmission and reception system 30 is constituted by a terrestrial broadcasting station 31, stations 32-1, 32-2, and 32-3, and a reception terminal 33.

The terrestrial broadcasting station 31 is a broadcasting station that performs terrestrial digital broadcasting, and performs broadcasting toward fixed terminals with 12 segments and performs broadcasting toward mobile terminals with the remaining one segment (which is referred to as normal one-seg broadcasting).

The stations 32-1, 32-2, and 32-3 are transmission devices that transmit broadcasting waves of arbitrary one-seg broadcasting performing area-limited broadcasting which is one-seg broadcasting using one or more arbitrary segments of an idle channel of the terrestrial digital broadcasting.

In other words, the station 32-1 performs area-limited broadcasting that is receivable only within a broadcasting area A.

The station 32-2 performs area-limited broadcasting that is receivable only within a broadcasting area B, and the station 32-3 performs area-limited broadcasting that is receivable only within a broadcasting area C.

Note that, when it is not necessary to specifically distinguish the stations 32-1 to 32-3, they are collectively referred to as a station 32.

Here, as area-limited broadcasting, for example, there are a broadcasting service relating to a theme park that is receivable only within the theme park, a broadcasting service relating to shops spread throughout a district or city that is receivable only within the district or the city, and the like.

With respect to the area-limited broadcasting, broadcasting can be performed between stations using the same segment of which broadcasting areas do not overlap.

In other words, in FIG. 4, for example, the broadcasting areas A and B do not overlap with each other, and thus the station 32-1 of the broadcasting area A and the station 32-2 of the broadcasting area B can perform area-limited broadcasting using the same segment.

Further, in FIG. 4, the broadcasting areas B and C do not overlap with each other, and thus the station 32-2 of the broadcasting area B and the station 32-3 of the broadcasting area C can perform area-limited broadcasting using the same segment.

In FIG. 4, however, since parts of the broadcasting areas A and C overlap, the station 32-1 of the broadcasting area A and the station 32-3 of the broadcasting area C are not allowed to use the same segment in area-limited broadcasting (as long as the stations simultaneously perform broadcasting).

The reception terminal 33 is a mobile terminal that can receive any of normal one-seg broadcasting and area-limited broadcasting.

When, for example, a user who possesses the reception terminal 33 is present in the broadcasting area A as shown in FIG. 4, the reception terminal 33 can receive normal one-seg broadcasting and area-limited broadcasting from the station 32-1 of the broadcasting area A.

Note that, since a process of the reception terminal 33 receiving normal one-seg broadcasting is the same as that of a reception terminal of the related art (the normal one-seg terminal) that receives normal one-seg broadcasting, description thereof will be omitted below.

[Description of Segments Used in Arbitrary One-Seg Broadcasting]

Figure 5:
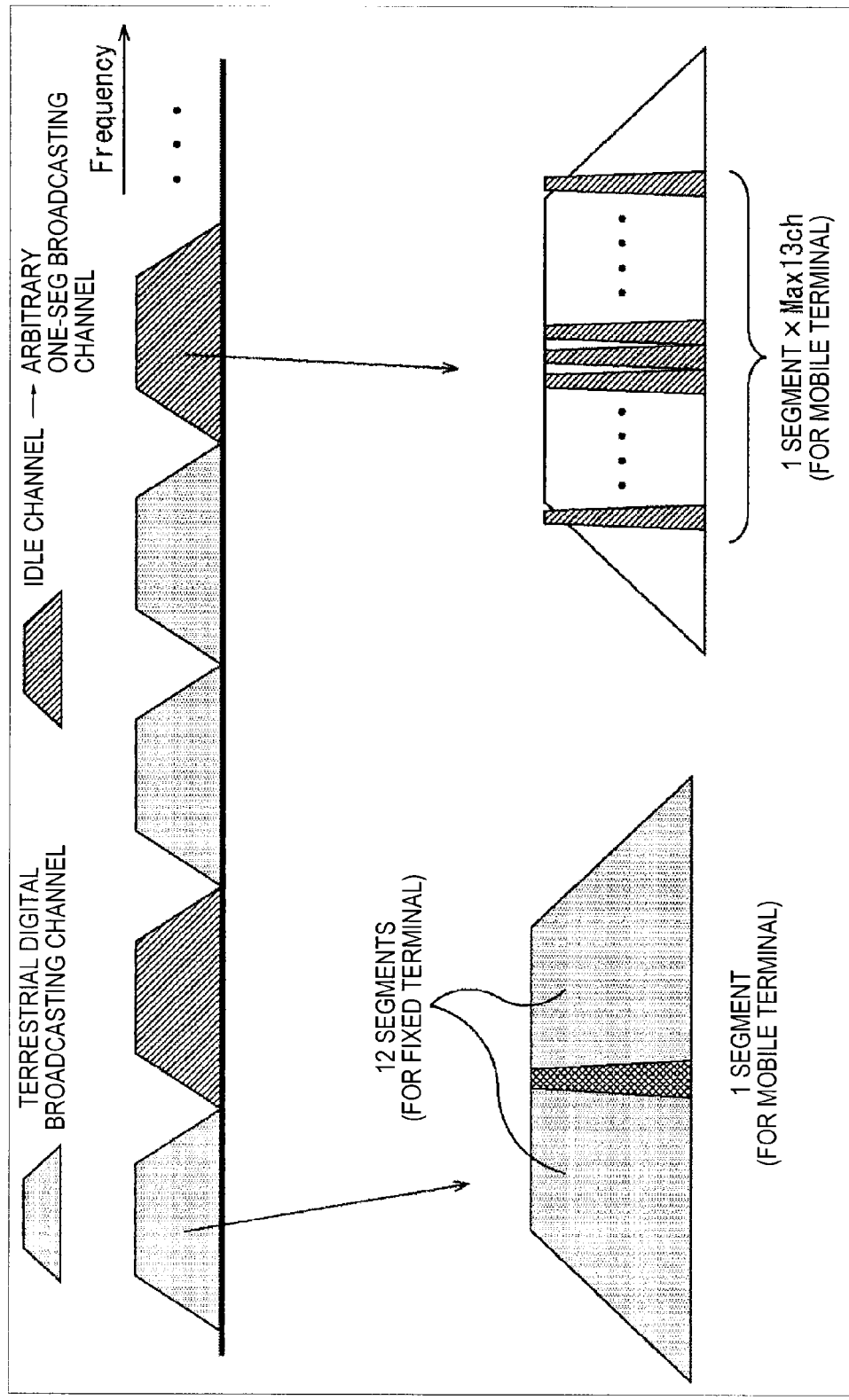
FIG. 5 is a diagram for describing allocation of a band of terrestrial digital broadcasting.

FIG. 5 is a diagram for describing allocation of a band of terrestrial digital broadcasting in the transmission and reception system 30 of FIG. 4.

As shown in FIG. 5, in the transmission and reception system 30, in a physical channel used in terrestrial digital broadcasting of all bands of the terrestrial digital broadcasting, normal one-seg broadcasting is performed in the band of the one segment at the center, and broadcasting toward fixed terminals is performed in the band of the remaining 12 segments.

With respect to each idle channel, one or more respective segments can be used in area-limited broadcasting. The maximum number of segments (logical channels) of one idle channel which can be used in area-limited broadcasting is 13.

Figure 6:
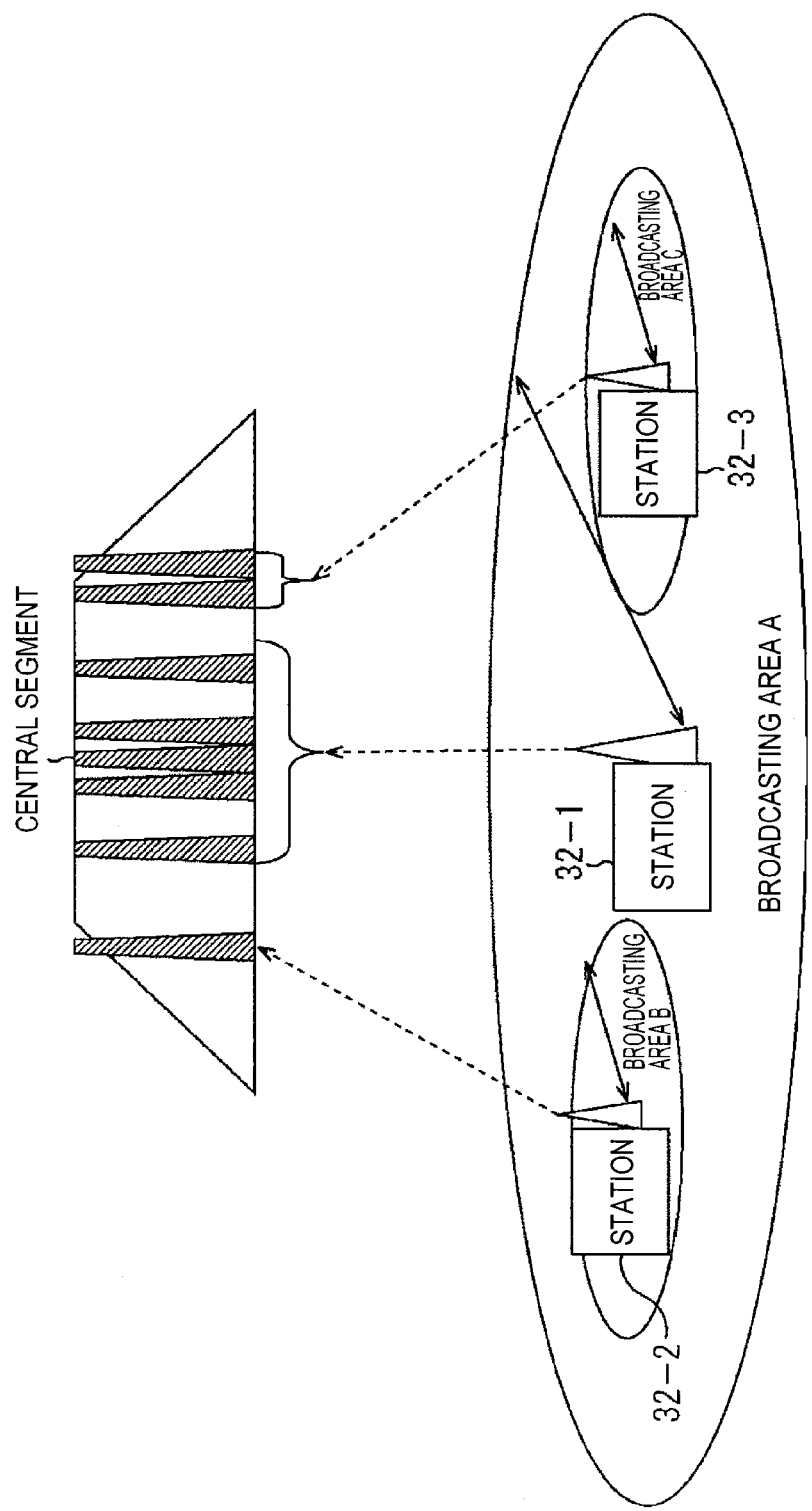
FIG. 6 is a diagram illustrating an example of allocation of segments used in arbitrary one-seg broadcasting.

FIG. 6 is a diagram illustrating an example of allocation of segments used in arbitrary one-seg broadcasting.

As segments to be used in area-limited broadcasting that is arbitrary one-seg broadcasting, the station 32 can allocate an arbitrary segment of an idle channel; however, when a certain station has one or more other stations under its umbrella, so to speak, the central segment can be allocated to the aforementioned certain station.

In other words, when, for example, the station 32-1 is a so-called center station that has a predetermined area as the broadcasting area A, the stations 32-2 and 32-3 are each so-called local stations which have a building and an amusement park as broadcasting areas B and C within their areas, and the broadcasting area A includes the broadcasting areas B and C as shown in FIG. 6, one or more segments including the central segment of a predetermined idle channel are allocated to the station 32-1 serving as the center station, and segments other than the segments of the idle channel that have been allocated to the station 32-1 can be allocated to the stations 32-2 and 32-3 serving as local stations.

[Tuning Information Acquisition Method]

Figure 7:
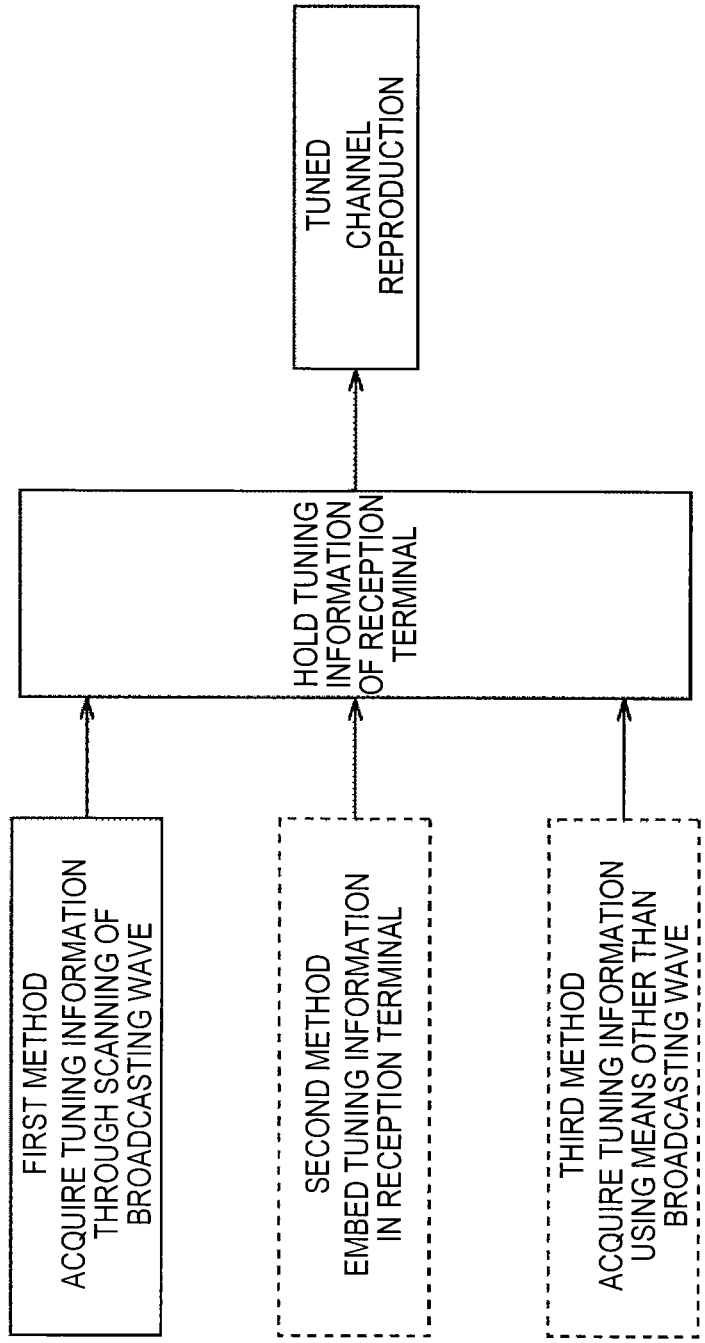
FIG. 7 is a diagram for describing a tuning information acquisition method of area-limited broadcasting.

FIG. 7 is a diagram for describing a tuning information acquisition method of area-limited broadcasting.

As shown in FIG. 7, as tuning information acquisition methods of area-limited broadcasting, there are mainly three methods, that is, first, second and third methods.

The first method is a method of acquiring tuning information through channel scanning in which broadcasting waves of terrestrial digital broadcasting are scanned.

In the first method, the reception terminal 33 performs tuning to each segment of each physical channel of terrestrial digital broadcasting, and then acquires tuning information of receivable area-limited broadcasting.

According to the first method, a user who possesses the reception terminal 33 can acquire tuning information of receivable area-limited broadcasting automatically, with no need to think about whether there is an area-limited broadcasting receivable at his or her position.

In the first method, however, the user should perform tuning to each segment of each physical channel of the terrestrial digital broadcasting each time he or she moves, and thus it takes time to acquire the tuning information of receivable area-limited broadcasting.

The second method is a method of embedding tuning information (causing the information to be stored in advance) in the reception terminal 33.

In the second method, since tuning information is stored in the reception terminal 33 in advance, no time is necessary for acquiring the tuning information.

However, even if the user possessing the reception terminal 33 operates the terminal to tune it to a certain logical channel from the tuning information stored in advance, there are cases in which it is not possible to receive the logical channel (of area-limited broadcasting) outside the broadcasting area of the logical channel.

The third method is a method of acquiring tuning information through means other than broadcasting waves, i.e., for example, communication though the Internet, communication using non-contact integrated circuit (IC) cards, or the like.

According to the third method, tuning information can be acquired more quickly than in the first method.

In the third method, however, even if a user possessing the reception terminal 33 operates the terminal to tune it to a certain logical channel, there are cases in which it is likewise not possible to receive the logical channel as in the second method.

As described above, it takes time in the first method in which channel scanning is performed to be tuned to each segment of each physical channel of terrestrial digital broadcasting to acquire tuning information in comparison to the second and third methods.

Therefore, a method of the reception terminal 33 for acquiring tuning information more quickly through channel scanning will be described.

[Description of NITs and SDTs that the Station 32 Transmits]

Figure 8:
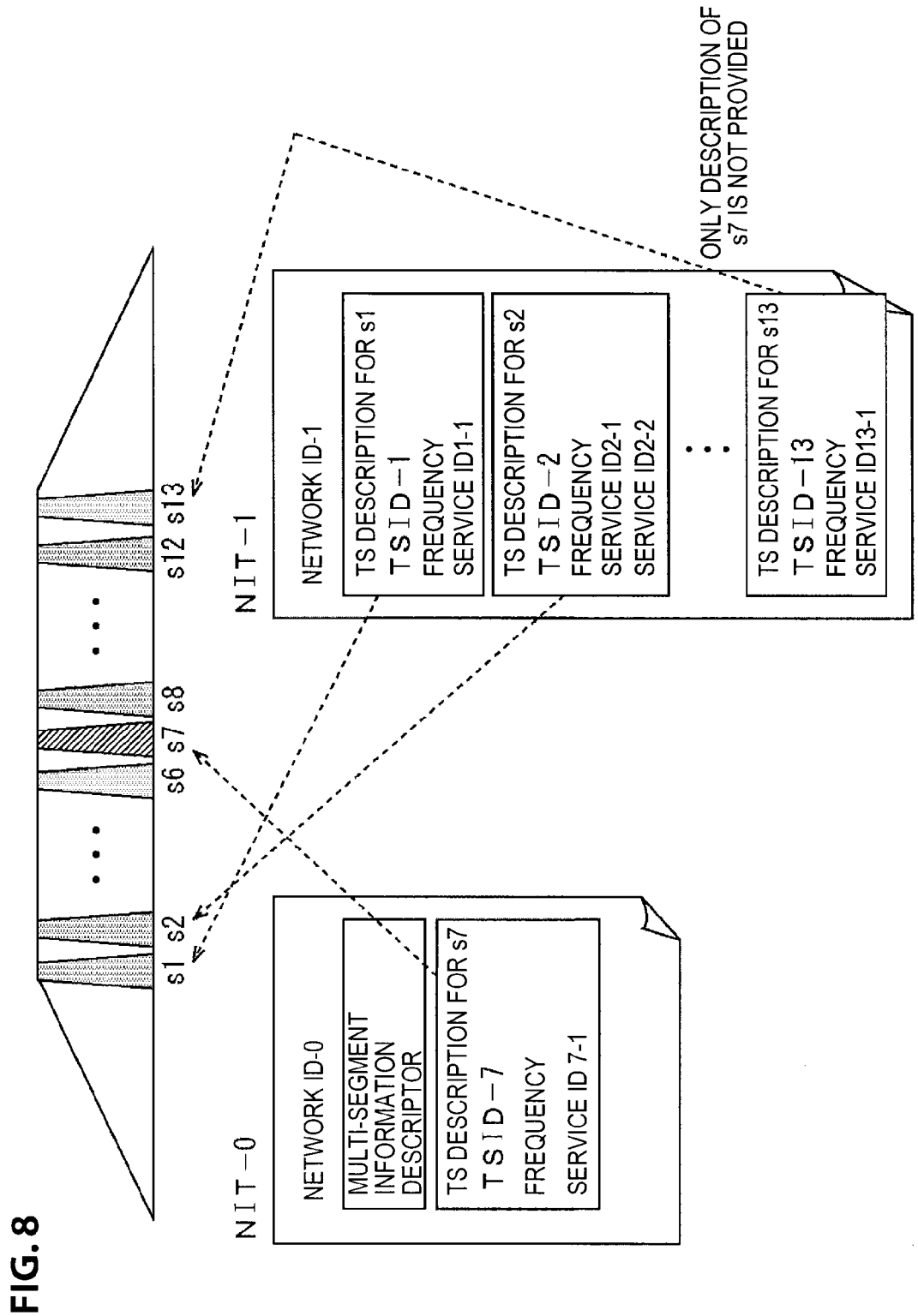
FIG. 8 is a diagram for describing NITs transmitted with the central segment of a physical channel for area-limited broadcasting.

FIG. 8 is a diagram for describing NITs that the station 32 of FIG. 4 transmits.

When, for example, area-limited broadcasting that is receivable in a certain broadcasting area is assumed to be performed currently with each of 13 segments s1 to s13 included in a physical channel, the station 32 to which the central segment is allocated transmits the following NIT-0 and an NIT-1 on the central segment s7.

The NIT-0 includes a network ID, a multi-segment information descriptor, and information regarding a TS of the central segment s7 (which will be referred to hereinafter as TS information).

Note that the multi-segment information descriptor is a descriptor indicating that arbitrary one-seg broadcasting is performed with a segment of a physical channel including the central segment s7.

In addition, the TS information of the central segment s7 includes a TSID of the TS of the central segment s7, a frequency of the central segment s7, a service ID of a broadcasting service of the central segment s7, and the like.

The NIT-1 includes a network ID, and TS information of segments other than that of the central segment s7, that is, that of the segments s1 to s6 and s8 to s13. Note that the network ID of the NIT-0 and the network ID of the NIT-1 are different from each other. In the example of FIG. 8, the network ID of the NIT-0 is 0, and the network ID of the NIT-1 is 1.

FIG. 9 is a diagram for describing NITs and SDTs transmitted on each segment.

The NIT-0 is transmitted in the central segment s7 as the NIT-actual that describes the NIT of the self-segment as shown in FIG. 9.

The NIT-1 is transmitted on the central segment s7 as the NIT-other that describes NITs of segments other than the central segment s7 that is the self-segment (which will be referred to hereinafter as non-central segments) of the physical channel of the central segment s7.

In addition, on the central segment s7, an SDT of the central segment s7 is transmitted as SDT-actual that describes the SDT of the self-segment. Further, on the central segment s7, SDTs of the non-central segments s1 to s6 and s8 to s13 are transmitted as SDT-other that describes the SDTs of the non-central segments.

On the non-central segments s1 to s6 and s8 to s13, the NIT-1 is transmitted as the NIT-actual, but nothing is transmitted as the NIT-other. In addition, on the non-central segments s1 to s6 and s8 to s13, the SDTs of the self-segments s1 to s6 and s8 to s13 are each transmitted as the SDT-actual, but nothing is transmitted as the SDT-other.

As described above, when the NITs and the SDTs are received in transmission, the reception terminal 33 is tuned to the central segments of the respective physical channels of terrestrial digital broadcasting in ascending order of frequency.

Then, when the reception terminal 33 can receive TSs with the central segments, the terminal acquires NITs and SDTs of area-limited broadcasting broadcast with the central segments from the NIT-actual and the SDT-actual of the TSs.

The reception terminal 33 ascertains whether area-limited broadcasting that is arbitrary one-seg broadcasting is performed or normal one-seg broadcasting is performed based on presence or absence of the multi-segment information descriptor of the NITs acquired from the NIT-actual of the TSs of the central segments.

When area-limited broadcasting is ascertained to be performed, the reception terminal 33 acquires the NITs and the SDTs of area-limited broadcasting that is broadcast with the non-central segments from the NIT-other and the SDT-other of the TSs received with the central segments.

The reception terminal 33 creates a tuning table that includes tuning information of the area-limited broadcasting from the NITs and the SDTs acquired as described above.

As described in FIGS. 8 and 9, since not only the NIT-actual and the SDT-actual but also the NIT-other and the SDT-other are arranged in the TSs of the central segments, the reception terminal 33 can acquire all NITs and SDTs of the area-limited broadcasting of all physical channels that have the central segments only by performing tuning to the central segments of each of the physical channels in order.

Thus, the reception terminal 33 can acquire tuning information of the area-limited broadcasting quickly.

Note that it is not necessary to transmit the NIT-other and the SDT-other on the central segments.

However, when the central segments do not transmit the NIT-other and the SDT-other, it is necessary for the reception terminal 33 to ascertain whether area-limited broadcasting is performed based on presence or absence of the multi-segment information descriptor of the NIT-actual of the central segments, and when area-limited broadcasting is performed, it is necessary to sequentially select the non-central segments and acquire the NIT-actual and the SDT-actual of the non-central segments with which TSs can be received.

Here, the NIT-actual includes information relating to a network on which the NIT-actual is transported, and the NIT-other includes information relating to a different network from the aforementioned network on which the NIT-other is transported. In addition, the SDT-actual includes information relating to a service of a network on which the SDT-actual is transmitted, and the SDT-other includes information relating to a service of a different network from the aforementioned network on which the SDT-other is transported.

Figure 10:
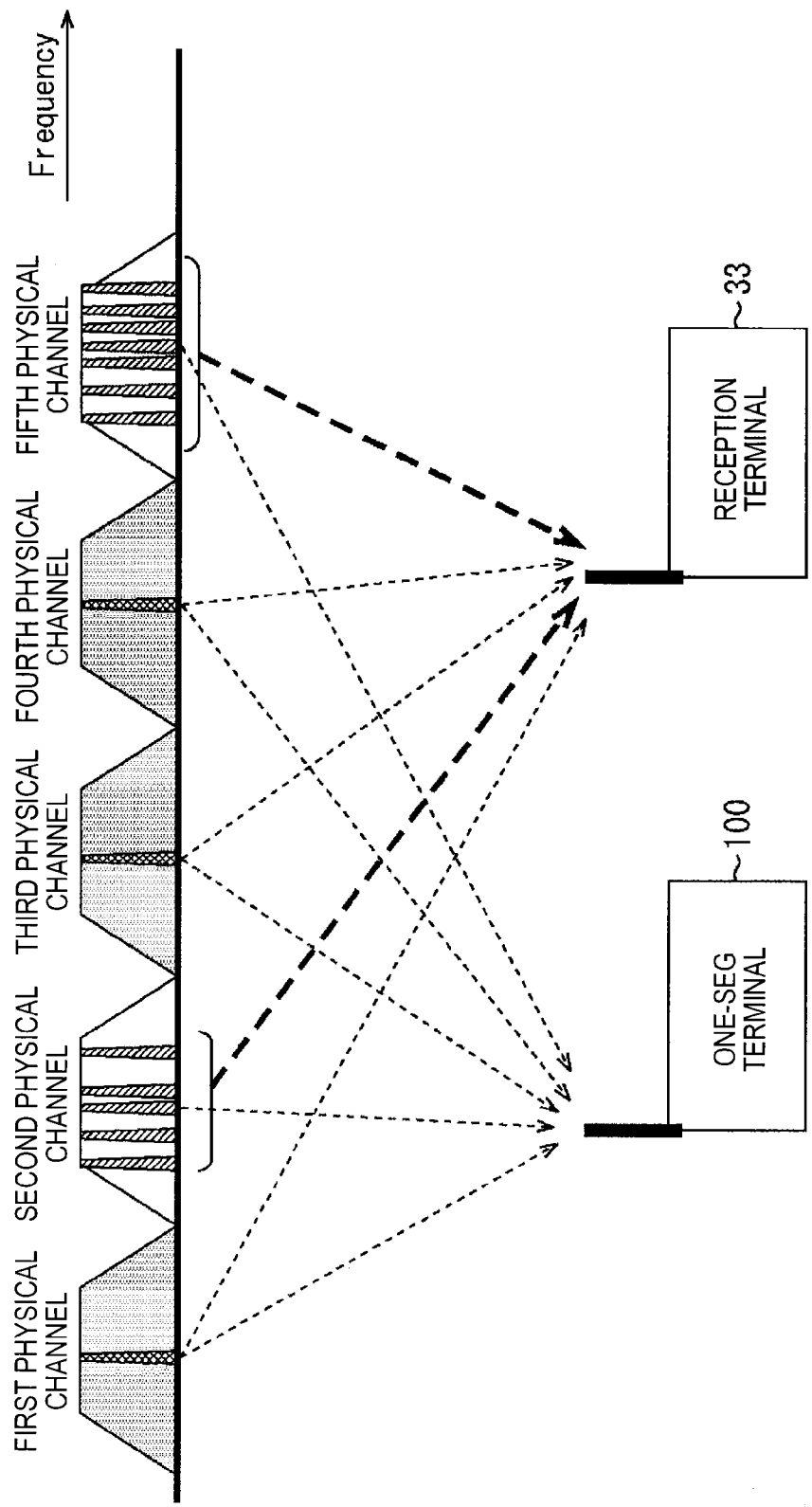
FIG. 10 is a diagram illustrating channel scanning of each of a reception terminal 33 and a normal one-seg terminal 100.

FIG. 10 is a diagram illustrating channel scanning of the respective reception terminal 33 of FIG. 4 and normal one-seg terminal 100 which is a reception terminal of the related art receiving normal one-seg broadcasting.

The reception terminal 33 and the normal one-seg terminal 100 of the related art, for example, perform tuning to the central segments of respective physical channels in ascending order of frequency, acquire tuning information, and then create tuning tables.

Since the normal one-seg terminal 100 does not respond to area-limited broadcasting (arbitrary one-seg broadcasting), it ignores multi-segment information descriptors of the NIT-actual arranged in TSs of the central segments of the physical channels to which the area-limited broadcasting is allocated. Thus, the normal one-seg terminal 100 does not malfunction, but is not capable of acquiring the NIT-other and the SDT-other.

As a result, the normal one-seg terminal 100 acquires tuning information from the NITs and the SDTs of normal one-seg broadcasting and area-limited broadcasting of the central segments of the physical channels as shown in FIG. 10.

On the other hand, the reception terminal 33 responds to area-limited broadcasting, ascertains the multi-segment information identifiers of the NIT-actual arranged in the TSs of the central segments of the physical channels to which the area-limited broadcasting is allocated, and thus acquires the NIT-other and the SDT-other in addition to the NIT-actual and the SDT-actual.

As a result, the reception terminal 33 can acquire the tuning information from all NITs and SDTs of one-seg broadcasting and area-limited broadcasting allocated to the physical channels.

FIG. 11 is a diagram illustrating an example of a tuning table created by the reception terminal 33 and a tuning table created by the normal one-seg terminal in the example of FIG. 10.

A of FIG. 11 shows the tuning table created by the reception terminal 33.

In the tuning table created by the reception terminal 33, first, a service name "one-seg service 1," a service ID "ID1," and a frequency "F1" of the normal one-seg broadcasting allocated to the central segment of the first physical channel of FIG. 10 are registered.

Next, service names "community service 1" to "community service 5," services IDs "ID2" to "ID6," and frequencies "F2" to "F6" of the area-limited broadcasting are respectively registered for five segments allocated to the second physical channel therein.

In addition, a service name "one-seg service 2," a service ID "ID7," and a frequency "F7" of the normal one-seg broadcasting allocated to the central segment of the third physical channel are registered.

Then, service names, service IDs, and frequencies of the normal one-seg broadcasting allocated to the central segment of the fourth physical channel and the area-limited broadcasting for seven segments allocated to the fifth physical channel are registered as well.

B of FIG. 11 shows a tuning table created by the normal one-seg terminal 100.

In the tuning table created by the normal one-seg terminal 100, first, the service name "one-seg service 1," the service ID "ID1," and the frequency "F1" of the normal one-seg broadcasting allocated to the central segment of the first physical channel are registered as in the tuning table created by the reception terminal 33.

Next, the service name "community service 1," the service ID "ID2," and the frequency "F2" of the area-limited broadcasting allocated to the central segment of the second physical channel are registered.

Then, as in the tuning table created by the reception terminal 33, the service name "one-seg service 2," the service ID "ID7," and the frequency "F7" of the normal one-seg broadcasting allocated to the central segment of the third physical channel are registered.

Then, service names, service IDs, and frequencies of normal one-seg broadcasting allocated to the central segment of the fourth physical channel and area-limited broadcasting allocated to the central segment of the fifth physical channel are registered as well.

As described above, in the normal one-seg terminal 100 of the related art, tuning information of area-limited broadcasting of non-central segments is not acquired or registered in the tuning table, but tuning information of the central segments can be acquired and registered in the tuning table.

Thus, as described in FIGS. 8 and 9, even though the NITs and the SDTs are transmitted, reception of normal one-seg broadcasting by the normal one-seg terminal 100 of the related art is not obstructed.

[Broadcasting Area and Motion Lines of a User]

Figure 12:
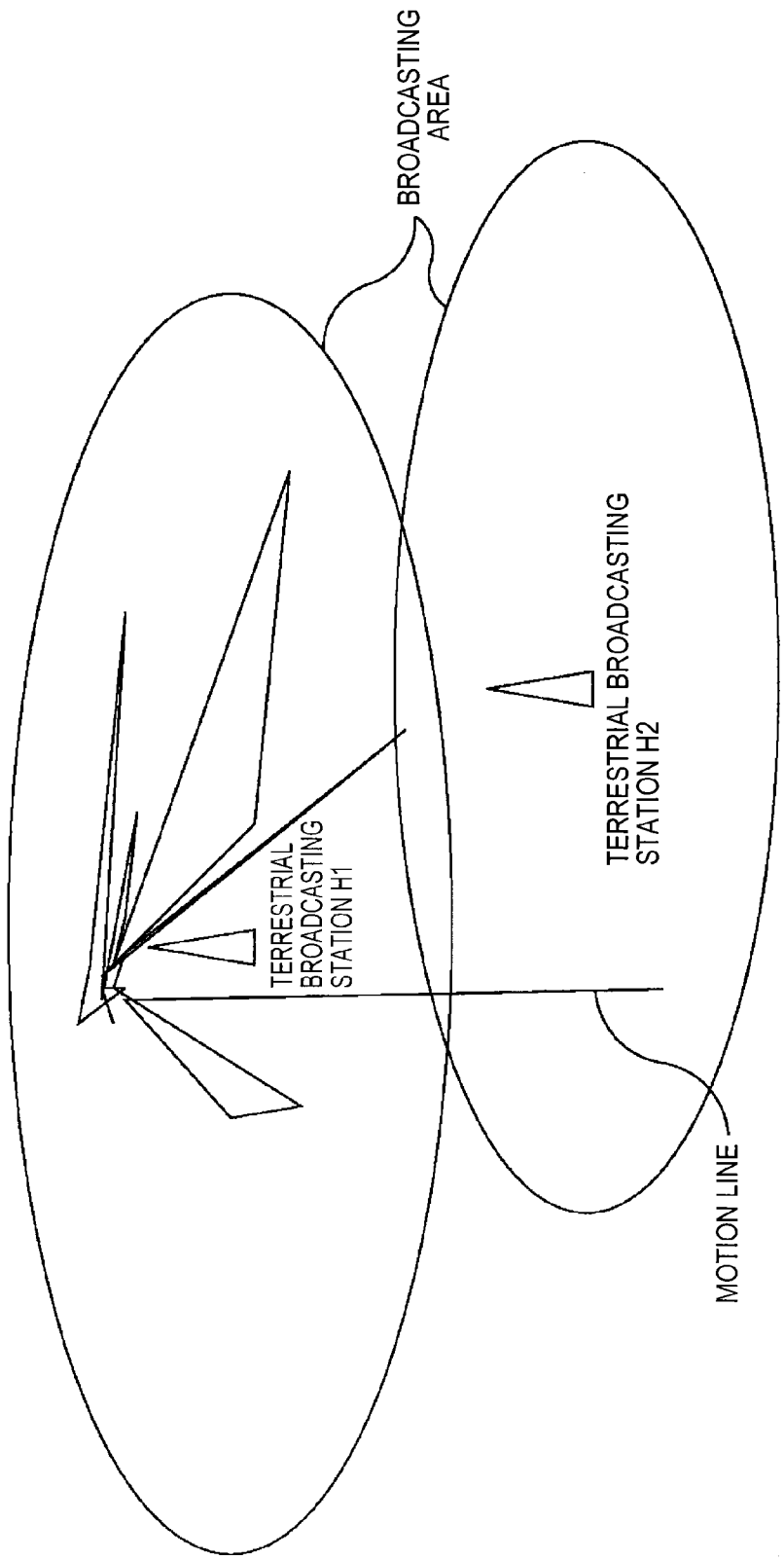
FIG. 12 is a diagram illustrating broadcasting areas of normal one-seg broadcasting and motion lines, each of which is a trajectory of a movement of a user who possesses a normal one-seg terminal 100 that only receives normal one-seg broadcasting.

FIG. 12 is a diagram illustrating broadcasting areas of terrestrial digital broadcasting (normal one-seg broadcasting) and motion lines, each of which is a trajectory of a movement of a user who possesses a normal one-seg terminal 100 of the past that only receives normal one-seg broadcasting.

Since a broadcasting area of normal one-seg broadcasting is wide, a user possessing the normal one-seg terminal 100 of the related art mostly moves within the broadcasting area of a specific terrestrial broadcasting station H1 as a living space in his or her daily life, and seldom moves to a broadcasting area of a terrestrial broadcasting station H2 other than the aforementioned broadcasting area.

Thus, in the normal one-seg terminal 100 possessed by the user, for whom most motion occurs within the broadcasting area of the terrestrial broadcasting station H1 and some remaining motions occur within the broadcasting area of the terrestrial broadcasting station H2 as shown in FIG. 12, by registering tuning information of the normal one-seg broadcasting by the terrestrial broadcasting station H1 in a tuning table, (a service name of) the normal one-seg broadcasting by the terrestrial broadcasting station H1 that is receivable in most cases can be presented to the user as (a service name of) normal one-seg broadcasting to which the user can perform tuning.

Note that, in the normal one-seg terminal 100, by registering tuning information of normal one-seg broadcasting by the terrestrial broadcasting station H2 in the tuning table in addition to the tuning information of the normal one-seg broadcasting by the terrestrial broadcasting station H1, the normal one-seg broadcasting by the respective terrestrial broadcasting stations H1 and H2 can be presented to the user as normal one-seg broadcasting to which the user can perform tuning.

In this case, however, when the user possessing the normal one-seg terminal 100 is in the broadcasting area of the terrestrial broadcasting station H1, even though the normal one-seg broadcasting of the terrestrial broadcasting station H2 is tuned, it is not possible to receive the normal one-seg broadcasting of the terrestrial broadcasting station H2.

In the same manner, when the user possessing the normal one-seg terminal 100 is in the broadcasting area of the terrestrial broadcasting station H2, even though the normal one-seg broadcasting of the terrestrial broadcasting station H1 is tuned, it is not possible to receive the normal one-seg broadcasting of the terrestrial broadcasting station H1.

In order to only present receivable normal one-seg broadcasting to the user in the normal one-seg terminal 100, it is necessary to register the tuning information of the normal one-seg broadcasting performed by the terrestrial broadcasting station H1 and the tuning information of the normal one-seg broadcasting performed by the terrestrial broadcasting station H2 in divided tuning tables, and for the user to (perform an operation to) switch the tuning tables to be used in tuning as needed.

Since the broadcasting area of normal one-seg broadcasting is wide as described above, frequency of a user moving from a broadcasting area that includes his or her living space in daily lives to another broadcasting area is extremely low.

Thus, cases in which a tuning table to be used in tuning should be switched are rare, and the number of tuning tables that should be divided to register tuning information therein is small, and thus switching of tuning tables is easy.

FIG. 13 is a diagram illustrating broadcasting areas of area-limited broadcasting and motion lines that are trajectories of movements of a user who possesses a reception terminal 33 that can receive area-limited broadcasting.

Since a broadcasting area of area-limited broadcasting is small, many stations are densely installed in the range that is not very wide, and as a result, the user possessing the reception terminal 33 is expected to frequently move between broadcasting areas of the many stations.

Therefore, (a logical channel of) area-limited broadcasting that is receivable by the reception terminal 33 is expected to be frequently changed while the user moves in his or her living space.

If tuning information of many area-limited broadcasts is registered in many divided tuning tables and the user switches the tuning tables to be used in tuning when necessary in order to only present receivable area-limited broadcasting to the user in the reception terminal 33 as in the normal one-seg terminal 100 described in FIG. 12, it is necessary for the user to switch the tuning tables to be used in tuning with respect to the many tuning tables, and thus switching frequency is expected to be high.

Thus, it is not realistic for the reception terminal 33 to divide and register tuning information of many area-limited broadcasts in many divided tuning tables and to cause a user to switch the tuning tables to be used in tuning.

In addition, for example, area-limited broadcasting performed at an event site or the like is expected to have a limited period for broadcasting and broadcasting time zone, and thus there can be cases in which it is possible or not possible to receive an area-limited broadcast even within a broadcasting area of a certain station.

Thus, even though tuning information of an area-limited broadcast is embedded in the reception terminal 33 in advance as limited-permanent information, tuning information of an area-limited broadcast of which a broadcasting period has elapsed becomes useless, and thus it is difficult for the terminal to respond to an area-limited broadcast that will start in the future.

On the other hand, even if the reception terminal 33 has performed channel scanning described in FIG. 10 and thereby acquired tuning information of a receivable area-limited broadcast in that time, when the user moves or time elapses thereafter, it is not possible at all times for the terminal to receive an area-limited broadcast that corresponds to the tuning information acquired in the channel scanning of the past.

Therefore, in order to present an area-limited broadcast that is receivable at a position at which the user is present at that time to the user as a user's tunable area-limited broadcast, for example, it is necessary to acquire tuning information of the receivable area-limited broadcast by performing channel scanning at all times (or at short intervals).

In the channel scanning described in FIG. 10, however, although it is possible to quickly acquire tuning information in comparison to channel scanning performed to set each segment of each physical channel of terrestrial digital broadcasting to be tuned, it nonetheless takes some degree of time.

Therefore, it is not realistic to perform channel scanning at all times.

Thus, in order to present a receivable area-limited broadcast to a user quickly, station information regarding a station that transmits broadcasting waves of one-segment broadcasting on an arbitrary segment is provided to the reception terminal 33, and then the reception terminal 33 selects the station 32 of receivable area-limited broadcasting as a tunable station to be tuned using the station information.

[Description of Station Information]

FIG. 14 is a diagram for describing station information.

The station information includes a station ID, an area code, a signal format, a transmission information flag, a transmission-point-corresponding flag, an additional information flag, a transmission output, transmitting station latitude, transmitting station longitude, transmitting station altitude, an area pattern bitmap, a receivable distance, a receivable distance unit, an open air flag, a closed space flag, a mobile station flag, a frequency tag, additional information, and the like.

The station ID (station_id) is a unique ID for identifying each station 32 in units of TSs (units of segments). The reception terminal 33 retains and manages the station information based on the station ID.

The area code (area_code) is an ID for identifying a location of the station 32 that is identified with the station ID, and for example, the municipal code of the location can be employed.

The signal format (signal_format) indicates the format of a signal of a broadcasting wave of area-limited broadcasting. Based on the signal format, the reception terminal 33 identifies segment configurations and specifications of a broadcasting stream. As the segment configurations, for example, the following formats 1 to 4 are designated as shown in FIG. 15.

1: One-seg transmission
 2: Full-seg transmission with null values
 3: Full-seg transmission
 4: Non-central one-seg transmission Here, the "one-seg transmission" is a segment configuration to perform transmission only using the central segment among the 13 segments of a physical channel.

In addition, the "full-seg transmission with null values" is a segment configuration to perform transmission also using 12 non-central segments, in addition to the central segment. In the 12 segments, however, TSs are transmitted as null values.

The "full-seg transmission" is a segment configuration to perform transmission also using the 12 non-central segments, in addition to the central segment. In the "full-seg transmission," however, TSs that contain broadcasting signals are also transmitted on the 12 non-central segments, different from the "full-seg transmission with null values."

In addition, "non-central one-seg transmission" is a segment configuration to perform transmission only using one arbitrary segment among 12 segments other than the central segment.

The stations 32 perform area-limited broadcasting in any of the four segment configurations described above.

In addition, currently used reception terminals (current reception terminals) are not applicable to all of the segment configurations. Here, if a specification applicable to a current reception terminal is set to a "basic specification," and a specification applicable to an advance reception terminal with a more advanced function than the current reception terminal is set to an "extended specification" or "advanced specification," a relation between a reception terminal and a segment configuration is defined as shown in "Variations of Stream Specification" of FIG. 15.

Note that the "extended specification" refers to a specification obtained by extending the specification applicable to an advanced reception terminal to be a specification of improvement in a codec. In addition, the "advanced specification" refers to a specification applicable to a service in which downloaded broadcasting content that is a so-called time-shift broadcast is a view target. For this reason, a reception terminal corresponding to the "advanced specification" is described as a "download (DL)-corresponding advanced reception terminal" and a reception terminal corresponding to the "extended specification" is described as a "non-download (DL)-corresponding advanced reception terminal" in FIG. 5.

As shown in FIG. 15, when a segment configuration is the "one-seg transmission" or "full-seg transmission with null values," an area-limited broadcasting of that configuration is receivable by any of a current reception terminal, a non-DL-corresponding advanced reception terminal, and a DL-corresponding advanced reception terminal.

In addition, when a segment configuration is the "full-seg transmission," broadcasting using the central segment or 12 segments other than the central segment is receivable by any of a current reception terminal, a non-DL-corresponding advanced reception terminal, and a DL-corresponding advanced reception terminal.

On the other hand, when a segment configuration is "non-central one-segment transmission," an area-limited broadcasting of the configuration is receivable by a non-DL-corresponding advanced reception terminal, and a DL-corresponding advanced reception terminal.

As described above, a current reception terminal can receive area-limited broadcasting having a segment configuration of the "one-seg transmission," "full-seg transmission with null values," and "full-seg transmission," but is not capable of receiving area-limited broadcasting of the "non-central one-seg transmission." In addition, a non-DL-corresponding advanced reception terminal, and a DL-corresponding advanced reception terminal can respond to all segment configurations.

Figure 16:
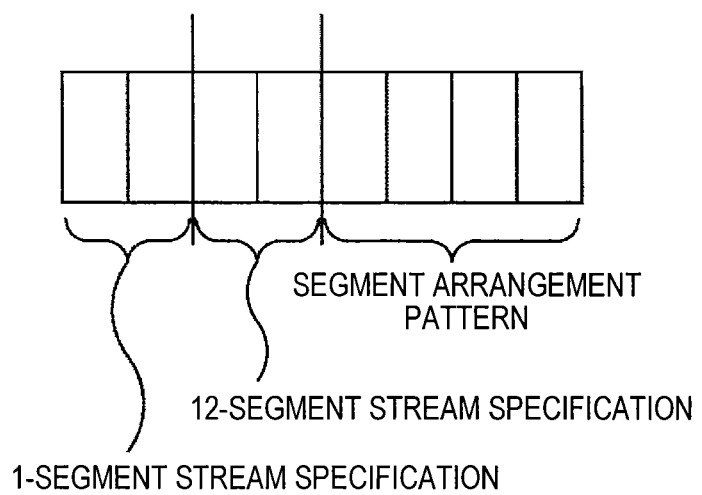
FIG. 16 is a diagram illustrating an example of allocation of bits in a signal format.

In addition, as shown in FIG. 16, 8 bits (each square of the drawing indicates a bit) are allocated for transmission of a signal format; however, the first 2 bits of the 8 bits are arranged for information regarding the specification of one-segment streams, the next 2 bits for information regarding the specification of 12-segment streams, and the next 4 bits for information regarding a segment arrangement pattern in order.

As the information regarding the specification of one-segment streams, a value corresponding to the specification when transmission is performed using one segment is designated. Thus, in all segment configurations, a value corresponding to any specification of the "basic specification," "extended specification," or "advanced specification" is designated in the first 2 bits.

As the information regarding the specification of 12-segment streams, a value corresponding to a specification when transmission is performed using the 12 segments is designated. Thus, a value corresponding to any specification of the "basic specification," "extended specification," or "advanced specification" is designated for the next two bits only when a segment configuration is the "full-seg transmission."

As the information regarding the segment arrangement pattern, a value corresponding to a segment configuration of any of the "one-seg transmission," "full-seg transmission with null values," "full-seg transmission," and "non-central one-seg transmission" (for example, a value corresponding to 1 to 4) is designated.

Based on the above-described signal format, the reception terminal 33 identifies specifications of a segment configuration and a broadcasting stream, and further determines whether it is a signal of a broadcasting wave of receivable area-limited broadcasting.

Note that, although the "basic specification," "extended specification," and "advanced specification" are described as specifications corresponding to the reception terminal 33 in the example of FIG. 15, the classification of the specifications is an example, and the specifications may be further classified into other specifications.

In addition, in the embodiment of the present technology, a case in which the "one-seg transmission" is designated as a segment configuration will be described for the sake of convenience in description.

Returning to FIG. 14, the transmission information flag (emission_info_flag) is a flag indicating whether or not there is transmission information. When there is transmission information, the transmission information flag is set.

Note that the transmission information includes, for example, a transmission output, transmitting station latitude, transmitting station longitude, transmitting station altitude, an area pattern bitmap, a receivable distance, a receivable distance unit, an open air flag, a closed space flag, a mobile station flag, and a frequency tag.

The transmission-point-corresponding flag (emission_point_flag) is a flag indicating whether or not transmission information corresponds to a transmission point when there is transmission information. When the transmission information corresponds to the transmission point, a transmission-point-corresponding flag is set.

The additional information flag (additional_info_flag) is a flag indicating whether or not there is additional information. When there is additional information, the additional information flag is set.

The transmission output (emission_power) is a transmission output (power (mW)) of a broadcasting wave from the station 32 identified with the station ID.

Based on a positional relation between a transmission output and the station 32, the reception terminal 33 can determine whether or not (a signal of) a broadcasting wave of area-limited broadcasting is receivable. In actuality, however, since a transmission output depends on directivity of radio waves (broadcasting waves) or various propagation conditions of radio waves, there are cases in which (it is highly likely that) it is not possible to (satisfactorily) receive area-limited broadcasting, and thus it is assumed to be absolutely used accessorily.

The transmitting station latitude (station_latitude), transmitting station longitude (station_longitude), and transmitting station altitude (station_height) are position information indicating a position (location) of the station 32 identified with the station ID, including the latitude, longitude, and altitude of the location of the station 32 identified with the station ID.

The transmitting station latitude and transmitting station longitude indicate north latitude and east longitude respectively, and are expressed in units of, for example, 0.00001 degrees (which is equivalent to about 1 m of precision). In addition, the transmitting station altitude indicates altitude from a ground surface, or a height such as an elevation, and is expressed in units of, for example, 1 m.

Note that, when there are a plurality of transmission points (antennas) in the station 32, the pieces of transmission information from the transmission output to the frequency tag of FIG. 14 are described individually in loops with regard to all of the plurality of present transmission points. Alternatively, any of the transmission points or a representative reference point such as a center point of the plurality of transmission points may be designated as a transmission point.

For example, when the reception terminal 33 has a Global Positioning System (GPS) function, the transmitting station latitude, transmitting station longitude, and transmitting station altitude are assumed to be used in displaying a position of the station 32 on a map, a function of notifying the terminal of a reception possibility based on a relative distance to the station 32, or the like, in addition to determination of whether or not (a signal of) a broadcasting wave of area-limited broadcasting is receivable.

The area pattern bitmap (area_pattern_bitmap) is information indicating directivity of radio waves (broadcasting waves) transmitted in each direction from the station 32. All directions from a transmission point (antenna) of the station 32 are divided into, for example, 16 sections, radio waves transmitted in each of the directions are measured, values indicating directivity thereof are expressed using 2 bits, and thereby an area pattern bitmap is created.

Figure 17:
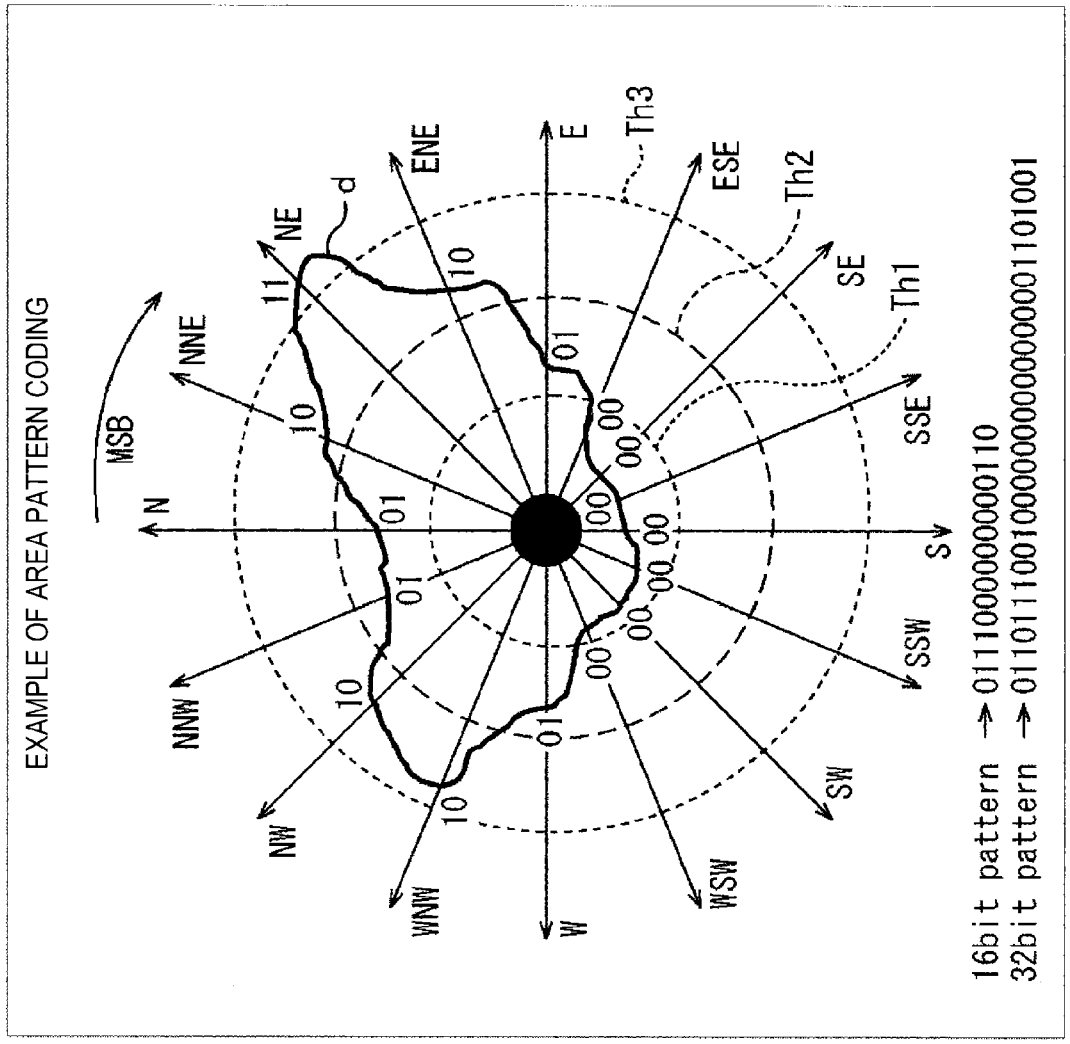
FIG. 17 is a diagram illustrating an example of coding of an area pattern.

FIG. 17 is a diagram showing an example of coding of an area pattern. Note that, in the example of FIG. 17, a value d that indicates directivity of each direction in a two-dimensional plane formed by x and y axes which is obtained by omitting a z dimension from a three-dimensional space is shown for the sake of convenience of description.

As shown in FIG. 17, the value d indicating directivity of radio waves (broadcasting waves) measured in each direction is compared to respective threshold values Th1, Th2, and Th3 in 16 directions of north (N), north-northeast (NNE), northeast (NE), east-northeast (ENE), east (E), east-southeast (ESE), southeast (SE), south-southeast (SSE), south (S), south-southwest (SSW), southwest (SW), west-southwest (WSW), west (W), west-northwest (WNW), northwest (NW), and north-northwest (NNW), and values indicating directivity of each direction are expressed by 2 bits.

For example, the value d indicating directivity to the east-southeast (ESE), southeast (SE), south-southeast (SSE), south (S), south-southwest (SSW), southwest (SW), and west-southwest (WSW) satisfies d≤Th1, and thus is expressed by two bits of "00." In addition, the value d indicating directivity to the north (N), east (E), west (W), and north-northwest (NNW) satisfies Th1<d≤Th2, and thus is expressed by two bits of "01."

In addition, for example, the value d indicating directivity to the north-northeast (NNE), east-northeast (ENE), west-northwest (WNW), and northwest (NW) satisfies Th2<d≤Th3, and thus is expressed by 2 bits of "10." Further, the value d indicating directivity to the northeast (NE) satisfies Th3<d, and thus is expressed by 2 bits of "11."

When the bits of the directions are disposed clockwise from the north (N) in order of most significant bits (MSB), it is possible to express the bits in a 16-bit pattern of "0111000000000110" as shown in the lower part of FIG. 17. In addition, when the bits of the directions are disposed clockwise from the north (N), it is also possible to express the bits in a 32-bit pattern of "01101110010000000000000001101001."

Note that, although 16-bit and 32-bit patterns are shown as area pattern bitmaps in this example, other patterns, for example, a 48-bit pattern or the like, can also be employed. By increasing the number of bits of a pattern, for example, it is possible to increase the number of divided directions, and the number of allocated bits corresponding to directivity of each direction.

The area pattern bitmap is assumed to be used when, for example, a tunable station is selected from the stations 32 transmitting broadcasting waves of area-limited broadcasting.

Returning to FIG. 14, the receivable distance (max_distance) indicates a range in which broadcasting waves of area-limited broadcasting from the station 32 set in advance are receivable. The receivable distance is expressed by a distance from a transmission point (antenna) of the station 32 in a unit designated based on a receivable distance unit (for example, in units of 10 m). However, when "0" is designated as a receivable distance, it means that no receivable distance is designated.

The receivable distance is assumed to be used when, for example, a tunable station is selected from the stations 32 transmitting broadcasting waves of area-limited broadcasting.

Note that, when there are a plurality of transmission points, receivable distances are individually described for each transmission point in loops; however, a distance from any of the transmission points or a representative reference point such as a center point of the plurality of transmission points may be designated as a receivable distance.

The receivable distance unit (max_distance_unit) indicates a unit of a receivable distance. When, for example, "0" is designated as a receivable distance unit, the receivable distance unit is set to 1 m, and when "1" is designated, the receivable distance unit is set to 10 m.

The open air flag (open_air_flag) is a flag indicating whether or not an outdoor site is a target of a service of area-limited broadcasting. For example, in the case of area-limited broadcasting targeting the area of a specific outdoor facility such as a park, the open air flag is set.

The closed space flag (closed_space_flag) is a flag indicating whether or not an indoor site is a target of the service of area-limited broadcasting. For example, in the case of area-limited broadcasting targeting the area of a specific indoor facility such as a store, the closed space flag is set.

The mobile station flag (station_mobility_flag) is a flag indicating whether or not area-limited broadcasting is broadcast from the station 32 at a fixed position. For example, in the case of area-limited broadcasting targeting the area of the inside of a vehicle such as a train or a bus, the mobile station flag is set.

The frequency tag (frequency tag) is a tag value for designating a frequency for transmission (transmission frequency) that transmission equipment transmitting TSs uses.

Specifically, in the terrestrial delivery system descriptor included in an NIT, the frequency for transmission is described, and thus it is designated based on a tag value indicating a frequency tag. In other words, in the terrestrial delivery system descriptor, only one frequency is described in the case of an SFN operation, but a plurality of frequencies are listed in the case of an MFN operation, and thus, in such a case, any frequency is designated based on a frequency tag.

Herein, the single frequency network (SFN) is a single frequency network on which a frequency of a radio wave of a relay station is set to be the same as a frequency of a radio wave of a master station. Since the same frequency is used in the SFN operations, radio waves can be effectively used.

In addition, the multi-frequency network (MFN) is a multi-frequency network on which different frequencies are allocated to a master station and a plurality of relay stations. In the MFN operation, there is no concern of crosstalk because different frequencies are used, and it has a technical merit of easy adaptation in comparison to the SFN operation.

Figure 18:
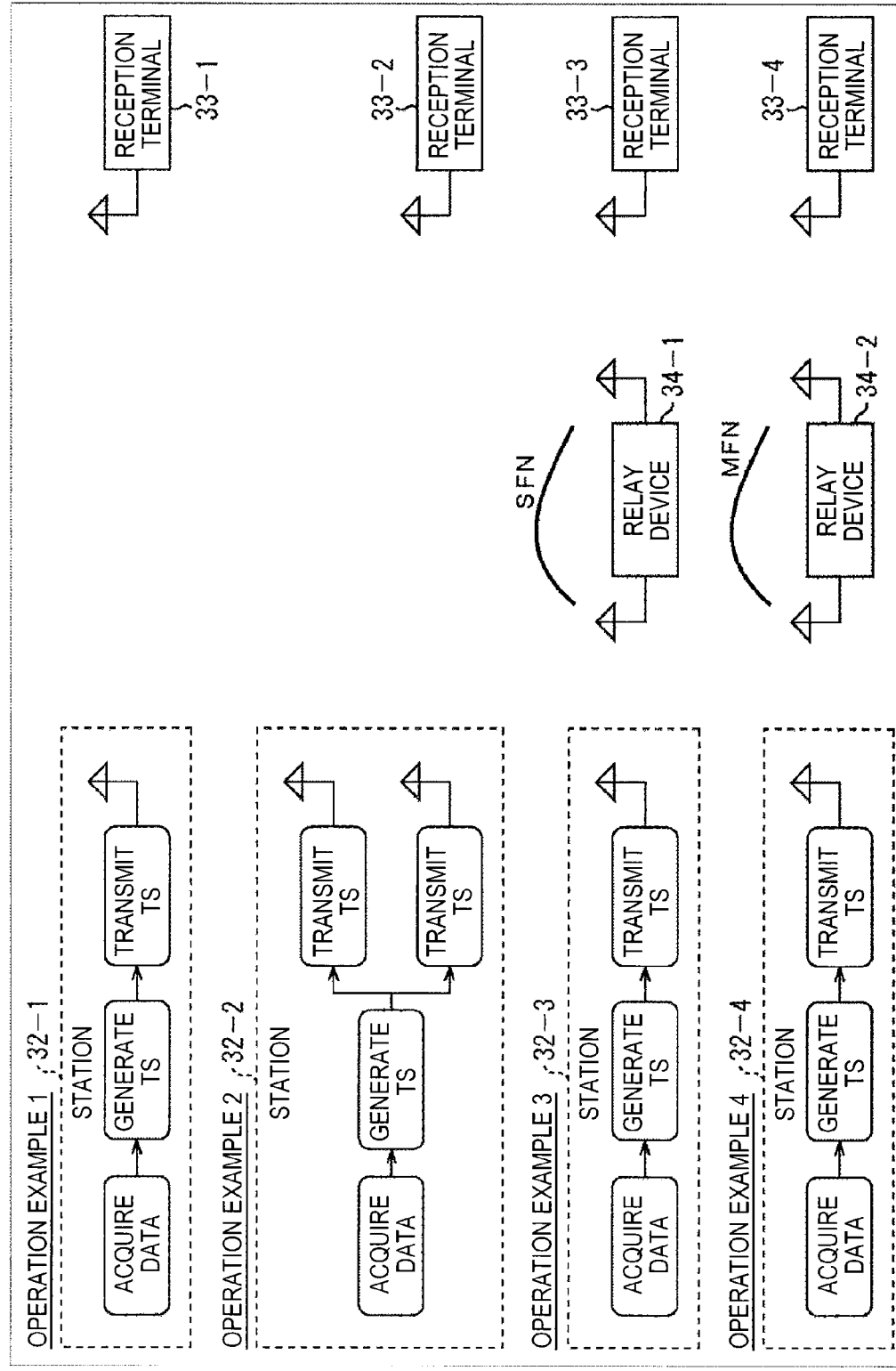
FIG. 18 is a diagram illustrating a specific example of an SFN operation and an MFN operation.

Herein, operation examples of the SFN operation and MFN operation will be described with reference to FIGS. 18 and 19. FIG. 18 illustrates four operation examples.

As shown in FIG. 18, the operation examples 1 and 2 show operations when no relay station is provided. In addition, the operation example 3 shows the SFN operation in which a relay station is provided, and the operation example 4 shows the MFN operation in which a relay station is provided.

In the operation example 1, a reception terminal 33-1 directly receives area-limited broadcasting from the station 32-1.

Specifically, the station 32-1 acquires video data and audio data of area-limited broadcasting from an external server, a camera, and the like, encodes and multiplexes the data, and thereby generates a TS. The generated TS is transmitted from a broadcasting station or an antenna (transmission point) of a transmitting station. No relay station is provided in this operation example, and thus when a user possessing the reception terminal 33-1 is present in the broadcasting area of the station 32-1, the reception terminal 33-1 receives area-limited broadcasting from the station 32-1.

In the operation example 2, a reception terminal 33-2 directly receives area-limited broadcasting from the station 32-2.

Specifically, the station 32-2 generates TSs like the station 32-1, but the generated TSs are transmitted from each of two antennas (transmission points) provided at different locations. No relay station is provided in this operation example either, and thus when the reception terminal 33-2 is present in the broadcasting area of the station 32-2, the terminal receives area-limited broadcasting.

Since the operation example 3 is based on the SFN operation, area-limited broadcasting by the station 32-3 is relayed by the relay device 34-1, and then received by a reception terminal 33-3.

Specifically, the station 32-3 generates TSs like the station 32-1 and transmits them through an antenna. Since a relay station is provided in the operation example, when the reception terminal 33-3 is in the broadcasting area of the relay device 34-1, the reception terminal receives the area-limited broadcasting. However, since the relay device 34-1 operates based on the SFN operation, a frequency for transmission thereof is the same as the frequency for transmission of the station 32-3.

Since the operation example 4 is based on the MFN operation, area-limited broadcasting by the station 32-4 is relayed by the relay device 34-2, and then received by a reception terminal 33-4.

Specifically, the station 32-4 generates TSs like the station 32-1 and transmits them through an antenna. Since a relay station is provided in the operation example, when the reception terminal 33-4 is in the broadcasting area of the relay device 34-2, the reception terminal receives the area-limited broadcasting. However, since the relay device 34-2 operates based on the MFN operation, a frequency for transmission thereof is different from the frequency for transmission of the station 32-4.

Figure 19:
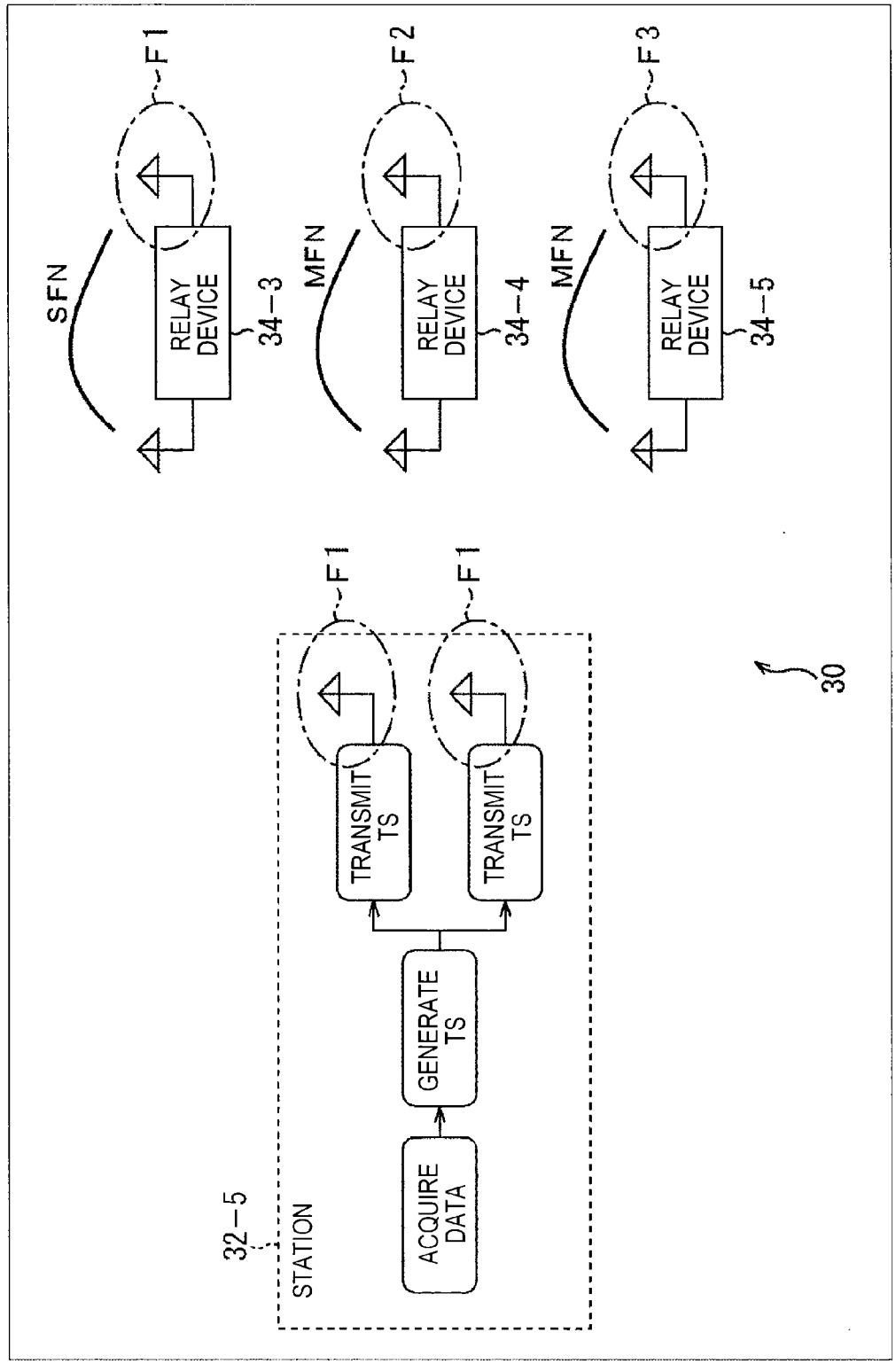
FIG. 19 is a diagram illustrating a specific example of a frequency for reception.

In addition, a detailed example of a relation of frequencies for transmission used at each transmission point in the case of the SFN operation and MFN operation is as shown in FIG. 19. In other words, FIG. 19 shows frequencies for transmission of respective relay devices when the relay devices 34-3 to 34-5 are provided as relay stations, and a station 32-5 generates TSs like the station 32-1 and transmits the same TSs at the same frequency of F1 from two antennas (transmission points) provided at different locations.

In other words, since the relay device 34-3 operates based on the SFN operation, a frequency for transmission of the transmission point thereof is the frequency F1 the same as the station 32-5.

In addition, since the relay device 34-4 operates based on the MFN operation, a frequency for transmission of the transmission point thereof is a frequency F2 different from that of the station 32-5. Furthermore, since the relay device 34-5 operates based on the MFN operation, a frequency for transmission of the transmission point thereof is a frequency F3 different from that of the station 32-5.

As described above, the same frequency is used by the station 32 and the relay device 34 in the SFN operation, but different frequencies are used by the station 32 and the relay devices 34 in the MFN operation, and thus there are cases in which a configuration of the frequencies of the transmission points becomes complicated. Thus, by defining a frequency tag in station information, a frequency for transmission is set to be designated for each transmission point described in the terrestrial delivery system descriptor based on the tag value, and accordingly, even when a configuration of frequencies of transmission points becomes complicated, it can be dealt with.

Figure 20:
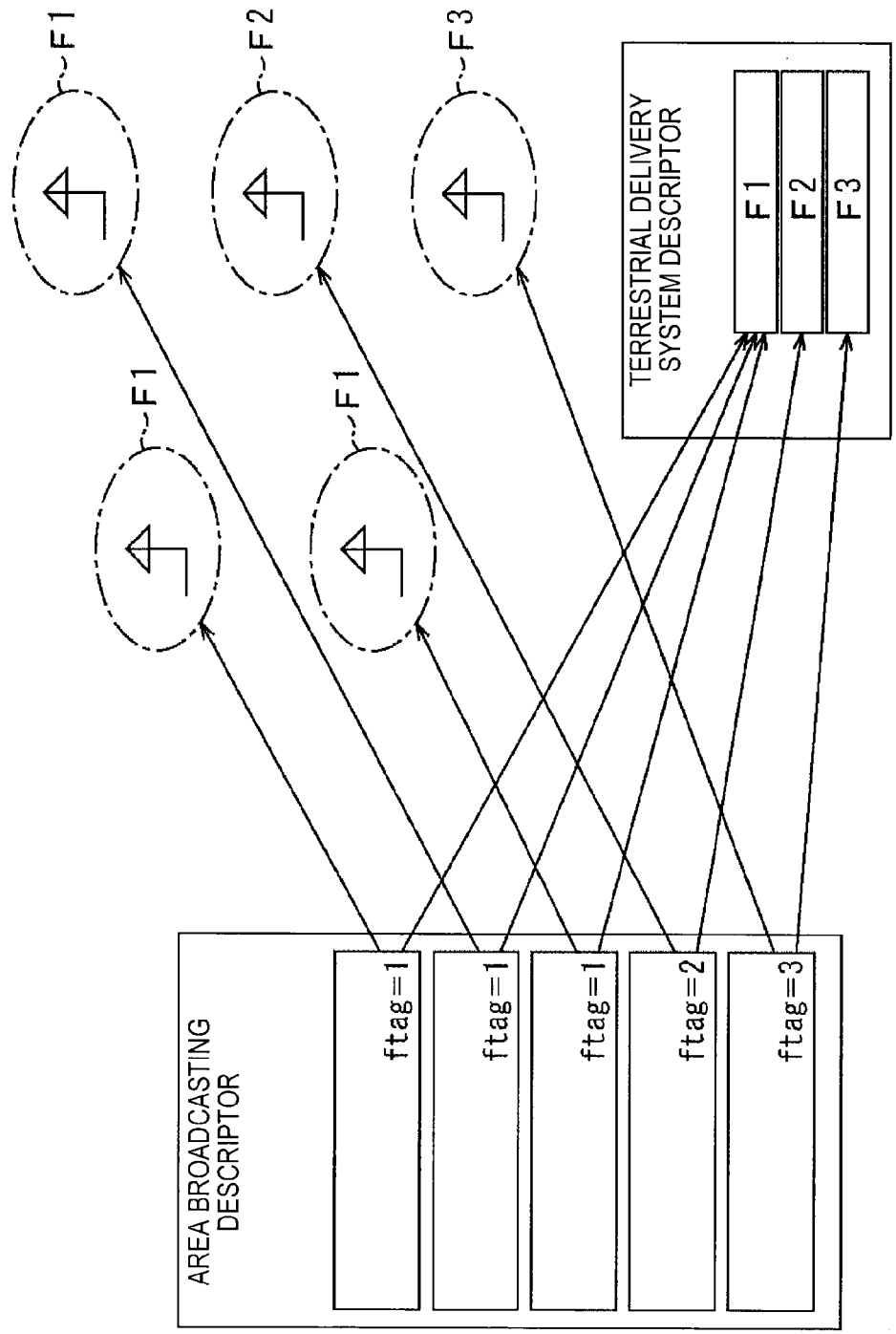
FIG. 20 is a diagram illustrating a specific example of a frequency designated by a frequency tag.

Specifically, as shown in FIG. 20, an area broadcasting descriptor and a terrestrial delivery system descriptor are arranged in an NIT, station information is further arranged in the area broadcasting descriptor, and frequency information is arranged in the terrestrial delivery system descriptor. Accordingly, frequencies each corresponding to a tag value designated based on a frequency tag (flag) of the station information arranged in the area broadcasting descriptor are specified based on the frequencies designated in the frequency information of the terrestrial delivery system descriptor.

In other words, in the case of the MFN operation, for example, a plurality of frequencies F1, F2, F3, etc. are listed in the terrestrial delivery system descriptor as frequency information. In addition, frequency tags (flag) are described for respective transmission points in the area broadcasting descriptor as station information (transmission information).

In the example of FIG. 20, ftag=1 is designated for a transmission point 1, ftag=1 for a transmission point 2, ftag=1 for a transmission point 3, flag=2 for a transmission point 4, and ftag=3 for a transmission point 5, respectively.

In addition, when ftag=1 is designated as a frequency tag, the frequency F1 described in the leading part (the first at the top of the list) of frequency information is specified, and thus tuning control or the like is performed according to the frequency F1 in the reception terminal 33.

In the same manner, when ftag=2 is designated as a frequency tag, the frequency F2 described second from the top of the list of the frequency information is specified. In addition, when ftag=3 is designated as a frequency tag, the frequency F3 described third from the top of the list of the frequency information is specified.

As described above, as frequency tags are included in the station information, a frequency designated based on a tag value of a frequency tag is specified as a transmission frequency.

Returning to FIG. 14, the additional information (extended_info( )) is future extended information. When there is this additional information, an additional information flag is set.

Note that the station information shown in FIG. 4 is an example, and may include other information regarding each station 32, for example, the location or the area name that is the name of the broadcasting area of the station 32, the station name that is the name of the station 32, the center frequency for performing tuning to area-limited broadcasting performed by the station 32, and the like.

In addition, out of information included in the above-described station information, a transmission output, transmitting station latitude, transmitting station longitude, transmitting station altitude, an area pattern bitmap, and a receivable distance which are used for performing tuning to a service of area-limited broadcasting performed by the station 32 that transmits broadcasting waves receivable at a predetermined position are also particularly referred to as service area information.

Figure 21:
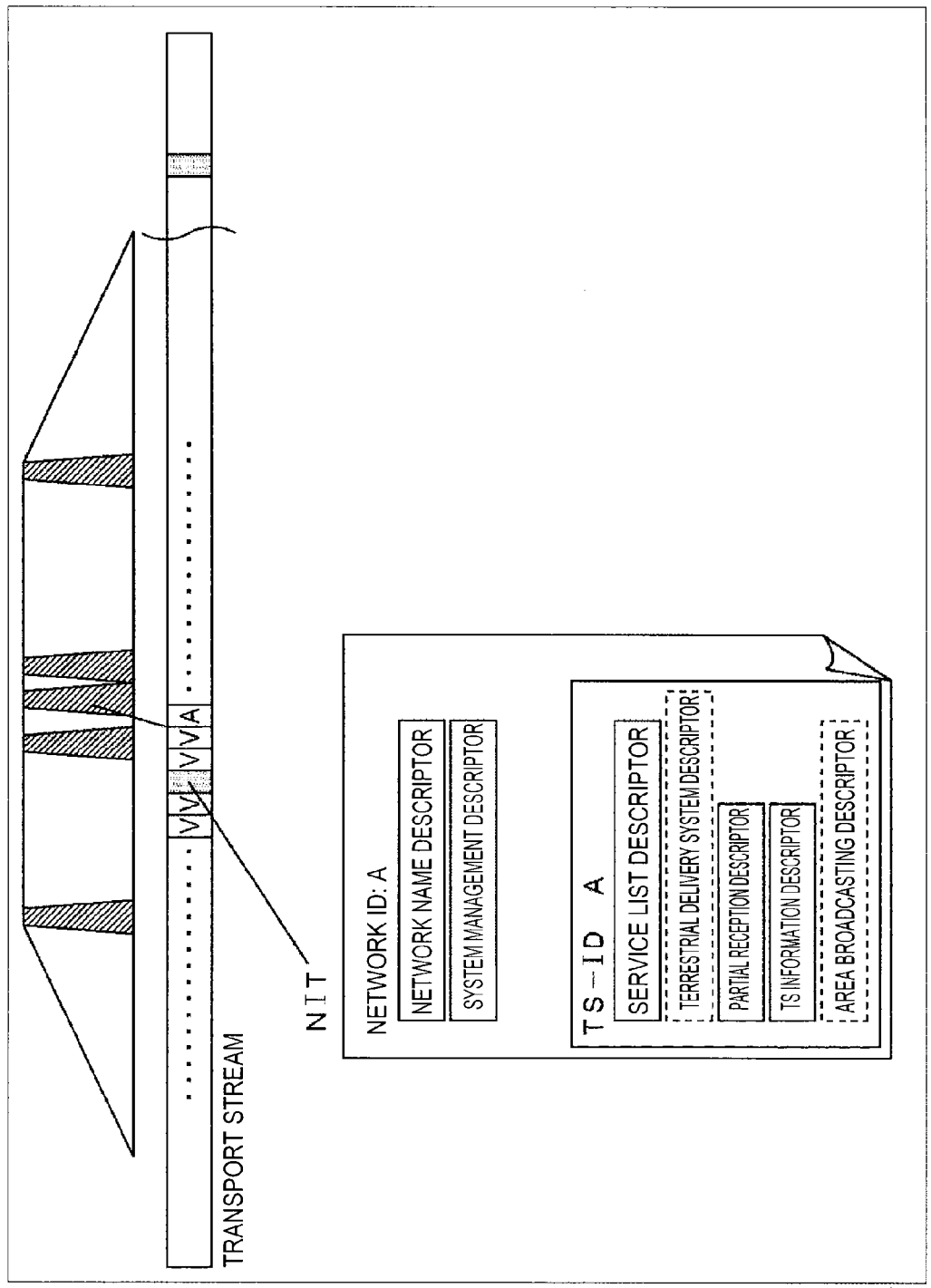
FIG. 21 is a diagram illustrating an example of syntax of an NIT that includes an area broadcasting descriptor and a terrestrial delivery system descriptor.

FIG. 21 is a diagram illustrating an example of syntax (data structure) of an NIT that includes an area broadcasting descriptor and a terrestrial delivery system descriptor.

As shown in FIG. 21, in an NIT that is extracted from a TS obtained by multiplexing video data, audio data, and the like, a network loop and a TS loop are arranged in order.

In the network loop, one or more descriptors (descriptor) can be arranged. As descriptors of the network loop, for example, a network name descriptor, a system management descriptor, and the like are arranged in each network ID.

Here, in the network name descriptor, a network name is described, and in the system management descriptor, information indicating whether a network is a broadcast network or a communication network is described.

In addition, after the network loop, a TS loop is arranged. In the TS loop, one or more descriptors (descriptor) are arranged. As descriptors of the TS loop, for example, a service list descriptor, a terrestrial delivery system descriptor, a partial reception descriptor, a TS information descriptor, an area broadcasting descriptor, and the like are arranged in each TS (TS-ID).

In the service list descriptor, a service ID and a service type indicating the type of a broadcast service (a television broadcast, a radio broadcast, or the like) are described. In addition, in the terrestrial system delivery descriptor, physical conditions of a terrestrial transport path such as frequency information necessary for performing tuning to a frequency (center frequency) and the like are described.

In the partial reception descriptor, a service ID of a partial reception service (one-seg broadcast) is described, and in the TS information descriptor, information regarding the TS such as allocation of a remote controller button number with respect to the TS, or a transport hierarchy of services within the TS is described. In addition, in the area broadcasting descriptor, station information (as shown in FIG. 14) of the station 32 is arranged.

By arranging the station information of the station 32 in the area broadcasting descriptor, the reception terminal 33 ascertains that the TS is of a service of area-limited broadcasting, and stores the station information. Accordingly, in linkage with a GPS function that will be described later, for example, the reception terminal 33 can be notified of the fact that it can use the station 32 when it enters the broadcasting area of the station. In addition, transmitting station information regarding another area broadcasting station is also considered. In this case, the area broadcasting station may be set to indicate another area broadcasting station when, for example, the area broadcasting descriptor is arranged in the network loop of the NIT, or to indicate the station itself when it is arranged in the TS loop, or information indicating whether it is the station itself or the other station may be included in the information item of the area broadcasting descriptor of FIG. 14.

Figure 22:
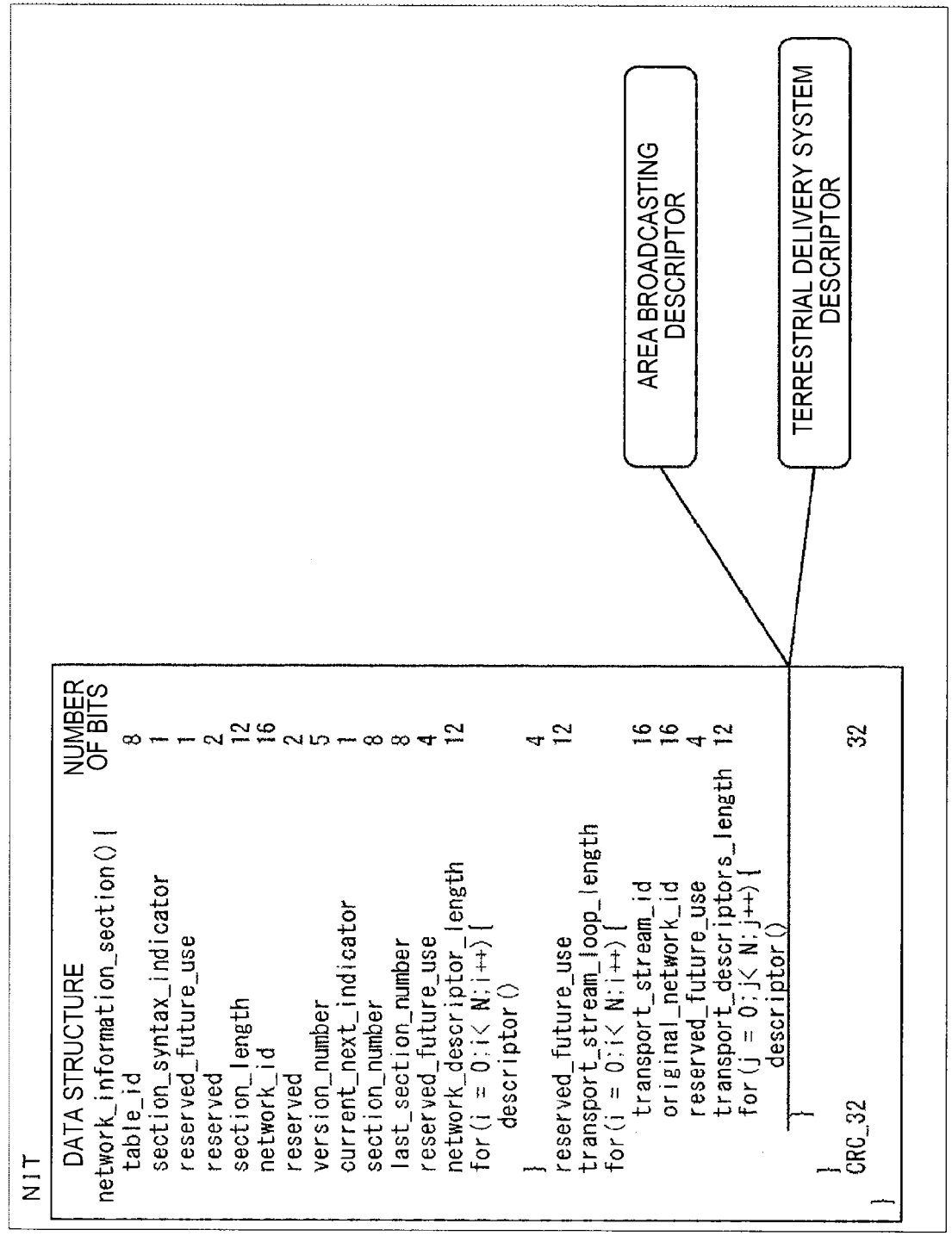
FIG. 22 is a diagram showing an example of syntax of an NIT.

In addition, in FIG. 22, a detailed example of an NIT of FIG. 21 is illustrated.

As shown in FIG. 22, in the area broadcasting descriptor arranged in the TS loop of the NIT, the items of the station information (FIG. 14) are arranged. In addition, in the terrestrial delivery system descriptor arranged in the TS loop, frequency information is arranged.

FIG. 23 is a diagram showing a description example of an area broadcasting descriptor (area_broacasting_descriptor( )).

In descriptor_tag, a tag value allocated to the descriptor is described. In addition, in descriptor_length, a descriptor length of the descriptor is described.

station_id of 24 bits and area_code of 16 bits are a station ID and an area code respectively. In addition, signal_format of 8 bits is a signal format.

In addition, emission_info_flag of 1 bit, emission_point_flag of 1 bit, and additional_info_flag of 1 bit are a transmission information flag, a transmission-point-corresponding flag, and an additional information flag respectively.

When emission_info_flag is set to 1, transmission information is arranged in a transmission loop. In addition, when emission_point_flag is set to 1, transmission information corresponds to a transmission point, and thus transmission information of each transmission point is arranged in the transmission loop.

emission_power of 16 bits in the transmission loop is a transmission output.

In addition, station_latitude of 24 bits, station_longitude of 24 bits, and station_height of 16 bits are transmitting station latitude, transmitting station longitude, and transmitting station altitude respectively.

In addition, area_pattern_bitmap of 32 bits, max_distance of 8 bits, and max_distance_unit of 1 bit are an area pattern bitmap, a receivable distance, and a receivable distance unit respectively.

Furthermore, open_air_flag of 1 bit, closed_space_flag of 1 bit, and station_mobility_flag of 1 bit are an open air flag, a closed space flag, and a mobile station flag respectively.

frequency_tag of 4 bits is a frequency tag. The above-described transmission information is arranged within the transmission loop.

additional_info( ) is additional information. When additional_info_flag is set to 1, additional_info( ) is arranged in the area broadcasting descriptor.

Note that a description method of the area broadcasting descriptor is arbitrary, and is not limited to the example of FIG. 23.

FIG. 24 is a diagram showing a description example of a terrestrial delivery system descriptor (terrestrial_delivery_system_descriptor). In the terrestrial delivery system descriptor, physical conditions of a terrestrial transport path are described.

In descriptor_tag, a tag value allocated to the descriptor is described. In addition, in descriptor_length, a descriptor length of the descriptor is described.

area_code of 12 bits, guard_interval of 2 bits, and transmission_mode of 2 bits are the code of a service area, a guard interval, and mode information respectively.

In the frequency loop, frequency information is arranged. In the case of the MFN operation, a plurality of frequencies for transmission of each transmission point are listed. In frequency, a frequency is described, and a unit of the frequency is, for example, $1/7$ MHz.

Note that a description method of the terrestrial delivery system descriptor is arbitrary, and is not limited to the example of FIG. 24.

[Configuration Example of the Station 32]

Figure 25:
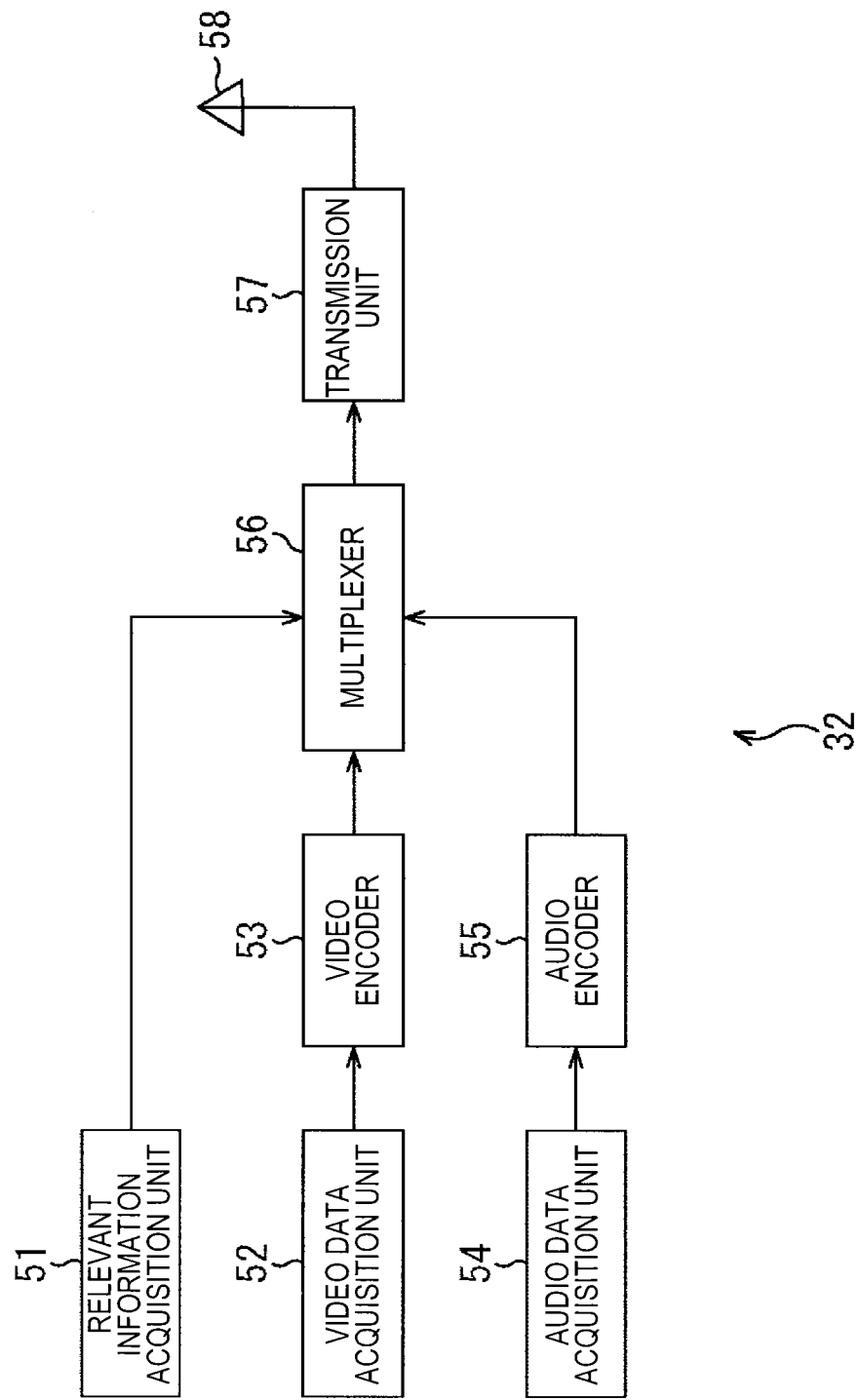
FIG. 25 is a block diagram illustrating a detailed configuration example of a station 32.

FIG. 25 is a block diagram illustrating a detailed configuration example of the station 32 of FIG. 4.

In FIG. 25, the station 32 is constituted by a relevant information acquisition unit 51, a video data acquisition unit 52, a video encoder 53, an audio data acquisition unit 54, an audio encoder 55, a multiplexer 56, a transmission unit 57, and an antenna 58.

The relevant information acquisition unit 51 generates and acquires relevant information such as information for receiving services including a program map table (PMT) and a program association table (PAT), a network information table (NIT) and a service description table (SDT) of area-limited broadcasting, and the like, frequency information, program specific information (PSI) that is control information such as information for specifying a packet corresponding to a service, information for performing display using a browser in area-limited broadcasting (hereinafter referred to as display control information), and the like, and supplies the information to the multiplexer 56.

Note that, when generating the NIT, the relevant information acquisition unit 51 acquires station information included in the NIT.

In other words, when the station information of the station 32 is stored in, for example, a memory that is not illustrated, the relevant information acquisition unit 51 reads the station information from the memory, and thereby acquires the station information of the station 32.

In addition, when the NIT includes station information of another station, the relevant information acquisition unit 51, for example, downloads and acquires the station information of the other station from the other station through a network.

The video data acquisition unit 52 acquires video data of area-limited broadcasts from a hard disk drive (HDD) installed therein that is not illustrated, an external server, a camera, or the like, and supplies the data to the video encoder 53.

The video encoder 53 encodes the video data supplied from the video data acquisition unit 52 based on an encoding scheme such as Moving Picture Experts Group (MPEG), and then supplies the data to the multiplexer 56.

The audio data acquisition unit 54 acquires audio data of area-limited broadcasts from an HDD installed therein that is not illustrated, an external server, a microphone, or the like, and then supplies the data to the audio encoder 55.

The audio encoder 55 encodes the audio data supplied from the audio data acquisition unit 54 based on an encoding scheme such as MPEG, and then supplies the data to the multiplexer 56.

The multiplexer 56 multiplexes the relevant information from the relevant information acquisition unit 51, the video data from the video encoder 53, and the audio data from the audio encoder 55 to generate TSs, and then supplies the TSs to the transmission unit 57.

The transmission unit 57 transmits the TSs supplied from the multiplexer 56 through the antenna 58 on predetermined segments.

Note that, from the transmission unit 57, the TS obtained by multiplexing an NIT that includes station information of the station 32 as relevant information among the TSs supplied from the multiplexer 56 is transmitted on a representative segment of the station 32.

[Description of a Process of the Station 32]

Figure 26:
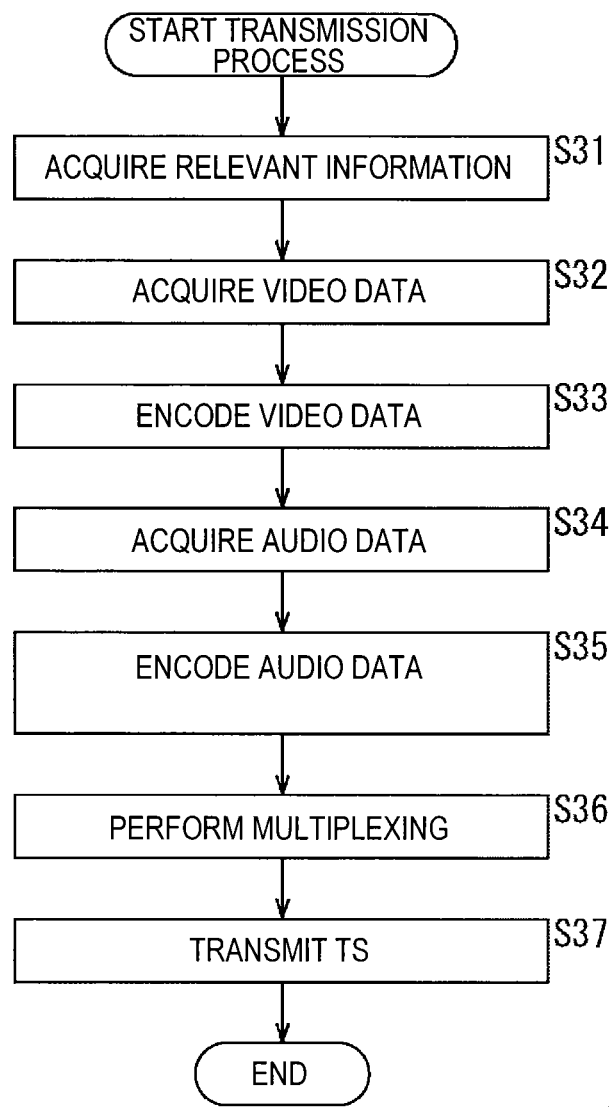
FIG. 26 is a flowchart for describing a transmission process of the station 32.

FIG. 26 is a flowchart for describing a process (transmission process) of the station 32 of FIG. 25.

In Step S31, the relevant information acquisition unit 51 acquires station information to be transmitted by the station 32, i.e., station information of the station 32 and station information of another station, then acquires relevant information of PSI of area-limited broadcasting such as an EIT including the station information, display control information, or the like from generation, and then supplies the information to the multiplexer 56.

In Step S32, the video data acquisition unit 52 acquires video data of an area-limited broadcast, and then supplies the data to the video encoder 53.

In Step S33, the video encoder 53 encodes the video data supplied from the video data acquisition unit 52, and then supplies the data to the multiplexer 56.

In Step S34, the audio data acquisition unit 54 acquires audio data of an area-limited broadcast, and then supplies the data to the audio encoder 55.

In Step S35, the audio encoder 55 encodes the audio data supplied from the audio data acquisition unit 54, and then supplies the data to the multiplexer 56.

In Step S36, the multiplexer 56 multiplexes the relevant information from the relevant information acquisition unit 51, the video data from the video encoder 53, and the audio data from the audio encoder 55 to generate TSs.

In Step S37, the transmission unit 57 transmits the TSs supplied from the multiplexer 56 through the antenna 58 on a predetermined segment on which the TSs will be transmitted, and thereby the process ends.

[Detailed Configuration Example of the Reception Terminal 33]

Figure 27:
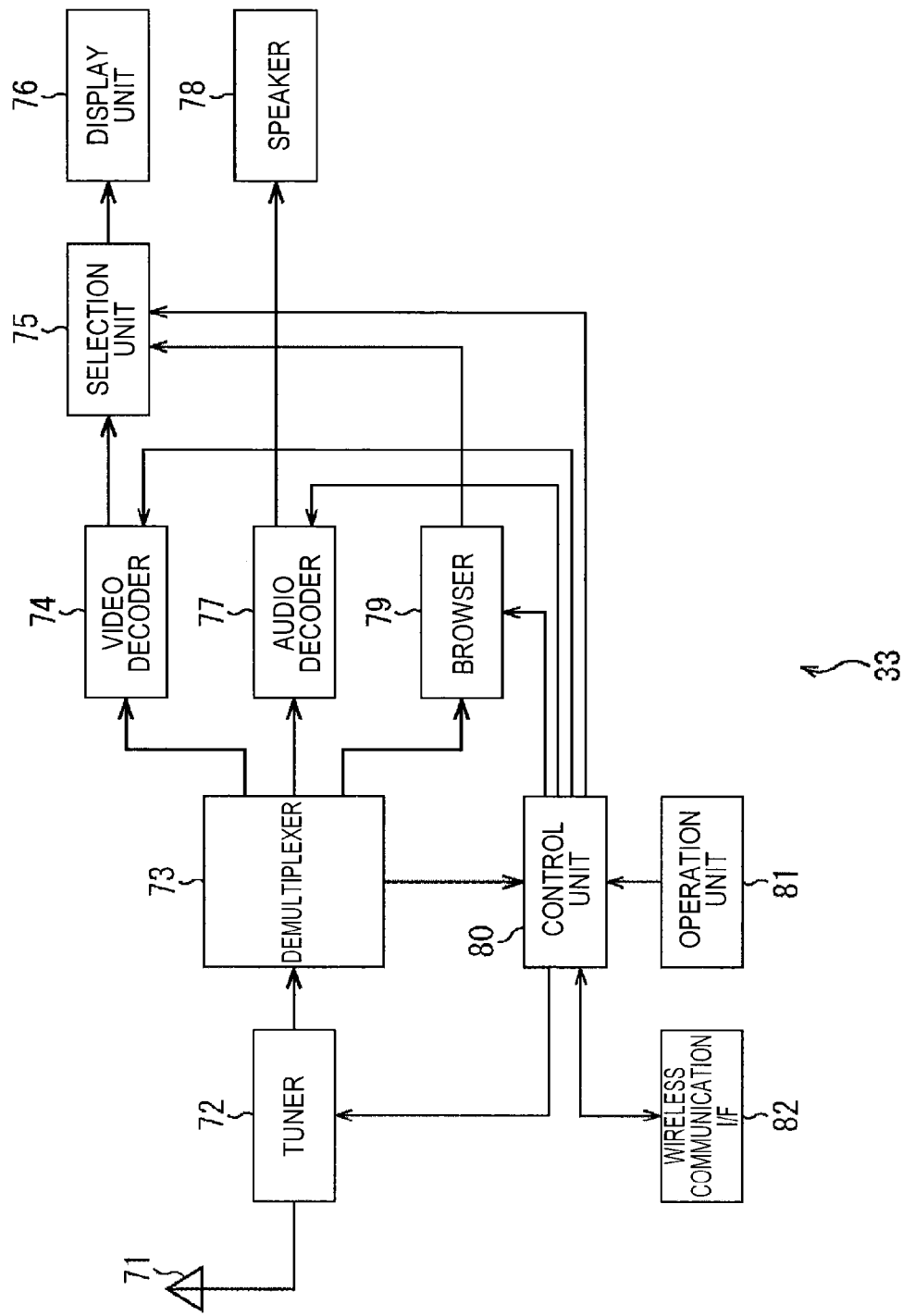
FIG. 27 is a block diagram illustrating a detailed configuration example of a reception terminal 33.

FIG. 27 is a block diagram illustrating a detailed configuration example of the reception terminal 33 of FIG. 4.

In FIG. 27, the reception terminal 33 is constituted by an antenna 71, a tuner 72, a demultiplexer 73, a video decoder 74, a selection unit 75, a display unit 76, an audio decoder 77, a speaker 78, a browser 79, a control unit 80, an operation unit 81, and a wireless communication I/F 82.

The antenna 71 receives broadcasting waves of the UHF band from the terrestrial broadcasting station 31 or the station 32, and then supplies an intermediate frequency (IF) signal obtained from the reception of the broadcasting waves to the tuner 72.

The tuner 72 performs tuning to (demodulates a signal of) normal one-seg broadcasting or area-limited broadcasting of a predetermined logical channel (segment) using the IF signal from the antenna 71 under control of the control unit 80, and then supplies a TS obtained from the result to the demultiplexer 73.

The demultiplexer 73 separates the TS supplied from the tuner 72 into video data, audio data, display control information, respective information pieces of PSI, and the like. The demultiplexer 73 supplies the video data to the video decoder 74, and the audio data to the audio decoder 77. In addition, the demultiplexer 73 supplies the display control information to the browser 79, and supplies the information of the PSI and the like to the control unit 80.

The video decoder 74 decodes the video data supplied from the demultiplexer 73 in a scheme corresponding to the video encoder 53 (of FIG. 25) under control of the control unit 80, and then supplies the data to the selection unit 75.

The selection unit 75 selects the video data supplied from the video decoder 74 or video data supplied from the browser 79 under control of the control unit 80, and then supplies the data to the display unit 76.

In addition, the selection unit 75 supplies video data of an image such as an on-screen display (OSD) to the display unit 76 under control of the control unit 80.

The display unit 76 displays an image of the normal one-seg broadcasting or area-limited broadcasting based on the video data supplied from the selection unit 75.

The audio decoder 77 decodes the audio data supplied from the demultiplexer 73 in a scheme corresponding to the audio encoder 55 (of FIG. 25) under control of the control unit 80, and then supplies the data to the speaker 78.

The speaker 78 outputs sounds corresponding to the audio data from the audio decoder 77, i.e., sounds of the normal one-seg broadcast or area-limited broadcast.

Note that, in addition to that, the speaker 78 can output a predetermined sound (for example, a beep sound, or the like) under control of the control unit 80.

The browser 79 analyzes the display control information supplied from the demultiplexer 73, then generates video data, and then supplies the data to the selection unit 75.

The control unit 80 performs various processes according to operation signals from the operation unit 81 and the like, and thereby controls each block constituting the reception terminal 33.

In other words, the control unit 80 stores the frequencies of the central segments of respective physical channels of terrestrial digital broadcasting as pre-set frequencies for channel scanning, and then performs tuning control to control the tuner 72 to be sequentially tuned to (the segments of) the pre-set frequencies at the time of channel scanning.

In addition, the control unit 80 generates a tuning table based on the NIT-actual and SDT-actual, NIT-actual, NIT-other, SDT-actual, and SDT-other of the central segments of the respective physical channels included in the PSI supplied from the demultiplexer 73, and then stores the table in a memory installed therein (not illustrated).

Further, the control unit 80 supplies service names registered in the tuning table to the display unit 76 through the selection unit 75 according to an operation signal from the operation unit 81 or the like to cause the names to be displayed thereon.

Here, a user can see the service names displayed on the display unit 76 and then operate the operation unit 81 to select a service name of (the logical channel of) a service that is a viewing target.

The control unit 80 ascertains a frequency of the service name that is a viewing target as tuning information of the service from the tuning table according to an operation of the operation unit 81, and performs tuning control to control the tuner 72 to be tuned to (the segment of) the frequency.

In addition, the control unit 80 controls the video decoder 74, the selection unit 75, the audio decoder 77, and the browser 79 based on each piece of information of the PSI supplied from the demultiplexer 73. Specifically, the control unit 80 controls the video decoder 74 and the audio decoder 77 so as to cause, for example, the video data output from the video decoder 74 to be in synchronization with the audio data output from the audio decoder 77.

Furthermore, when station information is included in the NIT of the PSI, the control unit 80 acquires the station information, and stores the information if necessary.

Then, the control unit 80 performs tuning control using the station information.

In other words, using the station information, the control unit 80 selects a station of area-limited broadcasting that is currently receivable as a tunable station to which the terminal can be tuned, and then causes the station name of the tunable station and service names of services of the area-limited broadcasting performed by the tunable station to be displayed on the display unit 76 through the selection unit 75.

In addition, the control unit 80 ascertains the frequency of (a service of) the area-limited broadcasting of the tunable station from the station information or the tuning table, and performs tuning control to control the tuner 72 to be tuned to the frequency.

The operation unit 81 is operated by the user and supplies an operation signal corresponding to the operation to the control unit 80. Note that, in the operation unit 81, buttons which are displayed on the display unit 76 as a graphics user interface (GUI) are also included along with physical buttons and the like.

When a wireless IP access point is detected, the wireless communication I/F 82 is connected to the Internet via the wireless IP access point under control of the control unit 80. The wireless communication I/F 82 exchanges information with various servers connected to the Internet.

Figure 28:
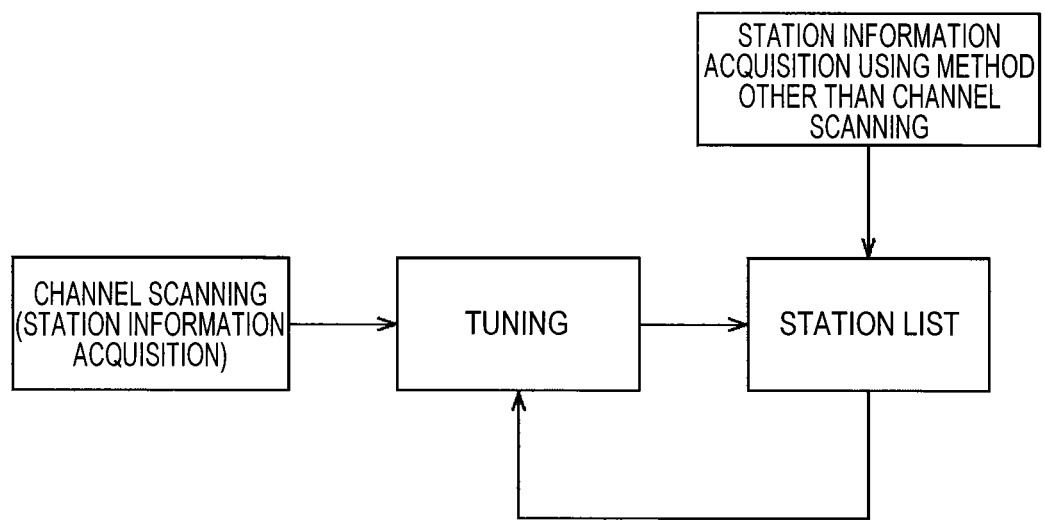
FIG. 28 is a diagram for describing acquisition and use of station information in the reception terminal 33.

FIG. 28 is a diagram for describing acquisition and use of station information in the reception terminal 33 of FIG. 27.

As described above, when the station 32 causes station information to be included in the NIT and then transmits the information, the reception terminal 33 can acquire the station information from, for example, the NIT received at the time of channel scanning or the like.

In addition, the reception terminal 33 can acquire the station information using a method other than channel scanning. For example, the station information is stored in a non-contact medium such as a non-contact IC card (for example, Felica (a registered trademark)), and the reception terminal 33 can acquire the station information by performing near field communication in which the reception terminal 33 and the non-contact medium exchange the information.

In addition, the station information can be stored in a dedicated server on the Internet as a file, and the reception terminal 33 can acquire the station information through wireless communication in which the server and the reception terminal exchange the station information using a wireless local area network (LAN) or the like. Further, the station information can be downloaded in a personal computer from a dedicated server on the Internet, and the reception terminal 33 can acquire the station information through communication in which the personal computer and the reception terminal 33 exchange the station information using a Universal Serial Bus (USB) or the like.

In the reception terminal 33, the control unit 80 acquires the station information and registers the station information on a station list that is a list on which station information is registered (stored) if necessary.

Then, the control unit 80 performs tuning control using the station information.

[Configuration Example of the Control Unit 80]

Figure 29:
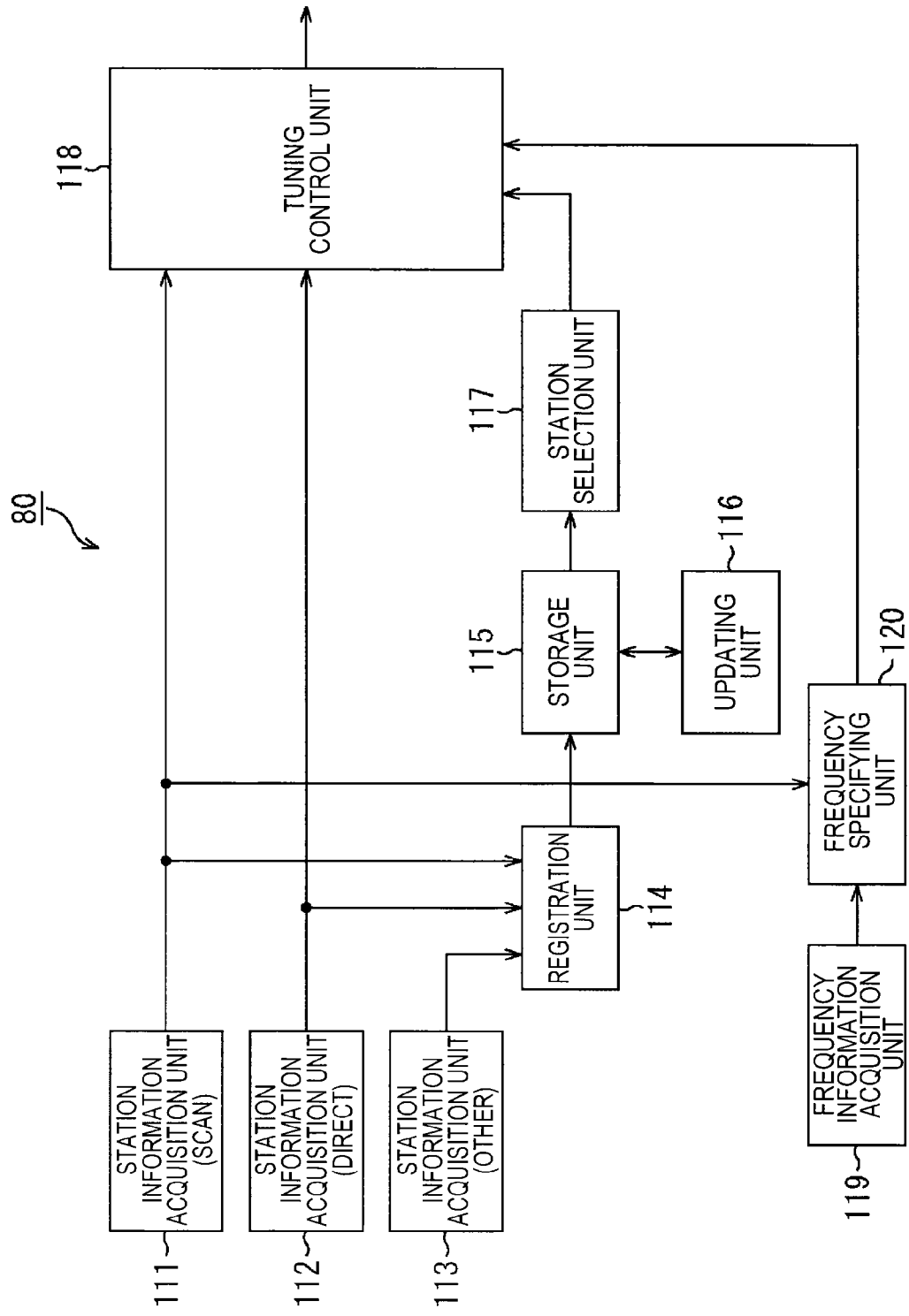
FIG. 29 is a block diagram illustrating a functional configuration example of a portion of a control unit 80 that performs tuning control using station information.

FIG. 29 is a block diagram illustrating a functional configuration example of a portion of the control unit 80 of FIG. 27 that performs tuning control using station information.

In FIG. 29, the control unit 80 has station information acquisition units 111, 112, and 113, a registration unit 114, a storage unit 115, an updating unit 116, a station selection unit 117, a tuning control unit 118, a frequency information acquisition unit 119, and a frequency specifying unit 120.

The station information acquisition units 111 to 113 acquire station information.

In other words, the station information acquisition unit 111 acquires the station information from the NIT that is obtained as the tuner 72 performs channel scanning or the like, and then supplies the information to the registration unit 114, the tuning control unit 118, and the frequency specifying unit 120.

Here, the tuning control unit 118 to be described later performs tuning control such that the tuner 72 is sequentially tuned to frequencies of the central segments of respective physical channels of terrestrial digital broadcasting stored as pre-set frequencies when, for example, the operation unit 81 is operated to perform channel scanning.

The tuner 72 is tuned to the pre-set frequencies according to the tuning control by the tuning control unit 118, and when area-limited broadcasting is receivable at a tuned pre-set frequency, in other words, when it is possible to obtain TSs of the area-limited broadcasting as a result of the tuning, the tuner supplies the TSs to the demultiplexer 73.

The demultiplexer 73 separates PSI from the TSs supplied from the tuner 72, and then supplies the PSI to the control unit 80.

By performing as described above, based on the NITs and the SDTs included in the PSI supplied from the demultiplexer 73 at the time of channel scanning, the control unit 80 creates a tuning table in which tuning information of a service (of the area-limited broadcasting) that is receivable upon the channel scanning is registered if necessary.

In addition, in the control unit 80, the station information acquisition unit 111 acquires the station information from the NIT obtained at the time of the channel scanning.

The station information acquisition unit 112 acquires the station information in a direct manner, and supplies the information to the registration unit 114 and the tuning control unit 118.

Here, when area-limited broadcasting performed by the station 32 is broadcasting relating to an event taking place within the broadcasting area of the station 32, for example, it is possible to place posters on which the station information of the station 32 is printed in the form of barcodes or the like or posters in which wireless tags storing the station information are installed within the broadcasting area of the station 32.

In this case, the station information acquisition unit 112 includes a reading device that reads the barcodes or a reader-writer that performs near field communication (non-contact communication) with the wireless tags, and thus when a user brings the reception terminal 33 close to the poster in order to acquire the station information of the station 32, he or she can acquire the station information of the station 32 from the barcodes or the wireless tag of the poster.

As described above, the method for acquiring station information which enables only the station information of a specific station 32 to be acquired in the broadcasting area of the station 32 is a direct method.

The station information acquisition unit 113 acquires the station information using channel scanning and a method other than the direct method (another method) and then supplies the information to the registration unit 114.

In other words, when the tuner 72 receives arbitrary one-seg broadcasting or normal one-seg broadcasting (obtains TSs of arbitrary one-seg broadcasting or normal one-seg broadcasting) and station information of one or more respective stations is included in the NITs of the TSs of the arbitrary one-seg broadcasting or normal one-seg broadcasting, the station information acquisition unit 113 can receive the station information.

In addition, when, for example, the reception terminal 33 has a function as a web browser and a web server on the Internet provides station information of one or more respective stations, the station information acquisition unit 113 accesses the web server and thereby can acquire the station information.

Furthermore, when, for example, the reception terminal 33 is connected to a personal computer that downloads station information from a server that provides the station information of one or more respective stations thereto, the station information acquisition unit 113 can acquire the station information from the personal computer.

In addition, for example, upon being provided with a printed product on which station information of one or more respective stations is printed in the form of barcodes (for example, a poster, a catalog, a magazine, or the like) or a printed product in which a wireless tag storing station information of one or more respective stations is installed, the station information acquisition unit 113 can acquire the station information from the barcodes or the wireless tag of the printed product when the user brings the reception terminal 33 close to the printed product.

The registration unit 114 supplies the station information supplied from the station information acquisition units 111 to 113 to the storage unit 115 for storage if necessary (registers the information on the station list of the storage unit 115).

In other words, the registration unit 114 causes only station information of which registration has been requested from the user out of the station information supplied from the station information acquisition units 111 to 113 to be stored in the storage unit 115.

Here, there are cases in which, for example, the user, who has viewed an area-limited broadcast that the tuner 72 received as the tuning control unit 118 performed tuning control using the station information supplied from the station information acquisition unit 111, no longer desires to view the area-limited broadcast thereafter.

In this case, the station information with which the area-limited broadcasting is performed is unnecessary.

In addition, when many pieces of station information including the unnecessary station information are stored in the storage unit 115, (the station names of) many stations are displayed on a station list screen to be described later, and as a result, there are cases in which the user has difficulty in selecting his or her desired station.

Thus, when the user operates the operation unit 81 (of FIG. 27) to request registration (hereinafter referred to also as a bookmark operation), the registration unit 114 can cause the station information to be stored in the storage unit 115.

Accordingly, difficulty for the user in selecting a desired station due to many stations being displayed on the station list screen can be avoided.

The storage unit 115 stores the station information supplied from the registration unit 114. In other words, the storage unit 115 stores the station list on which the station information is registered, and registers the station information supplied from the registration unit 114 on the station list.

The updating unit 116 updates the station information stored in the storage unit 115.

For example, as the updating unit 116 updates the station information stored in the storage unit 115 according to a period in which the area-limited broadcasting is performed, difficulty for the user in selecting a desired station due to many stations being displayed on the station list screen including stations that have not yet performed area-limited broadcasting can be avoided.

The station selection unit 117 selects a station of the area-limited broadcasting that is receivable at a predetermined position as a tunable station to which the terminal can be tuned using the station information stored in the storage unit 115, and supplies the station information of the tunable station to the tuning control unit 118.

The tuning control unit 118 performs tuning control to cause the tuner 72 (of FIG. 27) to be tuned to area-limited broadcasting of the station corresponding to the station information using the station information supplied from the station information acquisition units 111 and 112 and the station selection unit 117.

In addition, the tuning control unit 118 performs display control to control the selection unit 75 so that the station list screen on which the station name of the tunable station, a channel list screen on which the service name of (a service of) the area-limited broadcasting performed by the tunable station, or the like is displayed on the display unit 76 (of FIG. 27) using the station information of the tunable station supplied from the station selection unit 117.

The frequency information acquisition unit 119 acquires frequency information from the NIT obtained by the tuner 72 performing channel scanning or the like, and then supplies the information to the frequency specifying unit 120.

The station information from the station information acquisition unit 111 and the frequency information from the frequency information acquisition unit 119 are supplied to the frequency specifying unit 120. The frequency specifying unit 120 specifies a transmission frequency to be used at a transmission point of broadcasting waves of the broadcasting performed by the tunable station from frequencies designated with the frequency information based on (a frequency tag of) frequency specification information for specifying the frequency for transmission that is included in the station information. The frequency specifying unit 120 supplies the result of the specified transmission frequency to the tuning control unit 118.

The tuning control unit 118 performs tuning control or the like to be tuned to a service of broadcasting performed by the tunable station according to the transmission frequency specified by the frequency specifying unit 120.

Note that the same frequency is used by a master station and a relay station only when the transmission and reception system 30 implements the SFN operation, and thus a configuration in which the frequency information acquisition unit 119 and the frequency specifying unit 120 are not provided can be adopted. In this case, the control unit 80 is constituted by the elements from the station information acquisition unit 111 to the tuning control unit 118.

[Process of the Reception Terminal 33 Acquiring Station Information]

Figure 30:
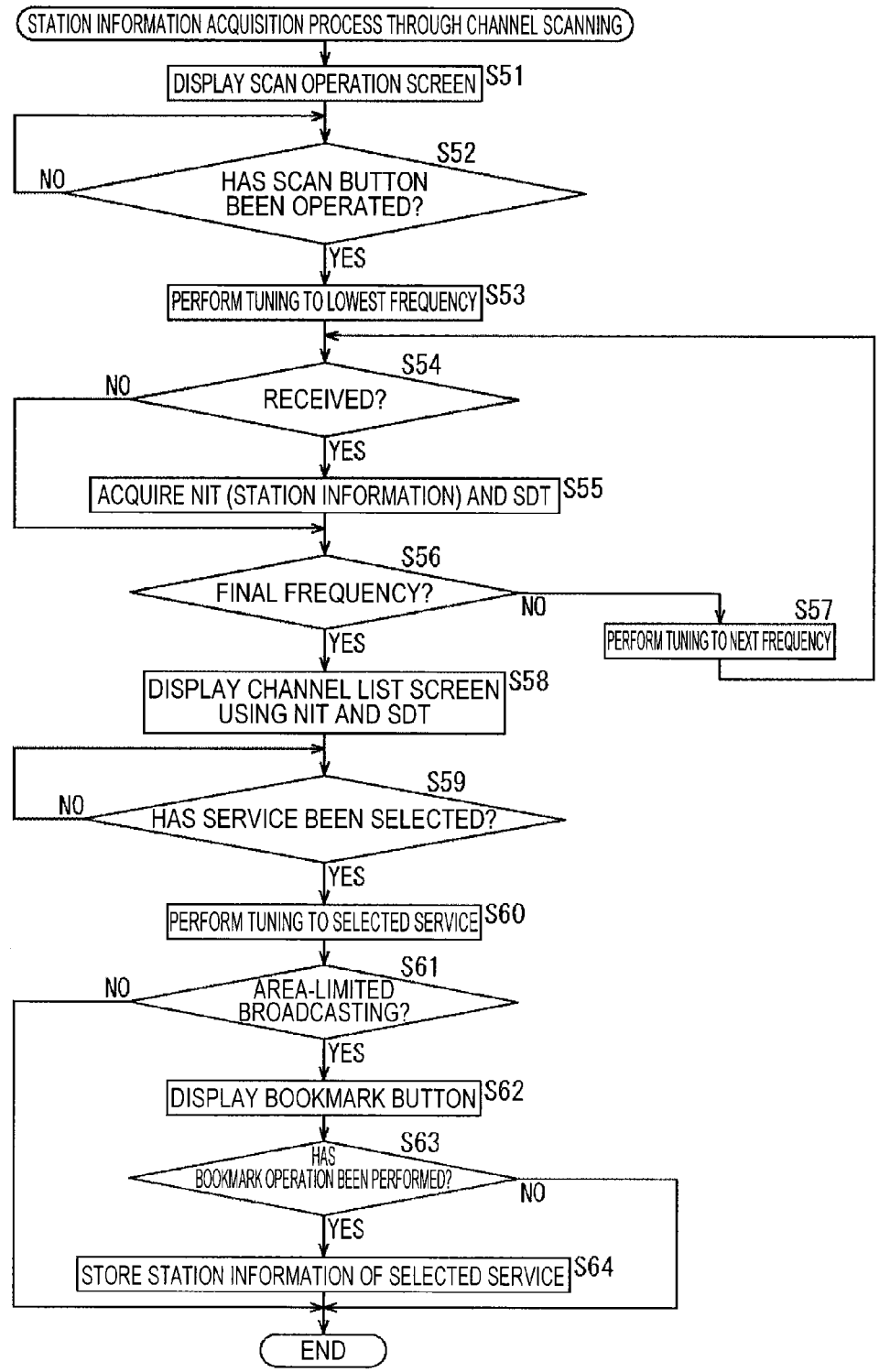
FIG. 30 is a flowchart for describing a process in which station information is acquired through channel scanning and then a service is received.

FIG. 30 is a flowchart for describing a process in which the reception terminal 33 of FIG. 27 acquires station information through channel scanning to receive a service.

For example, when a user operates the operation unit 81 (of FIG. 27) to cause a scan operation screen that is a menu screen of channel scanning to be displayed, the tuning control unit 118 (of FIG. 29) causes the scan operation screen to be displayed on the display unit 76 (of FIG. 27) by controlling the selection unit 75 (of FIG. 27) in Step S51, and then the process proceeds to Step S52.

In Step S52, the tuning control unit 118 determines whether or not a scan button of the scan operation screen has been operated.

In other words, the scan button that is operated when channel scanning is to be performed is provided on the scan operation screen, and it is determined whether or not the scan button has been operated in Step S52.

In Step S52, when the scan button is determined not to have been operated, the process returns to Step S52.

In addition, in Step S52, when the scan button is determined to have been operated, the process proceeds to Step S53, and channel scanning is performed thereafter in Steps S53 to S57, and thereby NITs and SDTs and further station information are acquired.

In other words, in Step S53, the tuning control unit 118 selects, for example, the lowest frequency among frequencies (pre-set frequencies) of the central segments of respective physical channels of terrestrial digital broadcasting as a frequency of interest, and then performs tuning control to control the tuner 72 to be tuned to the frequency of interest.

Then, the process proceeds from Step S53 to Step S54, and the tuning control unit 118 determines whether or not a service has been received at the frequency of interest, i.e., whether or not TSs have been obtained by the tuner 72 as a result of the tuning.

In Step S54, when it is determined that a service has not been received at the frequency of interest, the process skips Step S55, and proceeds to Step S56.

In addition, in Step S54, when it is determined that a service has been received at the frequency of interest, the process proceeds to Step S55, and the control unit 80 acquires NITs and SDTs and further station information if possible.

In other words, the tuner 72 is tuned to the frequency of interest according to the tuning control of the tuning control unit 118, and when TSs have been obtained as a result of the tuning, the tuner supplies the TSs to the demultiplexer 73. Then, the demultiplexer 73 separates PSI from the TSs supplied from the tuner 72, and then supplies the PSI to the control unit 80.

In the manner described above, the control unit 80 acquires the NITs and the SDTs included in the PSI supplied from the demultiplexer 73, and creates a tuning table in which tuning information of a service that is receivable upon the reception (area-limited broadcasting or normal one-seg broadcasting) is registered, if necessary.

Further, when station information is included in the NITs acquired from the PSI from the demultiplexer 73, the station information acquisition unit 111 of the control unit 80 acquires the station information from the NITs.

Here, a frequency (center frequency) at which the station corresponding to the station information acquired from the NITs performs area-limited broadcasting can be ascertained from the NITs in which the station information is included; however, for the sake of simplified description, the center frequency is assumed to be included in the station information herein.

In Step S55, upon acquiring the NITs, the SDTs and the station information in the manner described above, the station information acquisition unit 111 supplies the NITs, the SDTs and the station information to the tuning control unit 118 and supplies the station information to the registration unit 114, and then the process proceeds to Step S56.

In Step S56, the tuning control unit 118 determines whether or not the frequency of interest is the final frequency among the pre-set frequencies, in other words, the highest frequency here.

In Step S56, when the frequency of interest is determined not to be the final frequency among the pre-set frequencies, the process proceeds to Step S57, and the tuning control unit 118 selects the second highest frequency to the frequency currently serving as the frequency of interest from the pre-set frequencies as a new frequency of interest.

Further, in Step S57, the tuning control unit 118 performs tuning control to control the tuner 72 to be tuned to the frequency of interest, and then the process returns to Step S54.

In addition, in Step S56, when the frequency of interest is determined to be the final frequency among the pre-set frequencies, the process proceeds to Step S58.

Here, in the tuning control with respect to the tuner 72 by the tuning control unit 118 in Steps S53 to S57, the tuner 72 can be controlled to be sequentially tuned to frequencies of segments of respective physical channels, rather than only the frequencies (pre-set frequencies) of the central segments of the physical channels of terrestrial digital broadcasting.

In Step S58, the tuning control unit 118 generates a channel list screen on which service names of all (or some) services ascertained from the NITs and the SDTs obtained from the station information acquisition unit 111 in channel scanning are displayed, and causes the screen to be displayed on the display unit 76 via the selection unit 75.

Then, the process proceeds from Step S58 to Step S59, and the tuning control unit 118 determines whether or not the operation unit 81 has been operated such that any of the service names (logical channels) displayed on the channel list screen is selected.

In Step S59, when the operation unit 81 is determined not to have been operated such that any of the service names displayed on the channel list screen is selected, the process returns to Step S59.

In addition, in Step S59, when the operation unit 81 is determined to have been operated so that any of the service names displayed on the channel list screen is selected, the process proceeds to Step S60, and the tuning control unit 118 performs tuning control to be tuned to a selected service (logical channel or a segment) that is the service of the service name selected through the operation of the operation unit 81.

In other words, the tuning control unit 118 ascertains a frequency of the selected service (at which one-seg broadcasting is performed) from the NIT of the selected service (or the tuning table that has already been created, if possible). However, when a plurality of frequencies for transmission are listed in frequency information arranged in a terrestrial delivery system descriptor at the time of the MFN operation, the frequency specifying unit 120 specifies a transmission frequency from frequencies designated based on the frequency information acquired by the frequency information 119 based on a frequency tag included in the station information. Accordingly, it is possible to easily cope with a complicated configuration of a frequency of a transmission point at the time of the MFN operation.

Then, the tuning control unit 118 controls the tuner 72 (of FIG. 27) to be tuned to the frequency of the selected service.

When the tuner 72 is tuned to the frequency of the selected service according to tuning control of the tuning control unit 118 and thus one-seg broadcasting is receivable, in other words, when TSs of one-seg broadcasting can be obtained as a result of the tuning, the TSs are supplied to the demultiplexer 73 (of FIG. 27).

The demultiplexer 73 separates the TSs from the tuner 72 into video data, audio data, and display control information of the one-seg broadcasting, and then supplies the data to the video decoder 74, the audio decoder 77, and the browser 79.

Accordingly, for example, an image of the selected service is displayed on the display unit 76, sounds of the selected service are output from the speaker 78, and thereby the user can view the selected service.

Then, the process proceeds from Step S60 to Step S61, and the tuning control unit 118 determines whether or not the selected service is a service of area-limited broadcasting of the one-seg broadcasting.

Here, the determination of whether or not the selected service is a service of area-limited broadcasting of the one-seg broadcasting can be made based on, for example, whether or not the NIT of the selected service includes station information.

In Step S61, when the selected service is determined not to be a service of area-limited broadcasting, i.e., when the NIT of the selected service does not include station information and thus the selected service is a service of normal one-seg broadcasting, the process skips Steps S62 to S64, and ends.

In addition, when the selected service is determined to be a service of area-limited broadcasting in Step S61, i.e., when the NIT of the selected service includes station information, the process proceeds to Step S62, and the tuning control unit 118 causes the bookmark button that is operated to request registration of the station information to be displayed while superimposed on the image of the selected service on the display unit 76 through the selection unit 75.

Then, the process proceeds from Step S62 to Step S63, and the registration unit 114 determines whether or not the user has performed a bookmark operation of operating the bookmark button.

When the bookmark operation is determined to have been performed in Step S63, the process proceeds to Step S64, and the registration unit 114 registers station information of the station performing the area-limited broadcasting of the selected service from the station information from the station information acquisition unit 111 on the station list of the storage unit 115, and then the process ends.

In addition, when the bookmark operation is determined not to have been performed in Step S63, the process skips Step S64, and ends.

Thus, the station information of the station performing the area-limited broadcasting of the selected service acquired by the station information acquisition unit 111 is registered on the station list of the storage unit 115 only when the bookmark operation has been performed.

Figure 31:
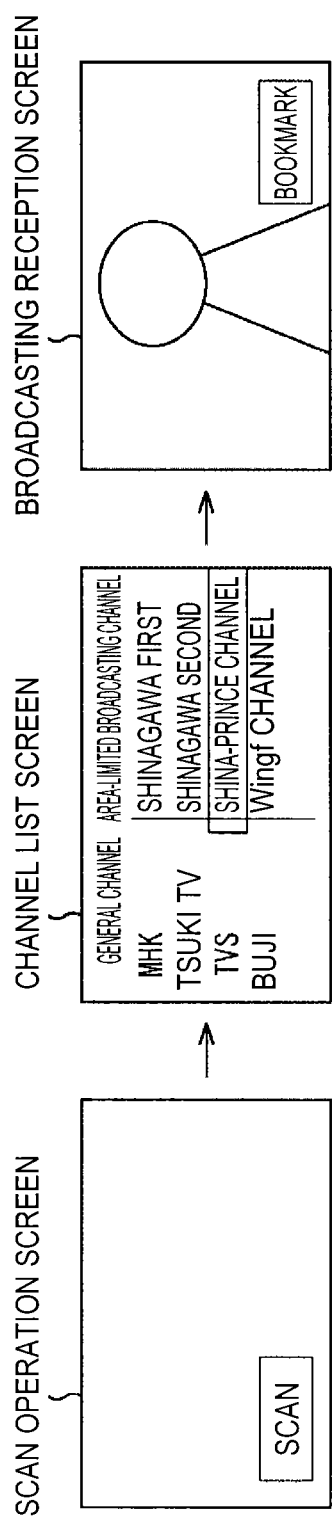
FIG. 31 is a diagram illustrating a display example of a display unit 76 when station information is acquired through channel scanning and thereby a service is received.

FIG. 31 is a diagram illustrating a display example of the display unit 76 when the reception terminal 33 of FIG. 27 acquires station information through channel scanning and thereby receives a service.

As described in FIG. 30, when the user operates the operation unit 81 (of FIG. 27) so as to display the scan operation screen, the scan operation screen with a scan button is displayed on the display unit 76 in the reception terminal 33 as shown in FIG. 31.

When the user operates the scan button on the scan operation screen displayed on the display unit 76, the reception terminal 33 performs channel scanning and thereby acquires NITs and SDTs.

In addition, in the reception terminal 33, the station information acquisition unit 111 acquires the station information from the NIT obtained at the time of the channel scanning.

Further, in the reception terminal 33, the tuning control unit 118 generates the channel list screen on which the service name of a service of one-seg broadcasting is displayed from the NITs and the SDTs acquired through the channel scanning and then causes the screen to be displayed on the display unit 76.

Here, in FIG. 31, the service names of services of normal one-seg broadcasting (general channels) and the service names of services of area-limited broadcasting (area-limited broadcasting channels) are divided and displayed on the channel list screen.

Then, when the user selects any service name (logical channel) displayed on the channel list screen, the reception terminal 33 sets the service of the service name as a selected service, and the tuner 72 is tuned to the selected service.

Then, as a result of the tuning by the tuner 72, a broadcasting reception screen on which an image of the selected service of which TSs can be received is displayed on the display unit 76 of the reception terminal 33.

When the selected service is a service of area-limited broadcasting, a bookmark button is further displayed on the broadcasting reception screen. When the bookmark button is operated, the registration unit 114 of the reception terminal 33 registers station information of the station performing the area-limited broadcasting of the selected service out of the station information acquired by the station information acquisition unit 111 on the station list of the storage unit 115.

Figure 32:
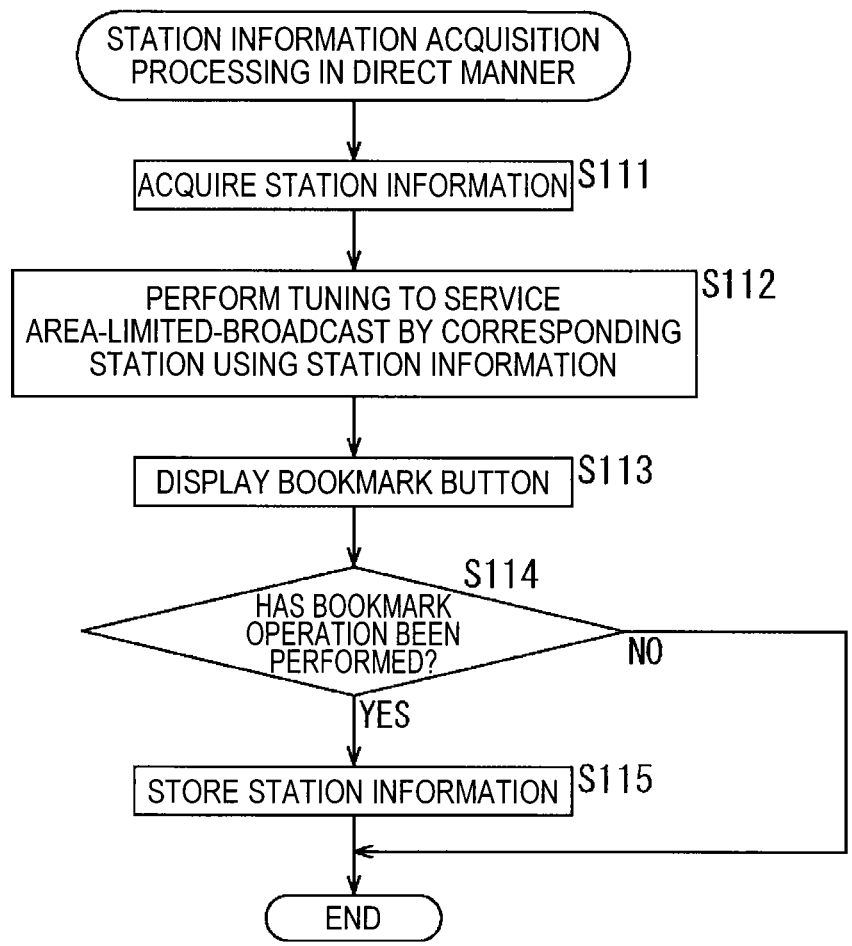
FIG. 32 is a flowchart for describing a process in which station information is acquired in a direct manner and thereby a service is received.

FIG. 32 is a flowchart for describing a process in which the reception terminal 33 of FIG. 27 acquires station information is in a direct manner and thereby receives a service.

When, for example, the user operates the operation unit 81 and brings the reception terminal 33 close to barcodes of a poster on which station information of a predetermined station, for example, is printed in the form of barcodes so as to acquire the station information in a direct manner, the station information acquisition unit 112 (of FIG. 29) reads the barcodes, thereby acquiring the station information and supplies the information to the registration unit 114 and the tuning control unit 118 in Step S111, and then the process proceeds to Step S112.

In Step S112, the tuning control unit 118 performs tuning control to be tuned to the service that is being area-limited-broadcast at the center frequency of the station information using the station information from the station information acquisition unit 112.

In other words, the tuning control unit 118 controls the tuner 72 (of FIG. 27) to be tuned to the center frequency of the station information supplied from the station information acquisition unit 112.

The tuner 72 is tuned to the center frequencies according to the tuning control by the tuning control unit 118, and when area-limited broadcasting is receivable at the center frequency, in other words, when it is possible to obtain TSs of the area-limited broadcasting as a result of the tuning, the tuner supplies the TSs to the demultiplexer 73.

The demultiplexer 73 separates the TSs from the tuner 72 into video data, audio data, and display control information of the area-limited broadcasting, and then supplies the data to the video decoder 74, the audio decoder 77, and the browser 79.

Accordingly, on the display unit 76, an image of the service that is being area-limited-broadcast at the center frequency of the station information acquired by the station information acquisition unit 112 (hereinafter referred to also as a directly acquired service) is displayed, sounds of the directly acquired service are output from the speaker 78, and thereby the user can view the directly acquired service.

Then, the process proceeds from the Step S112 to Step S113, and the tuning control unit 118 causes the bookmark button to be displayed on the display unit 76 through the selection unit 75 so as to be superimposed on the image of the directly acquired service in the same manner as in FIGS. 30 and 31, and then the process proceeds to Step S114.

In Step S114, the registration unit 114 determines whether or not a bookmark operation to operate the bookmark button has been performed.

When the bookmark operation is determined to have been performed in Step S114, the process proceeds to Step S115, and the registration unit 114 registers the station information from the station information acquisition unit 112, that is, station information of the station performing the area-limited broadcasting of the directly acquired service on the station list of the storage unit 115, and then the process ends.

In addition, when the bookmark operation is determined not to have been performed in Step S114, the process skips Step S115, and ends.

Thus, the station information acquired by the station information acquisition unit 112 is registered on the station list of the storage unit 115 only when the bookmark operation has been performed.

Figure 33:
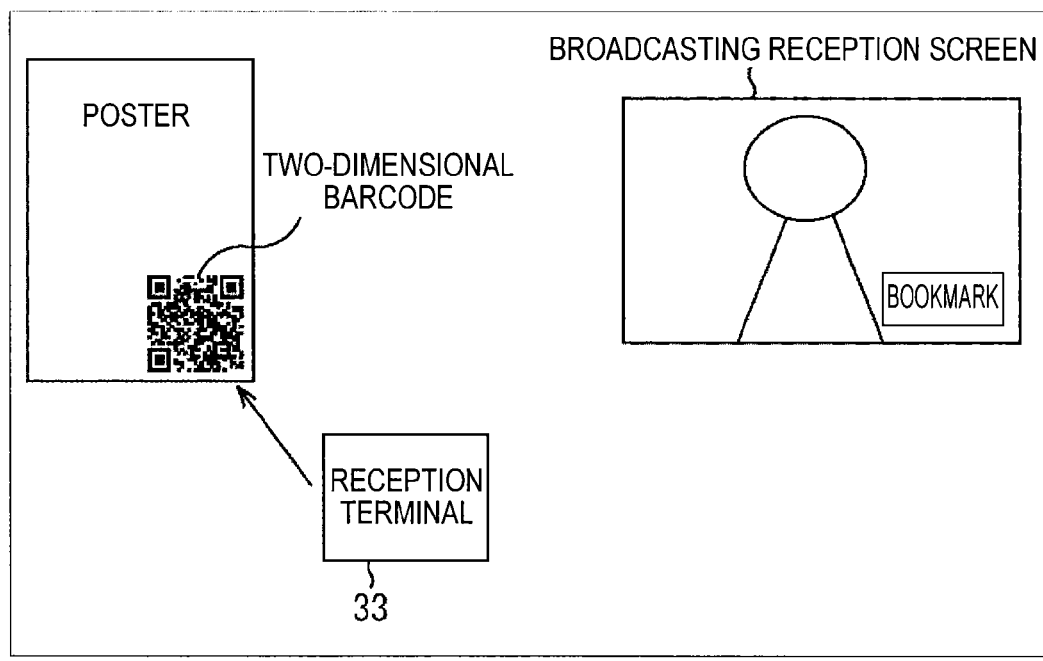
FIG. 33 is a diagram illustrating a display example of the display unit 76 when station information is acquired through the direct scheme and thereby a service is received.

FIG. 33 is a diagram illustrating a display example of the display unit 76 when the reception terminal 33 of FIG. 27 acquires station information through the direct scheme and thereby receives a service.

When the user operates the operation unit 81 and brings the reception terminal 33 close to barcodes of a poster on which station information of a predetermined station, for example, is printed in the form of barcodes so as to acquire the station information in a direct manner, in the reception terminal 33, the station information acquisition unit 112 (of FIG. 29) reads the barcodes, thereby acquires the station information and supplies the information to the registration unit 114 and the tuning control unit 118.

The tuning control unit 118 performs tuning control to be tuned to the service that is being area-limited-broadcast at the center frequency of the station information (directly acquired service) using the station information from the station information acquisition unit 112. The tuner 72 is tuned to the directly acquired service under control of the tuning control unit 118.

Then, as a result of the tuning by the tuner 72, a broadcasting reception screen on which an image of the directly acquired service of which TSs can be received is displayed on the display unit 76 of the reception terminal 33.

When the selected service is a service of area-limited broadcasting, a bookmark button is further displayed on the broadcasting reception screen. When the bookmark button is operated, the registration unit 114 of the reception terminal 33 registers station information (station information of the station performing the area-limited broadcasting of the directly acquired service) acquired by the station information acquisition unit 112 on the station list of the storage unit 115.

Figure 34:
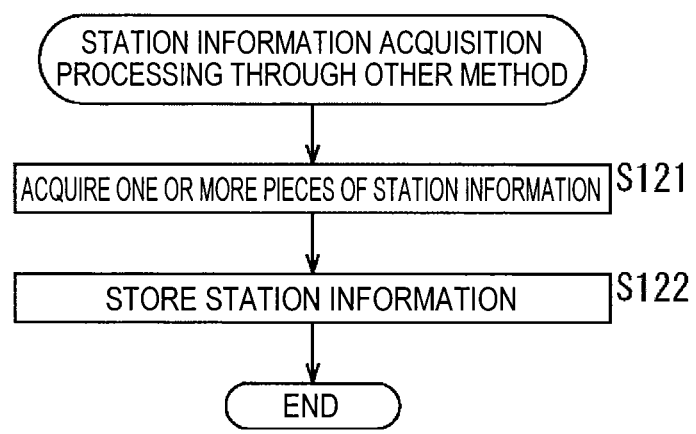
FIG. 34 is a flowchart for describing a process of acquiring station information in another manner.

FIG. 34 is a flowchart for describing a process of the reception terminal 33 of FIG. 27 acquiring station information in another manner.

In Step S121, the station information acquisition unit 113 (of FIG. 29) acquires station information in another manner as described in FIG. 29 and then supplies the information to the registration unit 114, and then the process proceeds to Step S122.

In Step S122, the registration unit 114 registers all station information supplied from the station information acquisition unit 113 on the station list of the storage unit 115, and then the process ends.

Thereby, all of the station information that the station information acquisition unit 113 acquired is registered on the station list of the storage unit 115.

With regard to the station information that the station information acquisition unit 113 acquired, however, only station information of which registration is requested from the user can be registered on the station list of the storage unit 115 like the station information acquired by the station information acquisition units 111 and 112.

[Tuning Process Using Station Information]

Figure 35:
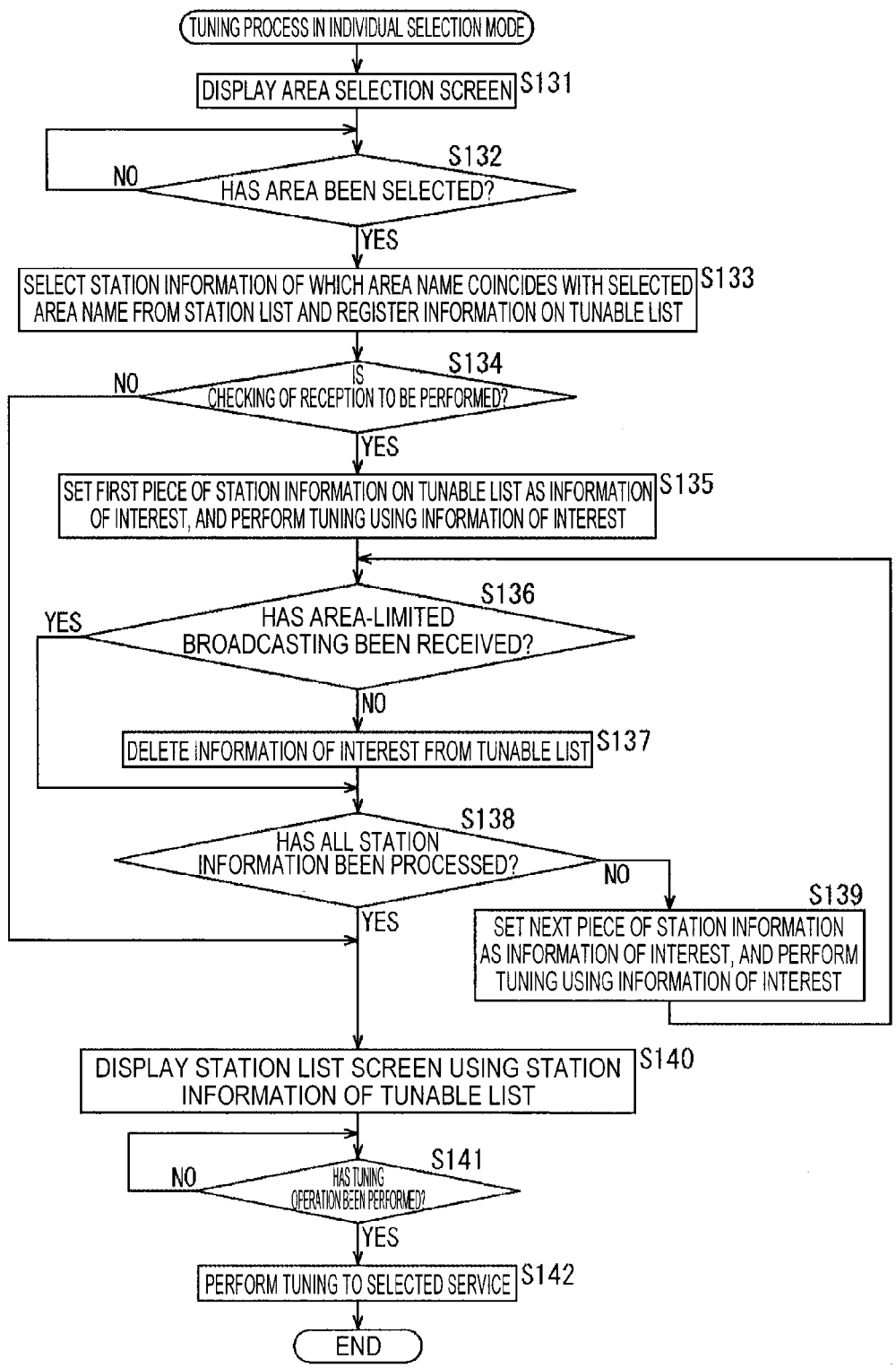
FIG. 35 is a flowchart for describing a tuning process in an individual selection mode.

FIG. 35 is a flowchart for describing a tuning process of the reception terminal 33 performing tuning using station information.

Here, modes of the tuning process include an individual selection mode, a sequential selection mode, a map display mode, and a GPS mode, and the flowchart of FIG. 35 shows the tuning process in the individual selection mode.

Note that a mode to be used to perform the tuning process can be selected by, for example, the user operating the operation unit 81.

In Step S131, the tuning control unit 118 generates an area selection screen, and causes the screen to be displayed on the display unit 76.

In other words, the station selection unit 117 sequentially selects the station information registered on the station list of the storage unit 115 as station information of interest to be noted, and selects the area name identified with the area code of the station information of interest as a display area name to be displayed on the area selection screen.

The area name is the location of the station 32 identified with the area code or the area name of the broadcasting area (area-specific name). Note that the area name may be set to be included in the station information, and in description below, a case in which the area name is included in the station information will be described.

Note that the station selection unit 117 does not select, as a display area name, an area name that coincides with an area name that has already been selected as a display area name.

When the station selection unit 117 selects display area names with all of the station information registered on the station list of the storage unit 115 set as station information of interest, the station selection unit supplies the list of the display area names to the tuning control unit 118.

The tuning control unit 118 generates the area selection screen on which the list of the display area names from the station selection unit 117 is displayed, and causes the screen to be displayed on the display unit 76.

When the area selection screen is displayed in Step S131, the process proceeds to Step S132, and the station selection unit 117 determines whether or not an area name serving as any display area name displayed on the area selection screen has been selected when the user operates the operation unit 81.

Here, when many display area names are displayed on the area selection screen, there are cases in which the user has difficulty in selecting his or her desired display area name.

Thus, the number of display area names to be displayed on the area selection screen can be limited.

In other words, when the station selection unit 117 has, for example, a function of acquiring a current location such as a GPS function, a display area name to be displayed on the area selection screen can be limited only to the display area name of an area close to the current location such that the station selection unit 117 only supplies the display area name of the area close to the current location to the tuning control unit 118.

When no display area name displayed on the area selection screen is determined to have been selected in Step S132, the process returns to Step S132.

In addition, when any display area name displayed on the area selection screen is determined to have been selected in Step S132, the process proceeds to Step S133, and the station selection unit 117 sets the display area name selected from the area selection screen as a selected area name, and then selects station information of which an area name coincides with the selected area name from the station information registered on the station list of the storage unit 115.

Further, the station selection unit 117 registers the station information selected from the station information registered on the station list of the storage unit 115 on a tunable list on which station information of tunable stations is registered, supplies the information to the tuning control unit 118, and then the process proceeds to Step S134.

In Step S134, the tuning control unit 118 determines whether or not checking of reception of (area-limited broadcasting by) the station of which station information has been registered on the tunable list supplied from the station selection unit 117, i.e., the tunable station, is to be performed.

Here, the checking of reception of the tunable station is checking of actual reception of area-limited broadcasting (service) by the tunable station, i.e., checking that TSs of the area-limited broadcast can be obtained when the area-limited broadcasting by the tunable station is tuned.

Whether or not to perform the checking of reception can be set by, for example, operating the operation unit 81.

When the checking of reception is determined not to be performed in Step S134, the process skips Steps S135 to S139, and proceeds to Step S140 without performing the checking of reception.

In addition, when the checking of reception is determined to be performed in Step S134, the process proceeds to Step S135, and the checking of reception is performed thereafter in Steps S135 to S139.

In other words, in Step S135, the tuning control unit 118 selects the first piece of station information on the tunable list from the station selection unit 117 as station information of interest (hereinafter referred to also as information of interest).

Further, in Step S135, the tuning control unit 118 performs tuning control to control the tuner 72 to be tuned to the service that is being area-limited broadcast at the center frequency of the station information of interest using the station information of interest Then, the process proceeds from Step S135 to Step S136, and the tuning control unit 118 determines whether the service that was being area-limited-broadcast at the center frequency of the station information of interest has been received, in other words, whether or not the tuner 72 TSs were obtained as a result of the tuning.

In Step S136, when the service that was being area-limited-broadcast at the center frequency of the station information of interest is determined not to have been received, the process proceeds to Step S137, the tuning control unit 118 deletes the station information of interest from the tunable list, and the process proceeds to Step S138.

In other words, when the TSs of the service of the area-limited broadcasting by the station of interest that is the station corresponding to the station information of interest has not been received because, for example, a current location is within the broadcasting area of the station of interest but there is an obstacle such as a building between the station of interest and the current location, the current location is too far from the station of interest, or the like, the tuning control unit 118 excludes the station of interest from the tunable stations by deleting the station information of interest from the tunable list.

On the other hand, when it is determined the service that is being area-limited-broadcast at the center frequency of the station information of interest has been received, the process skips Step S137, and proceeds to Step S138, and the tuning control unit 118 determines whether or not all of the station information on the tunable list has been set as station information of interest.

When it is determined that there is station information that has not yet been set as station information of interest in the station information of the tunable list in Step S138, the process proceeds to Step S139, and the tuning control unit 118 selects the next piece of station information to the station information that is currently set as station information of interest out of the station information on the tunable list as new station information of interest.

Further, the tuning control unit 118 performs tuning control to control the tuner 72 to be tuned to the service that is being area-limited-broadcast at the center frequency of the station information of interest using the station information of interest in Step S139, and then the process returns to Step S136.

In addition, when all of the station information on the tunable list is determined to have been set as station information of interest in Step S138, in other words, when checking of reception of all station information on the tunable list has been completed, the process proceeds to Step S140, and the tuning control unit 118 generates the station list screen and causes the screen to be displayed on the display unit 76.

In other words, in Step S140, the tuning control unit 118 ascertains the station name identified with the station ID of the tunable station from the station information on the tunable list.

Then, the tuning control unit 118 generates the station list screen that is a list displaying a table of the station names of tunable stations and causes the screen to be displayed on the display unit 76, and the process proceeds from Step S140 to Step S141.

In Step S141, the tuning control unit 118 determines whether or not the user has performed a tuning operation, and when the user is determined not to have performed the operation, the process returns to Step S141.

Here, the tuning operation refers to an operation of selecting a station and selecting a service for which the station performs area-limited broadcasting.

In other words, the user can select the station name of his or her desired station (tunable station) from the station names displayed on the station list screen by operating the operation unit 81.

In Step S141, it is determined whether or not the tuning operation to select the station name of the selected station from the station names displayed on the station list screen has been performed.

When the tuning operation is determined to have been performed in Step S141, in other words, when one station has been selected as a selected station from the station list screen and a selected service has been selected, the process proceeds to Step S142, and the tuning control unit 118 performs tuning control to cause the tuner 72 to be tuned to the selected service, and thereby the tuning process in the individual selection mode ends.

As described above, in the reception terminal 33, the station information acquisition units 111 to 113 acquire the station information and the storage unit 115 stores the station information.

Furthermore, the station selection unit 117 selects a station having an area name that coincides with a display area name that the user selected, i.e., a station performing area-limited broadcasting that is receivable at the location of the display area name that the user selected as a tunable station to which the terminal can be tuned using area names included in the station information stored in the storage unit 115, and the name of the station is registered on the tunable list.

In addition, the tuning control unit 118 causes the station list screen on which the station names registered on the tunable list are displayed to be displayed as information of tunable stations, and performs tuning control of the service (selected service) for which the tunable station selected by the user is performing area-limited-broadcast on the station list screen.

Accordingly, the reception terminal 33 can quickly present (the service of) the area-limited broadcasting that is receivable at the location of the display area name selected by the user in the form of the station list screen after acquisition of the station information.

Note that when the checking of reception is not performed, there are cases in which it is not possible to receive the service for which the tunable station selected by the user is performing area-limited broadcasting from the station list screen.

In addition, when a plurality of frequencies for transmission are listed in frequency information arranged in the terrestrial delivery system descriptor at the time of the MFN operation, tuning control is performed using a transmission frequency specified based on a frequency tag included in the station information. Accordingly, it is possible to easily cope with a complicated configuration of a frequency of a transmission point at the time of MFN operation.

Figure 36:
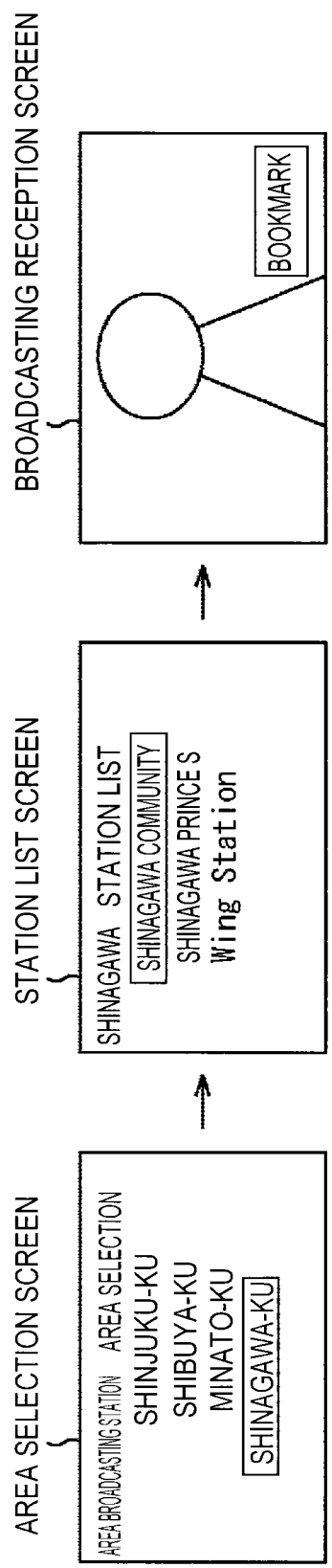
FIG. 36 is a diagram illustrating a display example of the display unit 76 when a tuning process is performed in the individual selection mode.

FIG. 36 is a diagram showing a display example of the display unit 76 when the reception terminal 33 of FIG. 27 performs the tuning process in the individual selection mode.

In the individual selection mode, the area selection screen on which area names of station information are displayed as display area names is displayed on the display unit 76 as described in FIG. 35.

When the user selects any one of the display area names displayed on the area selection screen, a station corresponding to station information of which an area name of the station information registered on the station list of the storage unit 115 coincides with the selected area name that is the display area name selected on the area selection screen is set as a tunable station, and the station list screen on which the station name of the tunable station is displayed is displayed on the display unit 76.

Here, in FIG. 36, display area names "Shinjuku-ku," "Shibuya-ku," "Minato-ku," and "Shinagawa-ku" are displayed on the area selection screen, and among the display area names, "Shinagawa-ku" is selected.

Furthermore, in FIG. 36, as stations of which an area name of station information is set to "Shinagawa-ku," there are three stations with station names "Shinagawa Community," "Shinagawa Prince S," and "Wing Station," and on the station list screen, the station names "Shinagawa Community," "Shinagawa Prince S," and "Wing Station" are displayed.

When the user selects any one of the station names displayed on the station list screen, the display unit 76 displays a broadcasting reception screen on which an image of a selected service for which a selected station of which the station name has been selected by the tuner 72 (tunable station) is performing area-limited broadcasting is displayed.

Figure 37:
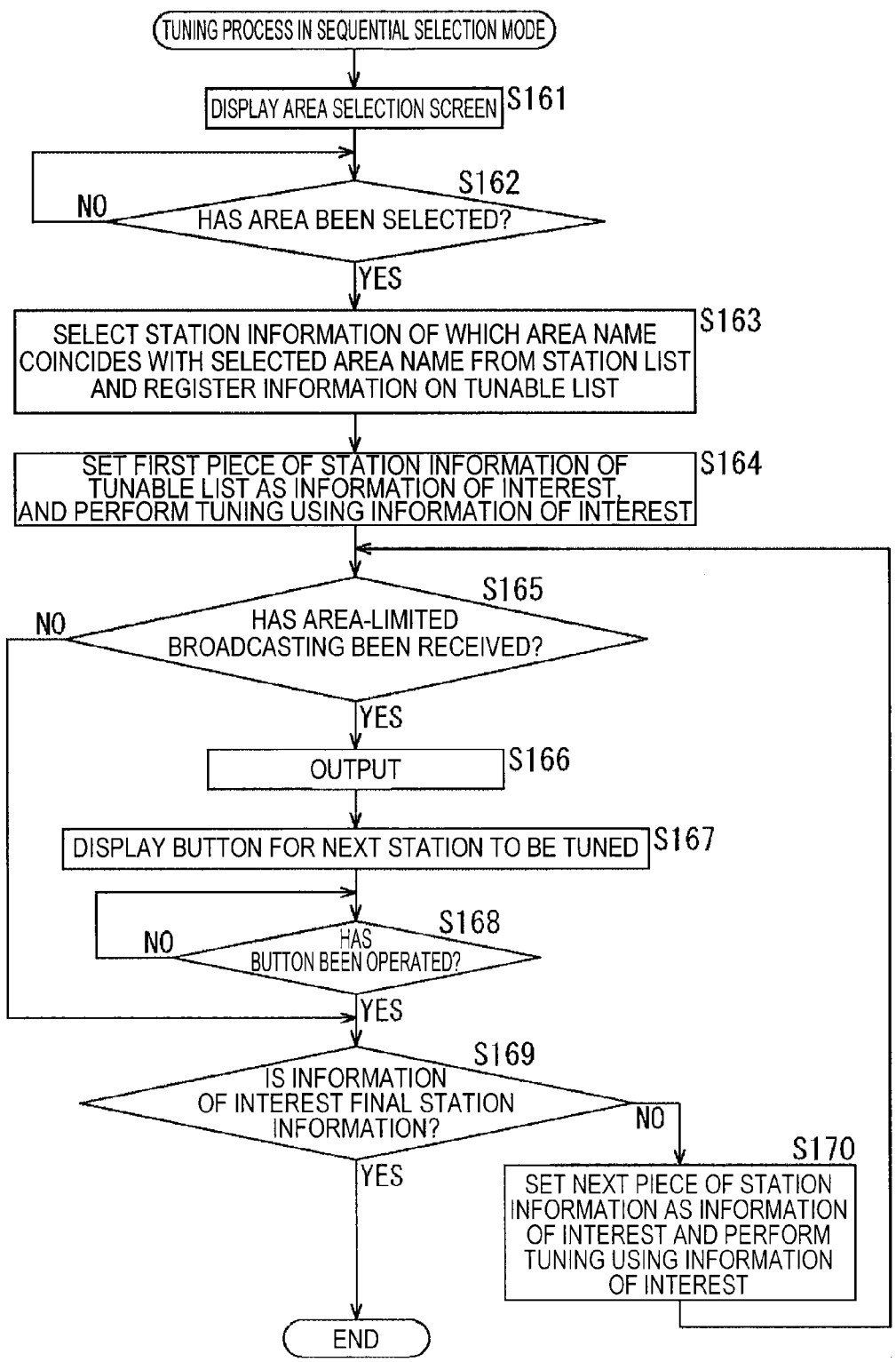
FIG. 37 is a flowchart for describing a tuning process in a sequential selection mode.

FIG. 37 is a flowchart for describing a tuning process in the sequential selection mode of the tuning process by the reception terminal 33 to perform tuning using station information.

In the tuning process in the sequential selection mode, the same processes as Steps S131 to S133 of FIG. 35 are performed in Steps S161 to S163.

In other words, when the display unit 76 displays the area selection screen and the user selects an area name as any one of display area names displayed on the area selection screen, the display area name selected on the area selection screen is set as a selected area name, and station information of which an area name coincides with the selected area name is selected from the station information registered on the station list of the storage unit 115 as station information of a tunable station, and is registered on the tunable list.

Then, in Step S164, the tuning control unit 118 selects the first piece of station information of the tunable list as station information of interest.

Further, in Step S164, the tuning control unit 118 performs tuning control to control the tuner 72 to be tuned to the service that is being area-limited-broadcast at the center frequency of the station information of interest using the station information of interest, and then the process proceeds to Step S165.

In Step S165, and the tuning control unit 118 determines whether the service that was being area-limited-broadcast at the center frequency of the station information of interest has been received, in other words, whether or not the tuner 72 TSs were obtained as a result of the tuning.

When it is determined in Step S165 that the service that was being area-limited-broadcast at the center frequency of the station information of interest has not been received, the process skips Steps S166 to S168, and proceeds to Step S169.

In addition, when it is determined in Step S165 that the service that was being area-limited-broadcast at the center frequency of the station information of interest has been received, the process proceeds to Step S166, and the tuning control unit 118 causes the service being area-limited-broadcast at the center frequency of the station information of interest to be output from the display unit 76 and the speaker 78.

In other words, the tuning control unit 118 causes an image of the service of which TSs were obtained by the tuner 72 to be displayed on the display unit 76, and sounds of the service to be output from the speaker 78.

Then, the process proceeds from Step S166 to Step S167, and the tuning control unit 118 causes the image of the service being area-limited-broadcast at the center frequency of the station information of interest and a "next channel" button for being tuned to the service for which a station corresponding to the next station information on the tunable list is performing area-limited broadcasting to be displayed on the display unit 76, and then the process proceeds to Step S168.

In Step S168, the tuning control unit 118 determines whether or not the "next channel" button has been operated, and when it is determined not to have been operated, the process returns to Step S168.

In addition, when the "next channel" button is determined to have been operated in Step S168, the process proceeds to Step S169, and the tuning control unit 118 determines whether or not all of the station information on the tunable list has been set as station information of interest.

When it is determined that there is station information that has not yet been set as station information of interest in the station information of the tunable list in Step S169, the process proceeds to Step S170, and the tuning control unit 118 selects the next piece of station information to the station information that is currently set as station information of interest out of the station information on the tunable list as new station information of interest.

Further, the tuning control unit 118 performs tuning control to control the tuner 72 to be tuned to the service that is being area-limited-broadcast at the center frequency of the station information of interest using the station information of interest in Step S170, and then the process returns to Step S165.

In addition, when all of the station information on the tunable list is determined to have been set as station information of interest in Step S169, the tuning process in the sequential selection mode ends.

Note that, when a plurality of frequencies for transmission are listed in frequency information arranged in the terrestrial delivery system descriptor at the time of the MFN operation, tuning control is performed using a transmission frequency specified based on a frequency tag included in the station information. Accordingly, it is possible to easily cope with a complicated configuration of a frequency of a transmission point at the time of MFN operation.

Figure 38:
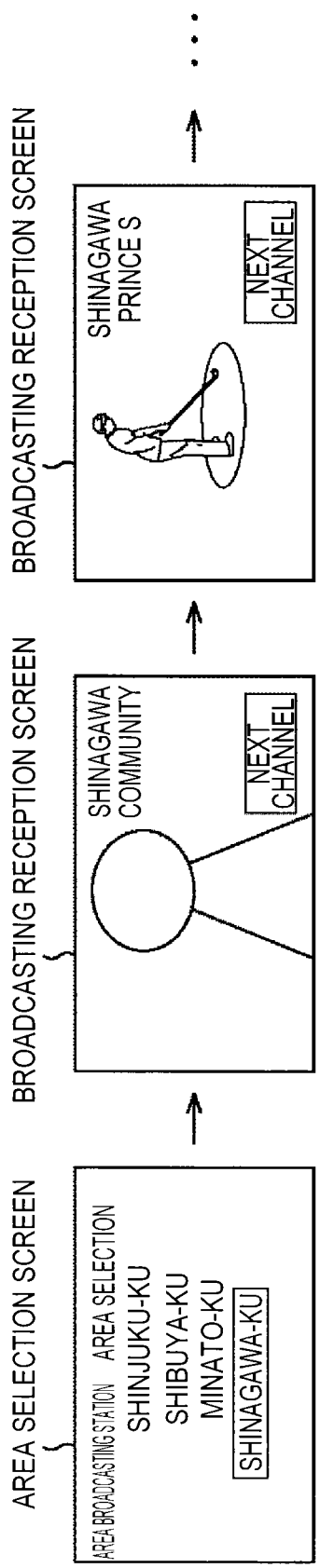
FIG. 38 is a diagram illustrating a display example of the display unit 76 when the tuning process is performed in the sequential selection mode.

FIG. 38 is a diagram illustrating a display example of the display unit 76 when the tuning process is performed in the sequential selection mode in the reception terminal 33 of FIG. 27.

In the sequential selection mode, the area selection screen on which area names of station information are displayed as display area names is displayed on the display unit 76 as described in FIG. 37.

When the user selects any one of the display area names displayed on the area selection screen, a station corresponding to station information of which an area name of the station information registered on the station list of the storage unit 115 coincides with the selected area name that is the display area name selected on the area selection screen is set as a tunable station, and station information of the tunable station is registered on the tunable list.

Then, the first piece of station information on the tunable list is selected as station information of interest, and a service that is being area-limited-broadcast at the center frequency of the station information of interest is tuned to.

As a result of the tuning, when TSs of the service being area-limited-broadcast at the center frequency of the station information of interest are obtained, a broadcasting reception screen on which an image of the service is displayed is displayed on the display unit 76, and sounds of the service are output from the speaker 78.

Further, the "next channel" button is displayed on the broadcasting reception screen.

When the user operates the "next channel" button, the next station information to the station information currently set as the station information of interest out of the station information on the tunable list is selected as new station information of interest, and a service being area-limited-broadcast at the center frequency of the station information of interest is tuned to.

As a result of the tuning, when TSs of the service being area-limited-broadcast at the center frequency of the station information of interest are obtained, a broadcasting reception screen on which an image of the service is displayed is displayed on the display unit 76, and sounds of the service are output from the speaker 78.

In addition, in the same manner as described above, the "next channel" button is displayed on the broadcasting reception screen, and in the same manner thereafter, each time the "next channel" button is operated, services being area-limited-broadcast by tunable stations of which station information is registered on the tunable list are sequentially tuned to.

Figure 39:
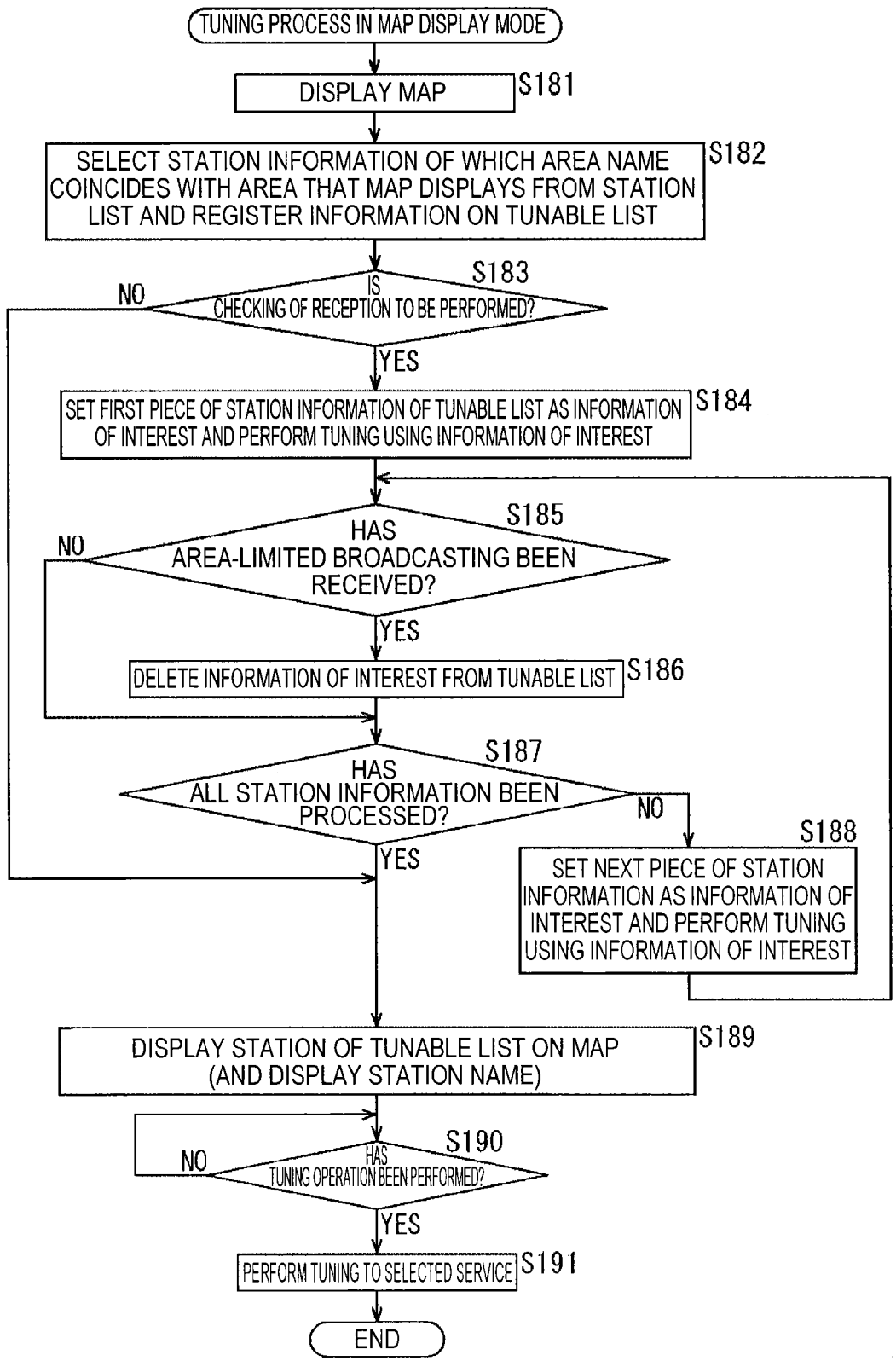
FIG. 39 is a flowchart for describing a tuning process in a map display mode.

FIG. 39 is a flowchart for describing a tuning process in the map display mode of the tuning process by the reception terminal 33 to perform tuning using station information.

In Step S181, the tuning control unit 118 causes a map to be displayed on the display unit 76 according to a user operation, and then the process proceeds to Step S182.

In other words, the tuning control unit 118 causes data of the map to be stored in a memory installed therein, and when the user operates the operation unit 81 to cause a map of a predetermined area to be displayed, for example, the tuning control unit causes the map of the predetermined area to be displayed on the display unit 76 according to the operation.

In Step S182, the station selection unit 117 sets the name of an area included on the map displayed on the display unit 76 as an area name of interest to be noted as in the case of Step S133 of FIG. 35, and selects station information of which an area name coincides with the area name of interest from the station information registered on the station list of the storage unit 115.

Further, the station selection unit 117 registers the station information selected from the station information registered on the station list of the storage unit 115 on the tunable list on which station information of tunable stations is registered, and supplies the information to the tuning control unit 118, and then the process proceeds to Step S183.

In Step S183, the tuning control unit 118 determines whether or not checking of reception is to be performed as in Step S134 of FIG. 35.

When the checking of reception is determined not to be performed in Step S183, the process skips Steps S184 to S188, and proceeds to Step S189 without performing the checking of reception.

In addition, when the checking of reception is determined to be performed in Step S183, the process proceeds to Step S184, the same processes as Steps S135 to S139 of FIG. 35 are performed in Steps S184 to S188, and thereby the checking of reception is performed.

Then, the checking of reception is completed in Steps S184 to S188, with respect to a tunable station that is a station of which station information has been registered on the tunable list, the tuning control unit 118 causes a mark indicating the tunable station to be displayed at the position of the tunable station indicated with transmitting station longitude, transmitting station latitude, and transmitting station altitude of the station information of the tunable station on the map of the display unit 76 in Step S189.

Note that the station name of the tunable station as well as the map and the mark indicating the tunable station can be displayed on the display unit 76.

Then, the process proceeds from Step S189 to Step S190, and the tuning control unit 118 determines whether or not the user has performed a tuning operation for performing selection of the station and selection of a service that is being area-limited-broadcast by the station, and when the user is determined not to have performed the operation, the process returns to Step S190.

In other words, the user can select his or her desired station (tunable station) from stations whose mark and station name are displayed by operating the operation unit 81 on the map of the display unit 76.

In Step S190, it is determined whether or not a tuning operation that is selection of the station name of the selected station from selection of the selected station on the map has been performed.

When the tuning operation is determined to have been performed in Step S190, in other words, when one station on the map has been selected as a selected station and a selected service has been selected, the process proceeds to Step S191, and the tuning control unit 118 performs tuning control to cause the tuner 72 to be tuned to the selected service, and thereby the tuning process in the map display mode ends.

Note that, when a plurality of frequencies for transmission are listed in frequency information arranged in the terrestrial delivery system descriptor at the time of the MFN operation, tuning control is performed using a transmission frequency specified based on a frequency tag included in the station information. Accordingly, it is possible to easily cope with a complicated configuration of a frequency of a transmission point at the time of MFN operation.

Figure 40:
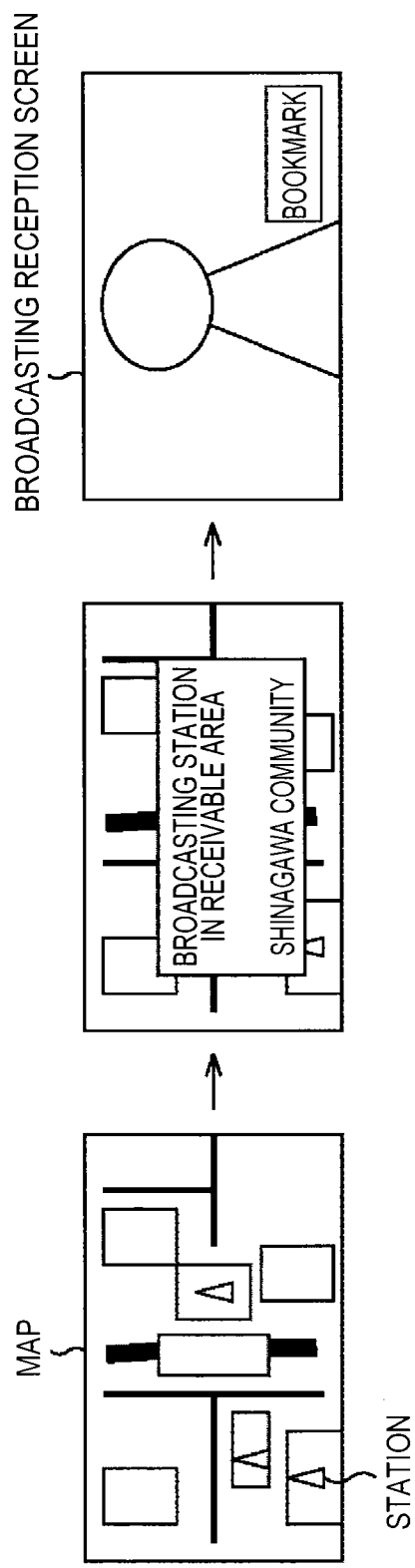
FIG. 40 is a diagram illustrating a display example of the display unit 76 when the tuning process is performed in the map display mode.

FIG. 40 is a diagram showing a display example of the display unit 76 when the reception terminal 33 of FIG. 27 performs the tuning process in the map display mode.

In the map display mode, the map is displayed on the display unit 76 as described in FIG. 39.

Furthermore, in the map display mode, the mark indicating the tunable station (the triangular mark in FIG. 40) is displayed at the position of the tunable station on the map of the display unit 76.

When the user performs an operation of focusing, so to speak, on a mark indicating any tunable station on the map, the station name of the tunable station corresponding to the mark ("Shinagawa Community" in FIG. 40) is displayed in, for example, a superimposed manner on the map on the display unit 76.

Then, when the user selects any tunable station of which a mark is being displayed on the map, the tuner 72 receives a selected service for which the selected station that is a tunable station selected by the user performs area-limited broadcasting, and a broadcasting reception screen on which an image of the selected service is displayed on the display unit 76.

Figure 41:
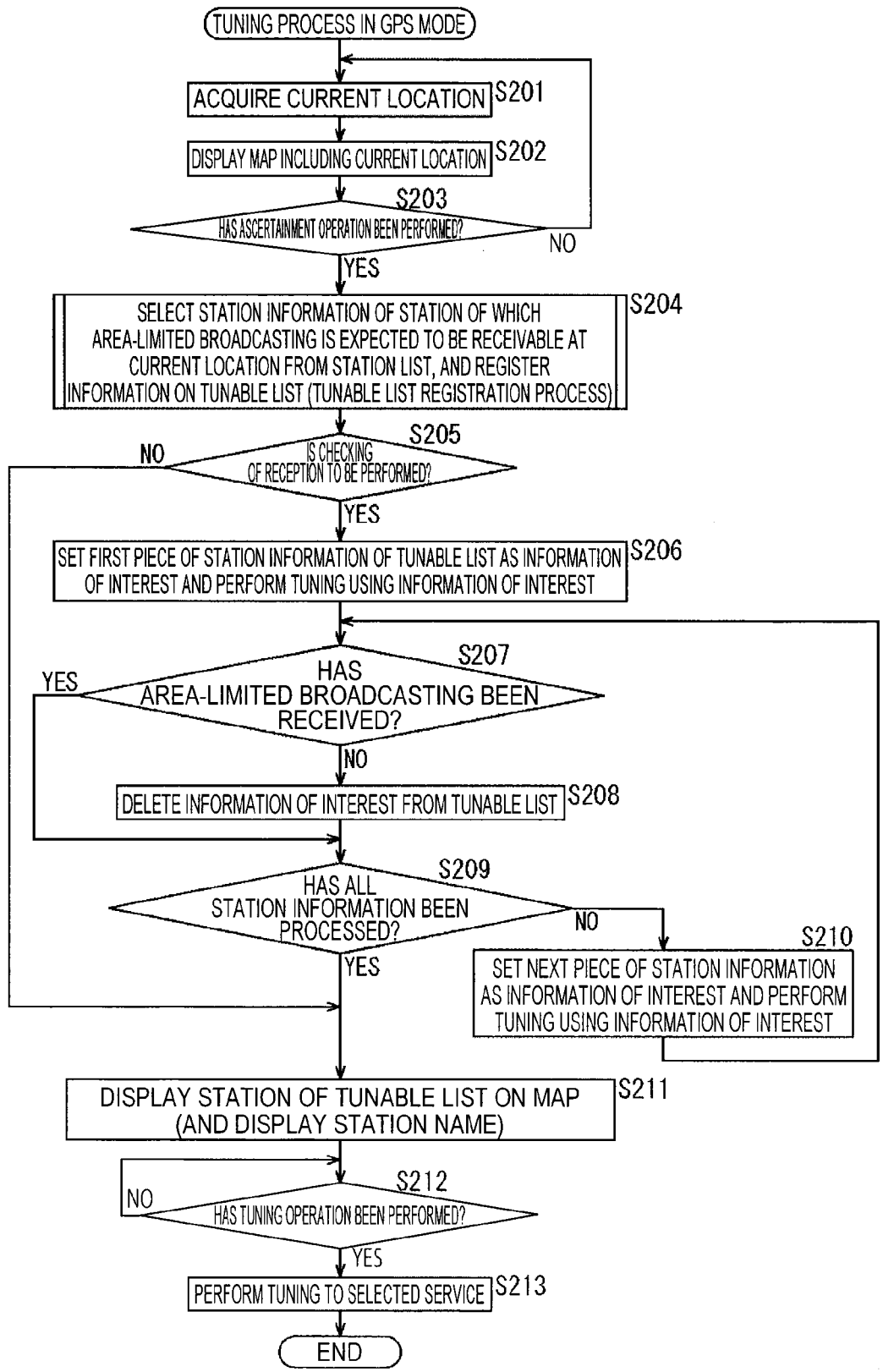
FIG. 41 is a flowchart for describing a tuning process in a GPS mode.

FIG. 41 is a flowchart for describing a tuning process in the GPS mode of the tuning process by the reception terminal 33 to perform tuning using station information.

Note that, when a tuning process in the GPS mode is performed, the station selection unit 117 has, for example, the function of acquiring a current location such as the GPS function.

In Step S201, the station selection unit 117 acquires a current location (of the reception terminal 33), supplies the location to the tuning control unit 118, and then the process proceeds to Step S202.

In Step S202, the tuning control unit 118 causes a map that includes the current location supplied from the station selection unit 117 to be displayed on the display unit 76, and then the process proceeds to Step S203.

In other words, the tuning control unit 118 stores data of the map in a memory installed therein, and causes the map of a predetermined range including the current location supplied from the station selection unit 117 to be displayed on the display unit 76.

In Step S203, the control unit 80 determines whether or not an ascertainment operation of operating the operation unit 81 has been performed so that the user ascertains a service of area-limited broadcasting that is receivable at the current location, and when the ascertainment operation is determined not to have been performed, the process returns to Step S201.

In addition, in Step S203, when the ascertainment operation is determined to have been performed, the process proceeds to Step S204, and the station selection unit 117 selects station information of a station being area-limited-broadcast that is expected to be receivable at the current location from the station information registered on the station list of the storage unit 115, and then performs a tunable list registration process of registering the information on a tunable list.

In other words, in the tunable list registration process, according to reception sensitivity computed using service area information included in station information of a station of interest, a tunable station is selected from stations transmitting broadcasting waves of area-limited broadcasting, and station information of the tunable station is registered on the tunable list.

In other words, in the tunable list registration process, according to receivable distance computed using service area information included in station information of a station of interest, a tunable station is selected from stations transmitting broadcasting waves of area-limited broadcasting, and station information of the tunable station is registered on the tunable list.

Note that details of the tunable list registration process will be described later.

Then, the process proceeds from Step S204 to Step S205, and the tuning control unit 118 determines whether or not checking of reception of (area-limited broadcasting by) the station of which station information has been registered on the tunable list from the station selection unit 117, i.e., the tunable station, is to be performed as in Step S134 of FIG. 35.

When the checking of reception is determined not to be performed in Step S205, the process skips Steps S206 to S210, and proceeds to Step S211 without performing the checking of reception.

In addition, when the checking of reception is determined to be performed in Step S205, the process proceeds to Step S206, the same processes as Steps S135 to S139 of FIG. 35 are performed in Steps S206 to S210, and thereby the checking of reception is performed.

Then, when the checking of reception ends in Steps S206 to S210, the tuning control unit 118 causes the station name and the mark indicating the tunable station that is a station of which station information has been registered on the tunable list to be displayed on the map of the display unit 76 as in Step S189 of FIG. 39.

Then, the process proceeds from Step S211 to Step S212, and thereafter, the same processes as Steps S190 and S191 of FIG. 39 are performed in Steps S212 and S213, and then the tuning process in the GPS mode ends.

Note that, when a plurality of frequencies for transmission are listed in frequency information arranged in the terrestrial delivery system descriptor at the time of the MFN operation, tuning control is performed using a transmission frequency specified based on a frequency tag included in the station information. Accordingly, it is possible to easily cope with a complicated configuration of a frequency of a transmission point at the time of MFN operation.

Figure 42:
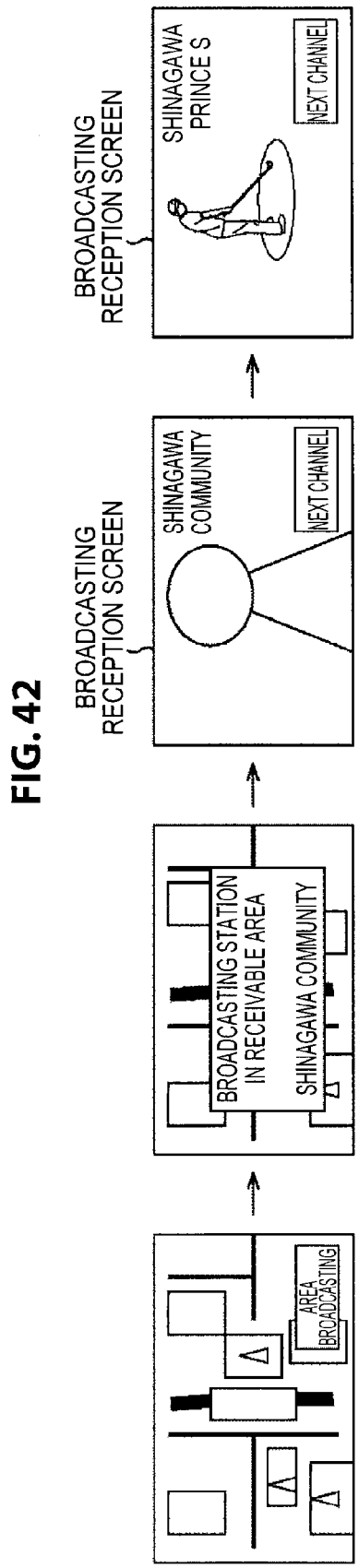
FIG. 42 is a diagram illustrating a display example of the display unit 76 when the tuning process is performed in the GPS mode.

FIG. 42 is a diagram showing a display example of the display unit 76 when the reception terminal 33 of FIG. 27 performs the tuning process in the GPS mode.

In the GPS mode, for example, the map having a current location at the center thereof is displayed on the display unit 76.

Furthermore, in the GPS mode, the mark indicating the tunable station (the triangular mark in FIG. 42) is displayed at the position of the tunable station on the map of the display unit 76.

When the user performs an operation of focusing on a mark indicating any tunable station on the map, in the same manner as in the case of FIG. 40, the station name of the tunable station corresponding to the mark ("Shinagawa Community" and "Shinagawa Prince S" in FIG. 42) is displayed in, for example, a superimposed manner on the map on the display unit 76.

Then, when the user selects any tunable station of which a mark is being displayed on the map, the tuner 72 receives a selected service for which the selected station that is a tunable station selected by the user performs area-limited broadcasting, and a broadcasting reception screen on which an image of the selected service is displayed on the display unit 76.

When there are a plurality of tunable stations, the "next channel" button is also displayed on the broadcasting reception screen.

When the user operates the "next channel" button, the reception terminal 33 sets a selected service which a tunable station other than the selected station provides as a new selected service and is tuned to the selected service.

Then, a broadcasting display screen on which an image of the selected service is displayed is displayed on the display unit 76. In addition, on the broadcasting reception screen, the "next channel" button is displayed if necessary as in the above-described case.

Note that, in the selection process in the GPS mode, a station list screen on which the station names of tunable stations are simply displayed can be displayed, without displaying a map.

Figure 43:
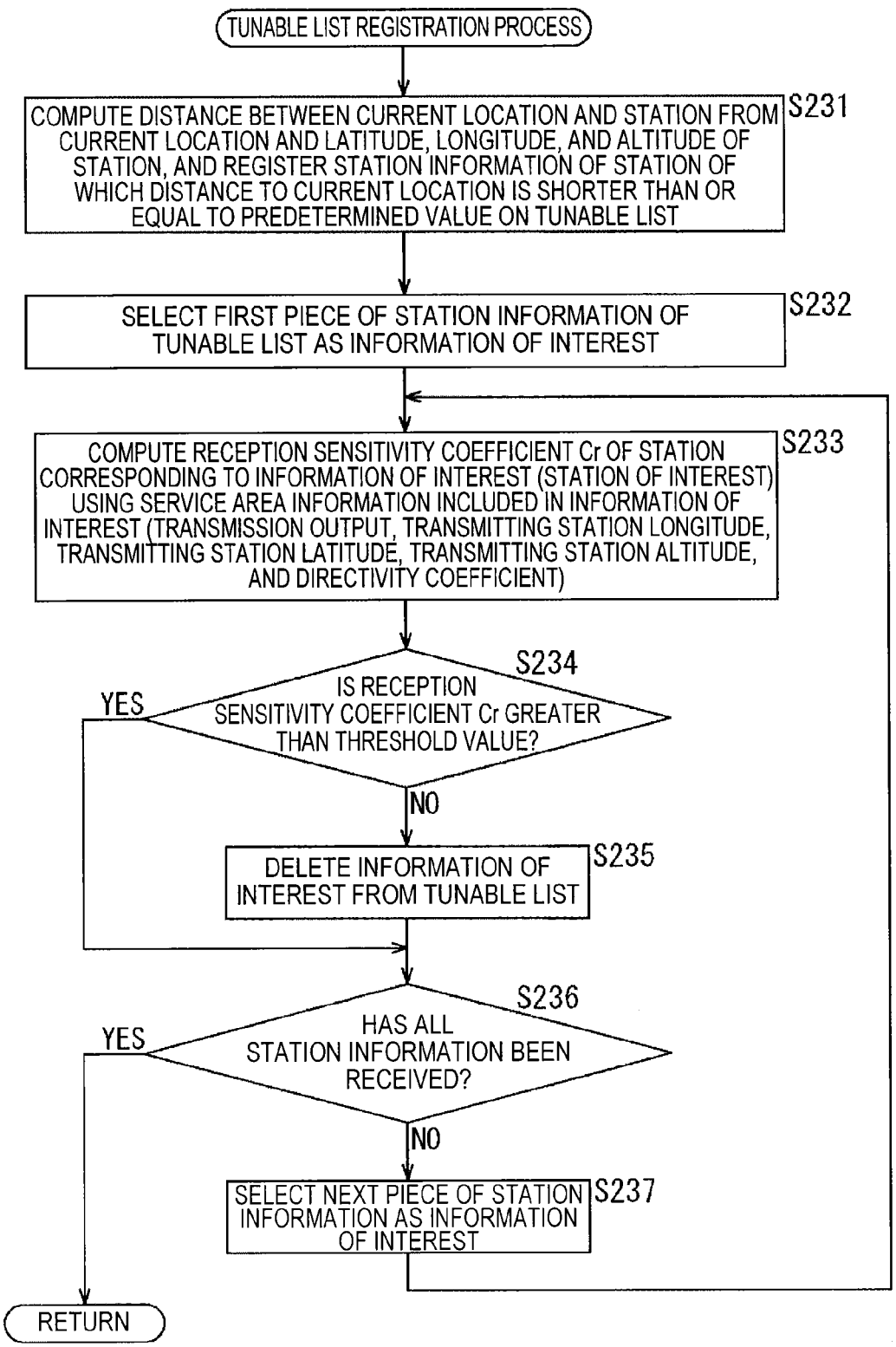
FIG. 43 is a flowchart for describing a tunable list registration process.

FIG. 43 is a flowchart for describing the tunable list registration process performed in Step S204 of FIG. 41.

In the tunable list registration process of FIG. 43, the station selection unit 117 sequentially selects stations of which station information is registered on the station list of the storage unit 115 as stations of interest to be noted in Step S231.

Further, the station selection unit 117 computes the distances between a current location and each of the stations of interest using transmitting station longitude, transmitting station latitude, and transmitting station altitude of the station information of the stations of interest.

Then, when the distance between the current location and a station of interest is equal to or shorter than a predetermined value, the station selection unit 117 sets the station of interest as (a candidate for) a tunable station, and registers station information thereof on the tunable list. As the predetermined value, however, a receivable distance of the station information of the station of interest can be used.

As described above, the station selection unit 117 performs pre-processing to (preliminarily) register the station information of the station of interest on the tunable list based on the distance between the current location and the station of interest.

When the station selection unit 117 completes pre-processing for all of the stations of which station information has been registered on the station list of the storage unit 115 which are set as stations of interest, the process proceeds from Step S231 to Step S232, and thereafter, the station selection unit 117 performs a selection process of selecting a tunable station (deleting station information of a station that is not eligible as a tunable station from the tunable list) based on a reception sensitivity coefficient Cr to be described later targeting the stations of which station information is registered on the tunable list.

Here, in FIG. 43, the pre-processing of Step S231 described above can be set not to be performed.

However, when the pre-processing of Step S231 is not performed, the selection process performed in Step S232 and the following steps should be performed with respect to all stations of which station information has been registered on the station list of the storage unit 115, rather than a station of which station information has been registered on the tunable list.

Therefore, when the pre-processing is not performed, it is necessary to perform the selection process of computing the reception sensitivity coefficient Cr and the like for all stations of which station information has been registered on the station list of the storage unit 115.

On the other hand, when the pre-processing is performed, the reception sensitivity coefficient Cr may be computed only for a station of which station information has been registered on the tunable list, and as a result, a load of the selection process can be reduced.

Thus, the pre-processing can be said to be a process of narrowing down, so to speak, stations that are subject to the selection process.

In Step S232, the station selection unit 117 selects the first piece of station information of the tunable list as station information of interest (information of interest), and then the process proceeds to Step S233.

In Step S233, the station selection unit 117 computes the reception sensitivity coefficient Cr of the station of interest that is a station corresponding to the station information of interest using a transmission output, transmitting station longitude, transmitting station latitude, transmitting station altitude, and a directivity coefficient of the station information of interest, and then the process proceeds to Step S234.

Here, the reception sensitivity coefficient Cr of the station of interest is a value corresponding to a reception level of broadcasting waves when the broadcasting waves from the station of interest are received at a current location, which is a value serving as an index for determining whether or not area-limited broadcasting by the station of interest is receivable at the current location. In addition, the directivity coefficient is a coefficient computed based on the area pattern bitmap (of FIG. 17) for the station of interest.

The reception sensitivity coefficient Cr of the station of interest is computed according to, for example, the following formula (1) when the transmitting station longitude, transmitting station latitude, and transmitting station altitude of the station of interest are denoted by Sx, Sy, and Sz, respectively, longitude, latitude, and altitude of the current location by Rx, Ry, and Rz, respectively, the transmission output of the station of interest by Ep, and the directivity coefficient by f(dir).

[Math 1]

$$Cr = \frac{\log(Ep * f(dir))}{\sqrt{(Sx - Rx)^2 + (Sy - Ry)^2 + (Sz - Rz)^2}} \quad (1)$$

Note that, in formula (1), dir of f(dir) indicates each direction in the area pattern bitmap (of FIG. 7) for the station of interest, and by calculating the coefficient, for example, the directivity coefficient is computed according to bits allocated to a predetermined direction. The dir, however, is assumed to extract the closest direction from latitude and longitude of the current location and latitude and longitude of the station of interest. In addition, "*" of formula (1) indicates multiplication, and by calculating log(Ep*f(dir)), a transmission output with directivity added thereto is computed.

In Step S234, the station selection unit 117 determines whether or not the reception sensitivity coefficient Cr of the station of interest is (equal to or) greater than a threshold value θ.

Here, as the threshold value θ, a value of the reception sensitivity coefficient with which the reception terminal 33 can satisfactorily receive broadcasting waves of area-limited broadcasting (for example, at a predetermined S/N (signal-to-noise ratio)) is employed.

In addition, the reciprocal of the reception sensitivity coefficient Cr of the station of interest corresponds to the radius of a circle of the broadcasting area of the station of interest.

In Step S234, when the reception sensitivity coefficient Cr of the station of interest is determined not to be greater than the threshold value θ, in other words, when (it is highly likely that) it is not possible to (satisfactorily) receive area-limited broadcasting by the station of interest at the current location, the process proceeds to Step S235. Then, the station selection unit 117 deletes the station information of interest from the tunable list, and accordingly the station of interest is excluded from the tunable stations, and then the process proceeds to Step S236.

On the other hand, when the reception sensitivity coefficient Cr of the station of interest is determined to be greater than the threshold value θ in Step S234, in other words, when (it is highly likely that) it is possible to (satisfactorily) receive area-limited broadcasting by the station of interest at the current location, the process skips Step S235, in other words, without deleting the station information of interest from the tunable list, and the process proceeds to Step S236 with the station of interest selected as a tunable station.

In Step S236, the station selection unit 117 determines whether or not all of the station information on the tunable list has been set as station information of interest.

When it is determined that there is station information that has not yet been set as station information of interest in the station information of the tunable list in Step S236, the process proceeds to Step S237, and the station selection unit 117 selects the next piece of station information to the station information that is currently set as station information of interest out of the station information on the tunable list as new station information of interest.

Then, the process returns to Step S233 from Step S237, and then the same processes are repeated.

In addition, in Step S236, when all of the station information on the tunable list is determined to have been set as station information of interest, the tunable list registration process of FIG. 43 ends, and the process returns to the tuning process.

Figure 44:
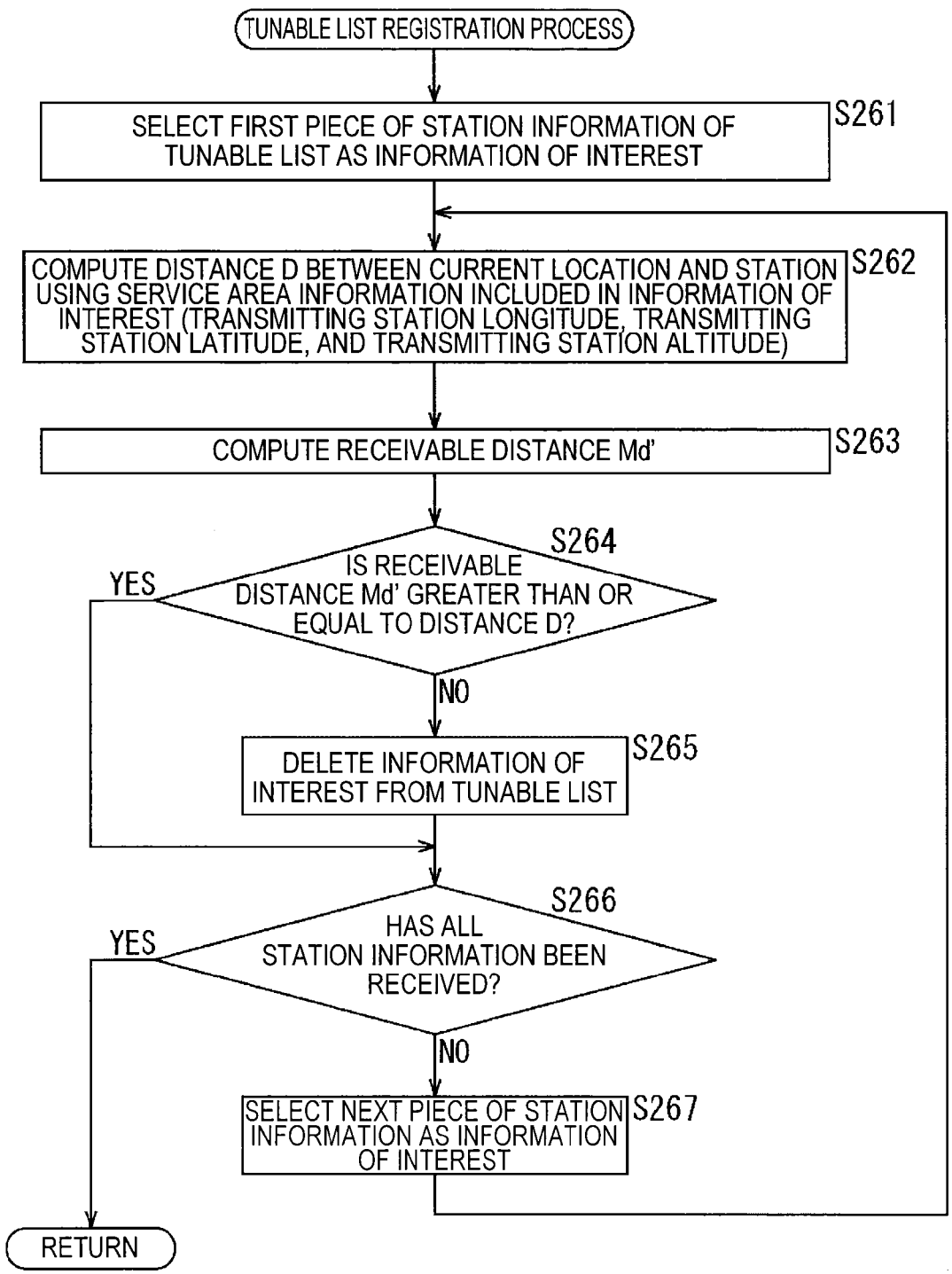
FIG. 44 is a flowchart for describing the tunable list registration process.

Although the example in which whether station information is a target of the tunable list or not is selected according to reception sensitivity of the station of interest has been described above, it is not limited to the above-described reception sensitivity, and another index may be used. FIG. 44 is a flowchart for describing another example of the tunable list registration process performed in Step S204 of FIG. 41.

In the tunable list registration process of FIG. 44, in Step S261, the station selection unit 117 selects the first piece of station information of the tunable list as station information of interest (information of interest), and then the process proceeds to Step S262.

In Step S262, the station selection unit 117 computes the distance D between the current location and the station 32 using transmitting station longitude, transmitting station latitude, and transmitting station altitude of the station information of interest, and then the process proceeds to Step S263.

The distance D is computed according to, for example, the following formula (2) when the transmitting station longitude, transmitting station latitude, and transmitting station altitude of the station of interest are denoted by Sx, Sy, and Sz, respectively, and the longitude, latitude, and altitude of the current location are denoted by Rx, Ry, and Rz, respectively.

[Math 2]

$$D=\sqrt{(Sx-Rx)^2+(Sy-Ry)^2+(Sz-Rz)^2} \quad (2)$$

In Step S263, the station selection unit 117 computes a receivable distance Md' using a receivable distance and the area pattern bitmap of the station information of interest, and then the process proceeds to Step S264.

Here, the receivable distance Md' of the station of interest is a value corresponding to a range in which a broadcasting wave from the station of interest is receivable, which is a value serving as an index for determining whether or not area-limited broadcasting by the station of interest is receivable at the current location.

The receivable distance Md' of the station of interest is computed according to, for example, the following formula (3) when the receivable distance of the station of interest is denoted by Md and the directivity coefficient thereof by f(dir).

[Math 3]

$$Md'=Md*f(dir) \quad (3)$$

Note that, in formula (3), "*" means multiplication, and by calculating Md*f(dir), the receivable distance with directivity added thereto is computed. f(dir), however, is as described above.

In Step S264, the station selection unit 117 determines whether or not the receivable distance Md' is (equal to or) longer than the distance D.

In Step S264, when the receivable distance Md' of the station of interest is determined not to be greater than the distance D, in other words, when (it is highly likely that) it is not possible to (satisfactorily) receive area-limited broadcasting by the station of interest at the current location, the process proceeds to Step S265. Then, the station selection unit 117 deletes the station information of interest from the tunable list, and accordingly the station of interest is excluded from the tunable stations, and then the process proceeds to Step S266.

On the other hand, when the receivable distance Md' of the station of interest is determined to be greater than the distance D in Step S264, in other words, when (it is highly likely that) it is possible to (satisfactorily) receive area-limited broadcasting by the station of interest at the current location, the process skips Step S265, in other words, without deleting the station information of interest from the tunable list, and the process proceeds to Step S266 with the station of interest selected as a tunable station.

In Steps S266 and S267, the same processes as Step S236 and S237 of FIG. 43 are performed, and the above-described processes are repeated until all of the station information on the tunable list is determined to have been set as station information of interest. In addition, in Step S266, when all of the station information on the tunable list is determined to have been set as station information of interest, the tunable list registration process of FIG. 44 ends, and the process returns to the tuning process.

Figure 45:
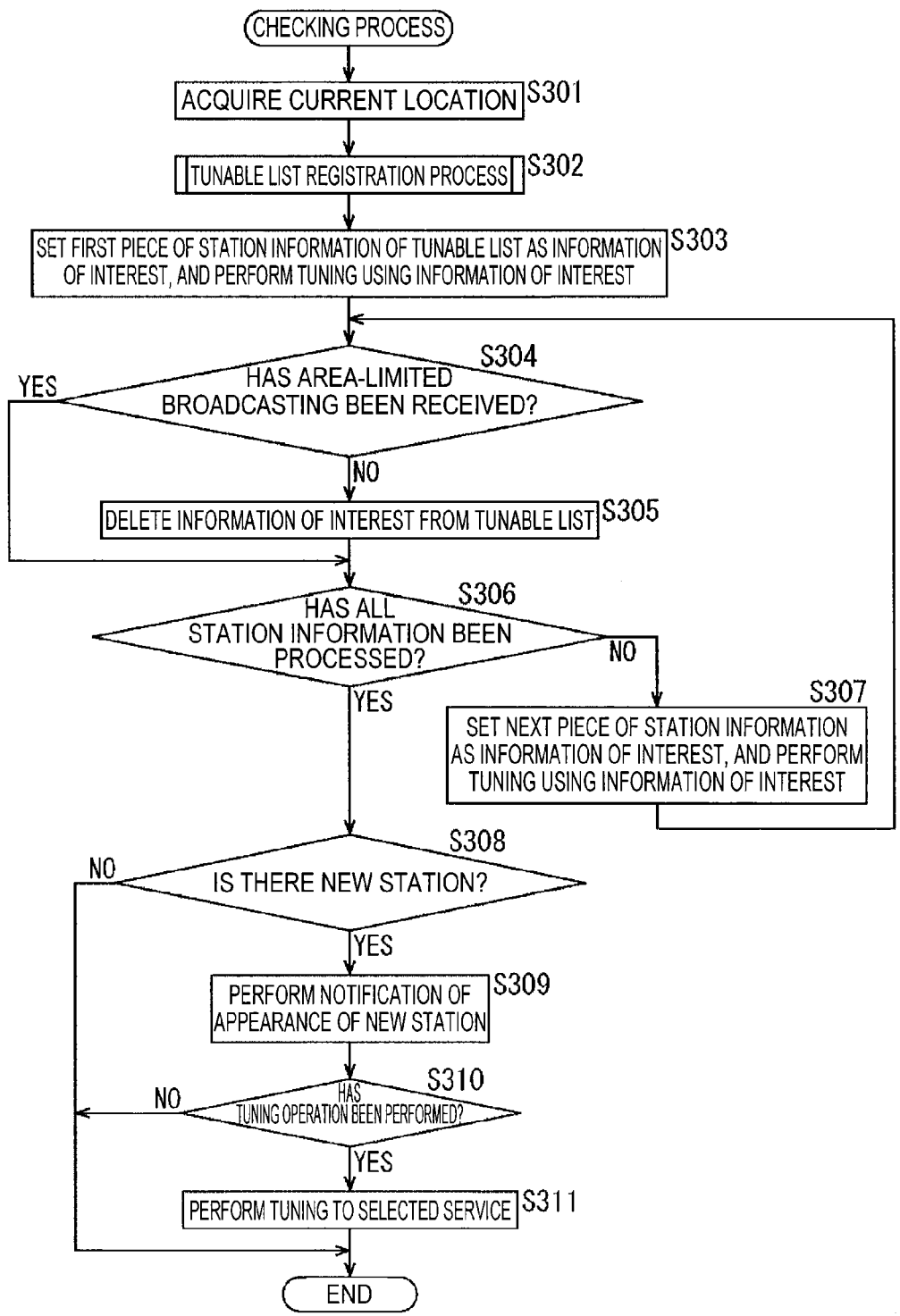
FIG. 45 is a flowchart for describing a checking process.

FIG. 45 is a flowchart for describing a checking process that the reception terminal 33 of FIG. 27 performs.

Here, there are cases in which, after the tuning process in the GPS mode of FIG. 41 is performed, the current location changes when the user possessing the reception terminal 33 moves, and as a result, the current location is included in the broadcasting area of a new station.

In the checking process, after the current location is changed, whether the current location after the change is included in the broadcasting area of the new station is checked, and when the current location after the change is included in the broadcasting area of the new station and the reception terminal 33 can receive area-limited broadcasting of the new station, the user is notified of the appearance of the new station.

That is, in the checking process, in Step S301, the station selection unit 117 acquires a current location (of the reception terminal 33), supplies the location to the tuning control unit 118, and then the process proceeds to Step S302.

In Step S302, the station selection unit 117 selects station information of a station performing the area-limited broadcasting that is expected to be receivable at the current location from the station information registered on the station list of the storage unit 115 as in Step S204 of FIG. 41, and then performs the tunable list registration process for performing registration on the tunable list.

Note that details of the tunable list registration process are as described above in FIGS. 43 and 44.

Then, the station selection unit 117 supplies a tunable list on which the station information of the tunable stations is registered obtained through the tunable list registration process to the tuning control unit 118.

Then, the process proceeds from Step S302 to Step S303, and thereafter, the same processes as Steps S135 to S139 of FIG. 35 are performed in Steps S303 to S307, thereby performing checking of reception.

Then, when the checking of reception is completed through Steps S303 to S307, the tuning control unit 118 determines in Step S308 whether or not it is possible to newly check reception of area-limited broadcasting by a tunable station for which it was not possible to check reception of area-limited broadcasting (hereinafter referred to also as a new tunable station) in checking of reception of the previous time (in the processes of Steps S303 to S307 that were performed immediately before the checking of reception of this time or the processes of Steps S206 to S210 of the tuning process in the GPS mode of FIG. 41) in the checking of reception of this time (the processes of Steps S303 to S307 performed immediately before).

In Step S308, when it is determined that it is not possible to newly check reception of the area-limited broadcasting by the new tunable station in the checking of reception of this time, the process skips Steps S309 to S311, and thereby the checking process ends.

In addition, when it is determined in the checking of reception of this time that it is possible to newly check reception of the area-limited broadcasting by the new tunable station in Step S308, in other words, when station information of the new tunable station that was not registered on the tunable list supplied from the station selection unit 117 to the tuning control unit 118 in the checking of reception of the previous time is registered on the tunable list supplied from the station selection unit 117 to the tuning control unit 118 in the checking of reception of this time, the process proceeds to Step S309, and the tuning control unit 118 notifies the user of the appearance of the new tunable station.

Here, the tuning control unit 118 notifies the user of the appearance of the new tunable station by, for example, causing a notification screen for causing the appearance of the new tunable station to be notified of to be displayed on the display unit 76, or causing a sound for causing the appearance of the new tunable station to be notified of to be output from the speaker 78, or the like.

Then, the process proceeds from Step S309 to Step S310, and the tuning control unit 118 determines whether or not the user has performed a tuning operation for performing selection of the new tunable station and selection of a service that is being area-limited-broadcast by the new tunable station, and when the user is determined not to have performed the operation, the process skips Step S311 and the checking process ends.

In addition, in Step S310, when the tuning operation is determined to have been performed, in other words, when the new tunable station is selected as a selected station, the process proceeds to Step S311, and the tuning control unit 118 performs tuning control to cause the tuner 72 to be tuned to the selected service, and then the checking process ends.

Note that the checking process is repeated, for example, periodically.

In addition, when a plurality of frequencies for transmission are listed in frequency information arranged in the terrestrial delivery system descriptor at the time of the MFN operation, tuning control is performed using a transmission frequency specified based on a frequency tag included in the station information. Accordingly, it is possible to easily cope with a complicated configuration of a frequency of a transmission point at the time of MFN operation.

Figure 46:
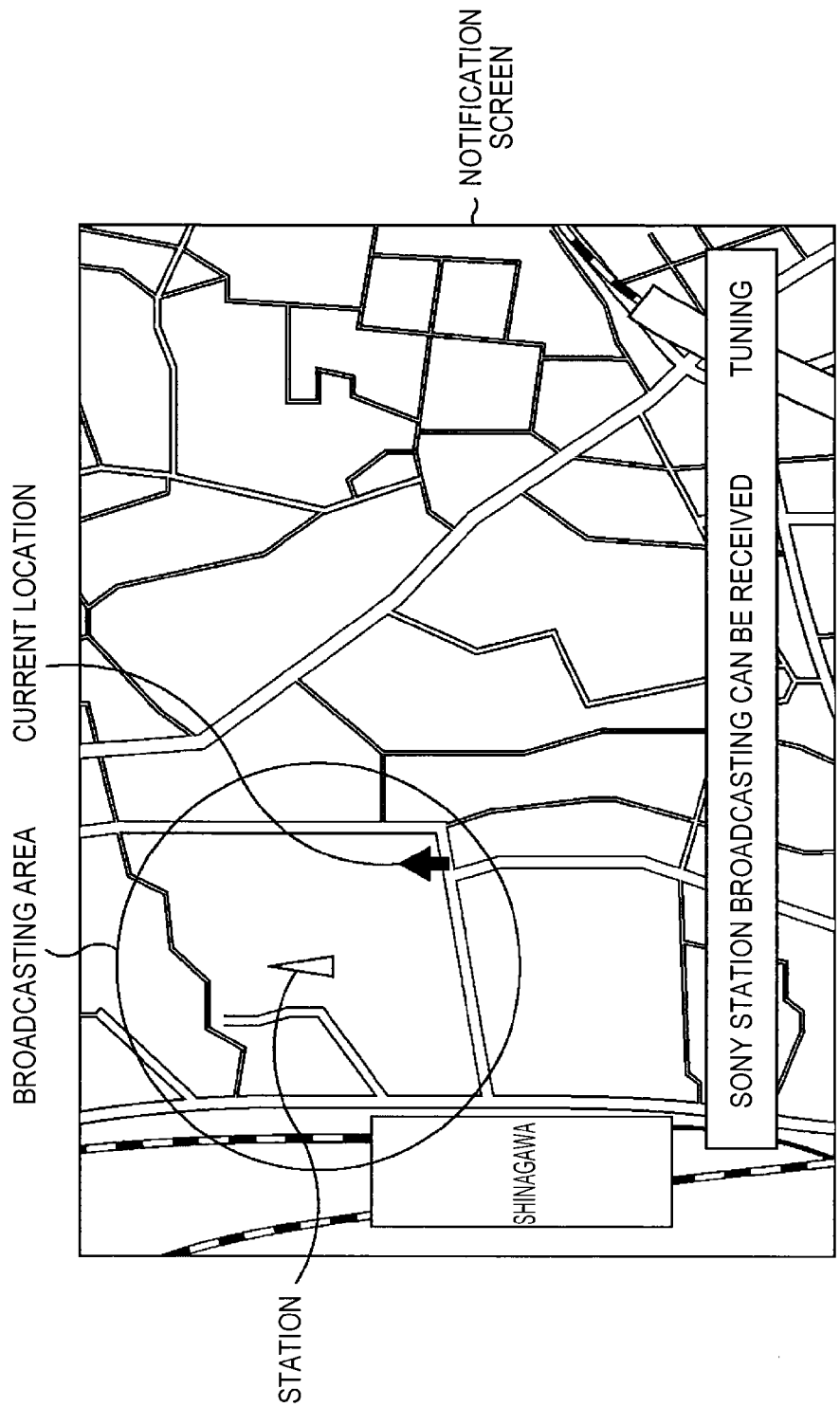
FIG. 46 is a diagram illustrating an example of a notification screen.

FIG. 46 is a diagram showing an example of a notification screen.

On the notification screen of FIG. 46, a map including a current location is displayed, and further at the position of a new tunable station on the map, a mark indicating the tunable station (triangular mark) is displayed.

In addition, on the notification screen of FIG. 46, a mark indicating the current location (mark in an arrow shape), a circle indicating the broadcasting area of the new tunable station, and a message that a service by the new tunable station is receivable are displayed.

Figure 47:
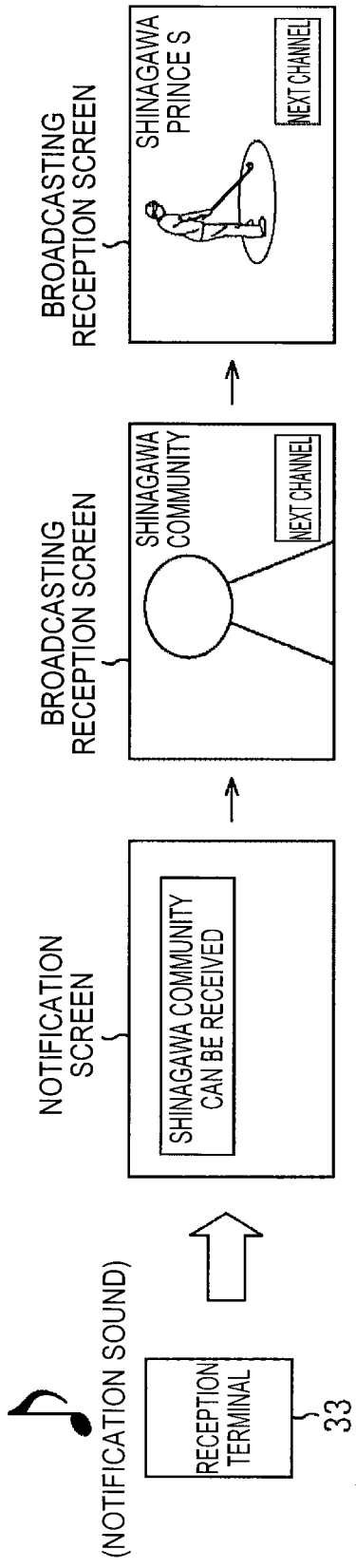
FIG. 47 is a diagram illustrating a display example of the display unit 76 when the checking process is performed.

FIG. 47 is a diagram showing a display example of the display unit 76 when the reception terminal 33 of FIG. 27 performs the checking process of FIG. 45.

When it was possible to newly check reception of area-limited broadcasting by the new tunable station in the checking of reception of this time in the checking process, the tuning control unit 118 causes a notification sound for notifying the user of appearance of the new tunable station to be output from the speaker 78, and further causes a notification screen to be displayed on the display unit 76, and thereby notifies the user of the appearance of the new tunable station.

Then, when the user selects a service for which the new tunable station performs area-limited broadcasting as a selected service, the tuner 72 receives the selected service, and a broadcasting reception screen displaying an image of the selected service is displayed on the display unit 76.

When a plurality of new tunable stations perform area-limited broadcasting, the "next channel" button is also displayed on the broadcasting reception screen.

Then, when the user operates the "next channel" button, a service for which another new tunable station performs area-limited broadcasting is selected as a new selected service, and the new selected service is tuned to.

Further, a broadcasting reception screen on which an image of the selected service that is obtained as a result of the tuning is displayed is displayed on the display unit 76.

As described above, when the checking process is performed periodically, and the appearance of a new tunable station is notified of in the checking process each time the user moves, the user can ascertain the appearance of the new tunable station at the position after the movement, without performing the tuning process in the GPS mode.

[Description of a Computer to which the Present Technology is Applied]

The series of processes executed by the station 32 and the reception terminal 33 described above can be executed by hardware but can also be executed by software. When the series of processes are executed by software, a program that constructs such software is installed into a computer. Here, the expression "computer" includes a computer in which dedicated hardware is incorporated and, for example, a general-purpose personal computer or the like that is capable of executing various functions when various programs are installed.

Figure 48:
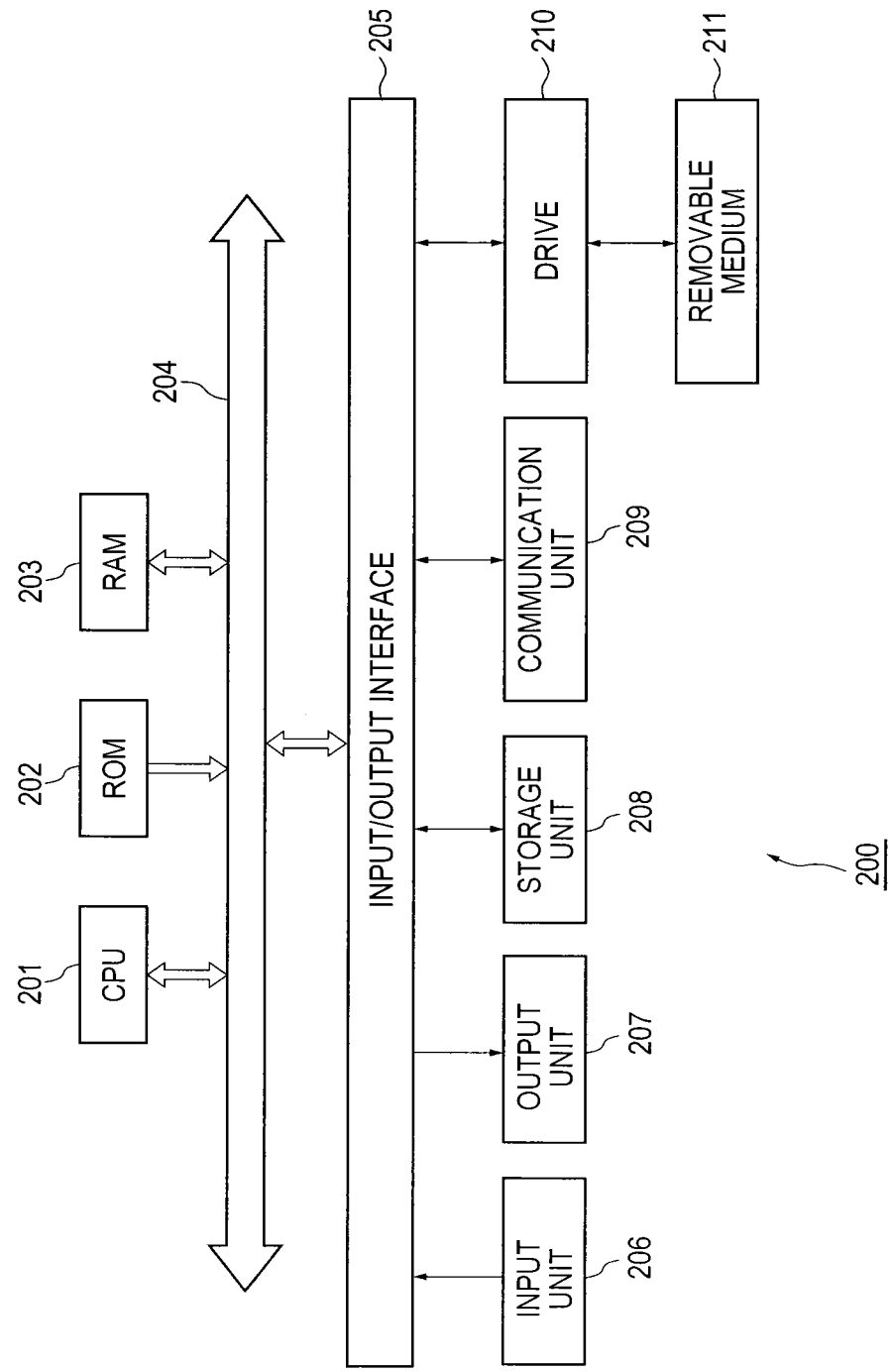
FIG. 48 is a block diagram illustrating a configuration example of the hardware of a computer.

FIG. 48 is a block diagram showing a configuration example of the hardware of a computer that executes the series of processes described earlier according to a program.

In the personal computer 200, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 is configured from a display, a speaker or the like. The storage unit 208 is configured from a hard disk, a non-volatile memory or the like. The communication unit 209 is configured from a network interface or the like. The drive 210 drives a removable medium 211 such as a magnetic disk, an optical disc, a magneto-optical disc, a semiconductor memory or the like.

In the personal computer 200 configured as described above, the CPU 201 loads a program that is stored in, for example, the storage unit 208 onto the RAM 203 via the input/output interface 205 and the bus 204, and executes the program, and thereby, the above-described series of processing are performed.

Programs to be executed by the computer 200 (the CPU 201) are provided being recorded in the removable medium 211 which is a packaged medium or the like. Also, programs may be provided via a wired or wireless transmission medium, such as a local area network, the Internet or digital satellite broadcasting.

In the personal computer 200, by inserting the removable medium 211 into the drive 210, the program can be installed in the storage unit 208 via the input/output interface 205. Further, the program can be received by the communication unit 209 via a wired or wireless transmission medium and installed in the storage unit 208. Moreover, the program can be installed in advance in the ROM 202 or the storage unit 208.

It should be noted that the program executed by a computer may be a program that is processed in time series according to the sequence described in this specification or a program that is processed in parallel or at necessary timing such as upon calling.

In addition, an embodiment of the present technology is not limited to the embodiments described above, and various changes and modifications may be made without departing from the scope of the present technology.

Additionally, the present technology may also be configured as below.

[1]

A reception device including:

a first acquisition unit configured to acquire station information regarding a station transmitting a broadcasting wave of broadcasting on an arbitrary segment;

a storage unit configured to store the station information;

a selection unit configured to select a station transmitting a broadcasting wave that is receivable at a predetermined position as a tunable station to be tuned to using the station information;

a specifying unit configured to specify a transmission frequency used at a transmission point of a broadcasting wave of the broadcasting performed by the tunable station using the station information; and a tuning control unit configured to perform tuning control such that a service of the broadcasting performed by the tunable station is tuned to according to the transmission frequency.

[2]

The reception device according to [1], further including:

a second acquisition unit configured to acquire frequency information regarding frequencies for transmission of respective transmission points of a broadcasting wave of the broadcasting, wherein the specifying unit specifies the transmission frequency from frequencies for transmission of respective transmission points designated using the frequency information based on frequency specification information for specifying the transmission frequency included in the station information.

[3]

The reception device according to [1] or [2], wherein the broadcasting wave of the broadcasting is transmitted on a multi-frequency network (MFN) via a relay station.

[4]

The reception device according to any one of [1] to [3], wherein the station information is arranged in an area broadcasting descriptor included in a network information table (NIT) transmitted by a broadcasting wave of the broadcasting, and wherein the frequency information is arranged in a terrestrial delivery system descriptor included in the NIT.

[5]

The reception device according to any one of [1] to [4], wherein the selection unit selects a station transmitting the broadcasting that is receivable in an area that a user selects as the tunable station using the station information.

[6]

The reception device according to any one of [1] to [5], wherein the tuning control unit causes information of the tunable station to be displayed, and wherein the tuning control unit causes a service of the broadcasting performed by a station that a user selects to be tuned to from the display of the information of the tunable station.

[7]

The reception device according to any one of [1] to [6], wherein the tuning control unit performs checking of reception to check whether or not the broadcasting by the tunable station is receivable, and wherein the tuning control unit causes information of only the tunable station of which reception of broadcasting was able to be checked to be displayed.

[8]

The reception device according to any one of [1] to [7], wherein the broadcasting is one-segment broadcasting.

[9]

A reception method performed by a reception device, the method including the steps of:

acquiring station information regarding a station transmitting a broadcasting wave of broadcasting on an arbitrary segment;

storing the station information;

selecting a station transmitting a broadcasting wave that is receivable at a predetermined position as a tunable station to be tuned to using the station information;

specifying a transmission frequency used at a transmission point of a broadcasting wave of the broadcasting performed by the tunable station using the station information; and performing tuning control such that a service of the broadcasting performed by the tunable station is tuned to according to the transmission frequency.

[10]

A program for causing a computer to function as:

a first acquisition unit configured to acquire station information regarding a station transmitting a broadcasting wave of broadcasting on an arbitrary segment;

a storage unit configured to store the station information;

a selection unit configured to select a station transmitting a broadcasting wave that is receivable at a predetermined position as a tunable station to be tuned to using the station information;

a specifying unit configured to specify a transmission frequency used at a transmission point of a broadcasting wave of the broadcasting performed by the tunable station using the station information; and a tuning control unit configured to perform tuning control such that a service of the broadcasting performed by the tunable station is tuned to according to the transmission frequency.

REFERENCE SIGNS LIST 31 terrestrial broadcasting station
32, 32-1 to 32-5 station
33, 33-1 to 33-4 reception terminal
34, 34-1 to 34-5 relay device
51 relevant information acquisition unit
52 video data acquisition unit
53 video encoder
54 audio data acquisition unit
55 audio encoder
56 multiplexer
57 transmission unit
58, 71 antenna
72 tuner
73 demultiplexer
74 video decoder
75 selection unit
76 display unit
77 audio decoder
78 speaker
79 browser
80 control unit
81 operation unit
82 wireless communication I/F
111 to 113 station information acquisition unit
114 registration unit
115 storage unit
116 updating unit
117 station selection unit
118 tuning control unit
119 frequency information acquisition unit
120 frequency specifying unit
201 CPU
202 ROM
203 RAM
204 bus
205 input-output interface
206 input unit
207 output unit
208 storage unit
209 communication unit
210 drive
211 removable medium

The invention claimed is:

1. A reception device comprising:
 circuitry coupled to a memory and configured to:
 acquire station information regarding a station transmitting a broadcasting wave of broadcasting on an arbitrary segment;
 store the station information;
 select a station transmitting a broadcasting wave that is receivable at a predetermined position as a tunable station to be tuned to using the station information;
 specify a transmission frequency used at a transmission point of a broadcasting wave of the broadcasting performed by the tunable station using the station information; and
 perform tuning control to tune to the transmission frequency such that a service of the broadcasting performed by the tunable station is received by a mobile station at the predetermined position.

2. The reception device according to claim 1, wherein the circuitry coupled to the memory is further configured to:
 acquire frequency information regarding frequencies for transmission of respective transmission points of a broadcasting wave of the broadcasting,
 wherein the circuitry specifies the transmission frequency from frequencies for transmission of respective transmission points designated using the frequency information based on frequency specification information for specifying the transmission frequency included in the station information.

3. The reception device according to claim 2, wherein the broadcasting wave of the broadcasting is transmitted on a multi-frequency network (MFN) via a relay station.

4. The reception device according to claim 3, wherein the station information is arranged in an area broadcasting descriptor included in a network information table (NIT) transmitted by a broadcasting wave of the broadcasting, and wherein the frequency information is arranged in a terrestrial delivery system descriptor included in the NIT.

5. The reception device according to claim 1, wherein the circuitry selects a station transmitting the broadcasting that is receivable in an area that a user selects as the tunable station using the station information.

6. The reception device according to claim 1, wherein the circuitry causes information of the tunable station to be displayed, and causes a service of the broadcasting performed by a station that a user selects to be tuned to from the display of the information of the tunable station.

7. The reception device according to claim 1, wherein the circuitry performs checking of reception to check whether or not the broadcasting by the tunable station is receivable, and causes information of only the tunable station of which reception of broadcasting was able to be checked to be displayed.

8. The reception device according to claim 1, wherein the broadcasting is one-segment broadcasting.

9. A reception method performed by a reception device, the method comprising the steps of:
 acquiring, with circuitry, station information regarding a station transmitting a broadcasting wave of broadcasting on an arbitrary segment;
 storing, with the circuitry, the station information;
 selecting, with the circuitry, a station transmitting a broadcasting wave that is receivable at a predetermined position as a tunable station to be tuned to using the station information;
 specifying, with the circuitry, a transmission frequency used at a transmission point of a broadcasting wave of the broadcasting performed by the tunable station using the station information; and
 performing tuning control to tune to the transmission frequency such that a service of the broadcasting performed by the tunable station is received by a mobile station at the predetermined position.

10. A non-transitory computer-readable medium encoded with computer-readable instructions that, when executed by a computer, cause the computer to perform a method comprising:
 acquiring station information regarding a station transmitting a broadcasting wave of broadcasting on an arbitrary segment;
 storing the station information;
 selecting a station transmitting a broadcasting wave that is receivable at a predetermined position as a tunable station to be tuned to using the station information;

specifying a transmission frequency used at a transmission point of a broadcasting wave of the broadcasting performed by the tunable station using the station information; and controlling tuning to the transmission frequency such that a service of the broadcasting performed by the tunable station is received by a mobile station at the predetermined location.

\* \* \* \* \*